United States Patent
Murakami

(10) Patent No.: US 7,968,019 B2
(45) Date of Patent: Jun. 28, 2011

(54) OPTICAL COMPENSATION FILM, METHOD FOR PRODUCING OPTICAL COMPENSATION FILM, POLARIZATION PLATE AND LIQUID CRYSTAL DISPLAY

(75) Inventor: Takashi Murakami, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 159 days.

(21) Appl. No.: 11/384,914

(22) Filed: Mar. 20, 2006

(65) Prior Publication Data

US 2006/0216437 A1 Sep. 28, 2006

(30) Foreign Application Priority Data

Mar. 25, 2005 (JP) ................................. 2005-088152
Feb. 2, 2006 (JP) ................................. 2006-026238

(51) Int. Cl.
*C08J 5/18* (2006.01)
*G02F 1/13363* (2006.01)

(52) U.S. Cl. ......... 264/2.7; 428/1.33; 264/1.7; 264/211; 264/217

(58) Field of Classification Search .................. 428/1.1, 428/1.3, 1.31, 1.33, 1.54; 536/58–59; 264/1.29, 264/1.34, 1.7, 2.7, 291, 650, 211, 217
See application file for complete search history.

(56) References Cited

U.S. PATENT DOCUMENTS

| | | | | |
|---|---|---|---|---|
| 2,265,218 | A | * | 12/1941 | Stone .............................. 536/65 |
| 2,307,783 | A | * | 1/1943 | Malm et al. ................. 427/374.4 |
| 2,315,974 | A | * | 4/1943 | Malm et al. ...................... 427/58 |
| 2,689,799 | A | * | 9/1954 | Albus et al. ............... 106/169.39 |
| 2,713,546 | A | * | 7/1955 | Williams, Jr. ............. 106/170.13 |
| 3,119,150 | A | * | 1/1964 | Hungerford .................. 425/377 |
| 3,314,808 | A | * | 4/1967 | Moulds ..................... 106/170.36 |
| 4,016,353 | A | * | 4/1977 | Goheen et al. .................. 536/69 |
| 4,839,405 | A | * | 6/1989 | Speelman et al. .............. 524/99 |
| 5,219,510 | A | * | 6/1993 | Machell et al. ............. 264/210.6 |
| 5,288,715 | A | * | 2/1994 | Machell et al. ............... 430/531 |
| 5,594,068 | A | * | 1/1997 | Buchanan et al. ............ 525/54.3 |
| 5,753,140 | A | * | 5/1998 | Shigemura ................ 252/299.01 |
| 5,914,397 | A | * | 6/1999 | Kiyose et al. .................... 536/71 |
| 6,180,240 | B1 | * | 1/2001 | St. Aubin et al. .............. 428/412 |
| 6,569,927 | B1 | * | 5/2003 | Gelbin ........................... 524/111 |
| 6,638,388 | B2 | * | 10/2003 | Nagata et al. .................. 156/230 |
| 7,128,952 | B2 | * | 10/2006 | Murakami et al. .............. 428/1.3 |
| 2002/0041352 | A1 | * | 4/2002 | Kuzuhara et al. .............. 349/117 |
| 2003/0097963 | A1 | * | 5/2003 | Schunk et al. ............ 106/170.11 |
| 2003/0215608 | A1 | * | 11/2003 | Bermel .......................... 428/141 |
| 2004/0201805 | A1 | * | 10/2004 | Nishikouji et al. ............ 349/117 |
| 2005/0045064 | A1 | * | 3/2005 | Oya .......................... 106/170.27 |
| 2005/0150426 | A1 | * | 7/2005 | Hashimoto et al. ...... 106/170.21 |
| 2005/0221023 | A1 | * | 10/2005 | Sakamoto et al. ............. 428/1.3 |
| 2006/0127607 | A1 | * | 6/2006 | Okubo et al. .................. 428/1.3 |

FOREIGN PATENT DOCUMENTS

| | | |
|---|---|---|
| JP | 6-501040 A | 2/1994 |
| JP | 2003-113317 A | 4/2003 |
| JP | 2004-4474 A | 1/2004 |
| WO | WO 92/05213 A1 | 4/1992 |
| WO | WO 2004063252 A1 * | 7/2004 |

OTHER PUBLICATIONS

Machine translation of Takada et al. JP 2001-151901.*
Machine translation of Murakami et al. JP 2000-352620.*
Japanese Office Action (Notice of Reasons for Refusal) dated Nov. 2, 2010, which issued in Japanese Patent Application No. 2006-026238.

* cited by examiner

*Primary Examiner* — Sophie Hon

(74) *Attorney, Agent, or Firm* — Holtz, Holtz, Goodman & Chick, P.C.

(57) ABSTRACT

An object of the invention was to provide a method for producing an optical compensation film having low haze and high uniformity of retardation, and a polarization plate and a liquid crystal displaying apparatus which is considerably reduced in the visivility variation caused by heat from a direct lighting type backlight of variation of the environment conditions and the color reproducibility is excellent. Disclosed is a method for producing an optical compensation film comprising the steps of cellulose resin film formed by melt-casting a composition which containing a cellulose resin, wherein the cellulose resin has a residual sulfuric acid content of 0.1-50 ppm, providing a polymer layer on the cellulose resin film, and stretching the cellulose resin film together with the polymer layer.

13 Claims, No Drawings

US 7,968,019 B2

OPTICAL COMPENSATION FILM, METHOD FOR PRODUCING OPTICAL COMPENSATION FILM, POLARIZATION PLATE AND LIQUID CRYSTAL DISPLAY

This application claims priority from Japanese Patent Application No. 2005-088152 filed on Mar. 25, 2005, and Japanese Patent Application No. 2006-026238 filed on Feb. 2, 2006, which are incorporated hereinto by reference.

TECHNICAL FIELD

The present invention relates to a method for producing an optical compensating film, an optical compensating film, a polarization plate and a liquid crystal display, and relates specifically to a method for producing an optical compensation film and an optical compensation film superior in the low haze and the uniformity of the retardation, and relates further to a polarization plate and a liquid crystal display exhibiting not only reduced visibility variation caused by heat generation of a direct lighting backlight source such as a LED and environmental variations, but also excellent color reproducibility.

BACKGROUND

Recently, liquid crystal display, plasma display and organic EL used for personal computer, word processor, watch or electric calculator are frequently employed under severe conditions. Consequently, high durability is required to an optical film such as a polarization plate protecting film, an optical compensation film, a front filter for plasma display panel and a front film for organic EL panel. Therefore, it is demanded that the properties of them are not varied under the severe conditions, for example, the physical properties of the film are not varied by the use for a long period and superior in the in the uniformity.

It is important for the protecting film that the film has low optical anisotropy, the high transparency and is superior in the UV absorbing ability and the moisture barrier function to prevent lowering in the dimensional stability and the polarizing layer.

As the raw material of the optical compensation film, for example, norbonene, polycarbonate, polysulfone, poly(ether sulfone) and amorphous polyolefin are usable. Each of these polymer optical compensation films is usually pasted with the polarization plate for using in combination. Therefore, a shortcoming is posed that the cost rises since many sheets of the film are laminated. Furthermore, a problem of occurrence of inferior products caused by intrusion of air bubbles or foreign substances or formation of wrinkles on the occasion of the pasting is posed additionally to complication of the producing process.

Besides, the optical compensation film principally composed of cellulose resin can be pasted with the polarization plate in place of the polarization plate protecting film. Therefore, the production process of the liquid crystal can be shortened and the producing efficiency is raised by such the film, cf. Patent Documents 1 through 5, for example.

In Patent Document 6, for example, a technology is disclosed in which TAC film produced by a solution-casting method is employed as the support and a polymer layer is coated on the support and stretched together with the support at high temperature for giving a desired retarding property and pasted with a polarization plate. Hitherto, a problem is posed that ununiformity tends to be caused by uniformity of the stretching when the polymer layer is formed on the TAC film separately from the film producing process of the TAC film by the solution-casting method and stretched at the high temperature. Moreover, a problem is posed that the haze tends become higher since the film is treated at the high temperature.

[Patent Document 1] Japanese Patent O.P.I. Publication No. 2002-71957
[Patent Document 2] Japanese Patent O.P.I. Publication No. 2002-62430
[Patent Document 3] Japanese Patent O.P.I. Publication No. 2001-249223
[Patent Document 4] Japanese Patent O.P.I. Publication No. 2002-82226
[Patent Document 5] Japanese Patent O.P.I. Publication No. 2002-98832
[Patent Document 6] Japanese Patent O.P.I. Publication No. 2004-4474

SUMMARY

An object of the invention is to provide a method for producing an optical compensation film and an optical compensation film superior in the low haze and the uniformity of the retardation, and further to provide a polarization plate and a liquid crystal display exhibiting not only reduced visibility variation caused by heat generation of a direct lighting backlight source such as a LED and environmental variations, but also excellent color reproducibility.

DESCRIPTION OF THE PREFERRED EMBODIMENTS

The above object of the present invention is accomplished by the following structures.

(Structure 1) A method for producing an optical compensation film comprising the steps of:
melt-casting a composition, which contains a cellulose resin having a residual sulfuric acid content of 0.1-50 ppm, to form a cellulose resin film;
providing a polymer layer on the cellulose resin film;
and stretching the cellulose resin film together with the polymer layer.

(Structure 2) The method for producing an optical compensation film of Structure 1, wherein the polymer layer is composed of at least one selected from the group consisting of poly(ether ketone), polyamide, polyester, polyimide, polyamidoimide and polyesterimide.

(Structure 3) The method for producing an optical compensation film of Structure 1 or 2, wherein the cellulose resin contained in the cellulose resin film is a mixed fatty acid ester having a total acyl group substituted degree of from 2.0 to 2.9 and a number average molecular weight Mn of from 60,000 to 200,000.

(Structure 4) The method for producing an optical compensation film of any one of structures 1-3, wherein the residual sulfuric acid content is within the range of 0.1-45 ppm.

(Structure 5) The method for producing an optical compensation film of any one of Structures 1-4, wherein the composition contains a UV absorbent, and the UV absorbent has a weight average molecular weight of 490-50000.

(Structure 6) The method for producing an optical compensation film of any one of Structures 1-5, wherein the composition contains a plasticizer and at least one of the plasticizer is selected from the group consisting of polyol ester type plasticizer, polyester type plasticizer, citrate type plasticizer and phthalate type plasticizer.

(Structure 7) The method for producing an optical compensation film of any one of Structures 1-6, wherein the composition contains 0.01-5% by weight of a hindered amine compound or a hindered phenol compound.

(Structure 8) The method for producing an optical compensation film of any one of Structures 1-7, wherein the stretching temperature satisfies the following Expression 1:

Melting temperature $A-100°$ C.$\leqq$Stretching temperature $B \leqq A-40°$ C.     Expression 1 in the above melting temperature A is a temperature on the occasion of the melt-casting of the cellulose resin film.

(Structure 9). An optical compensation film, wherein the optical compensation film is prepared by the method for producing an optical compensation film of any one of Structures 1-8.

(Structure 10) A polarization plate, wherein an optical compensation film of Structure 9 is provided on at least one surface of the polarization plate.

(Structure 11) A liquid crystal display, wherein the polarization plate of Structure 10 is provided on at least one surface of the liquid crystal display.

(Structure 12) The liquid crystal display of Structure 11, wherein a direct lighting type backlight is employed.

The preferred embodiments of the present invention will be explained below, but the present invention is not limited thereto.

In the invention, the desired retardation easily can be obtained, and the object thereof is to obtain the optical compensation film having low haze and superior uniformity of the retardation.

It is found as a result of the investigation by the inventors that the above-described objects can be attained by the method for producing an optical compensation film in which a cellulose resin film produced by melt-casting a composition containing cellulose resin is used as the support and a layer of a suitable polymer is provided on the support and stretched together with the support at high temperature. As a result of that, desired retardation easily can be obtained by the laminated layer structure of the support and the polymer layer.

Furthermore, it is found that the variation of visibility caused by heating by the direct lighting type backlight such as LED and the variation of the surround conditions is considerably reduced and the display excellent in the dolor reproducibility can be obtained by the use of such the optical compensation film.

Hitherto, cellulose resin film produced by the solution-casting method has been preferably used since such the film is superior in the flatness and the uniformity of the layer thickness. Contrary to that, the flatness can be difficultly obtained in the film produced by the melt-casting method. According to a result of the investigation by the inventors, however, it is found that the stretching ununiformity and the haze caused by the support occur when the polymer layer is provided on the cellulose resin film and stretched at high temperature, because the cellulose resin film is usually produced by dissolving a mixture of the cellulose resin and an additive and a solvent at a temperature of from 45 to 120° C. and casting the resultant solution at a relatively low temperature of from 5 to 40° C. so that orientation of the cellulose resin molecules is caused. On the other hand, it is surprisingly found about the optical compensation film that the stretching ununiformity and the haze rising are not caused when the polymer layer is provided on the cellulose resin film according to the invention and stretched at a temperature lower than the temperature for the casting. The cellulose resin film according to the invention is produced by melting and casting the cellulose resin and an additive at a high temperature of from 200 to 250° C. to form the orientation of cellulose resin molecules. It is supposed that the increasing in the stretching uniformity and the haze are caused by the orientation state of the cellulose resin molecules.

Moreover, it is found that the optical compensation film of the invention is preferably produced by providing the polymer layer on the cellulose resin film produced by the melt-casting method and stretching at a stretching temperature B satisfying the following Expression 1.

Melting temperature $A-100°$ C.$\leqq$Stretching temperature $B \leqq$ Melting temperature $A-40°$ C.    Expression 1

In the above, Melting temperature A is the temperature on the occasion of the melt-casting of the cellulose resin film.

In the invention, the melt-casting is defined as a method in which the cellulose resin is substantially molten without any solvent by a temperature at which the cellulose resin shows fluidity, and then the fluid molten material containing the cellulose resin is cast. The film forming method by heat-melting can be classified in detail into a melt-extrusion forming method, a press forming method, an inflation method, an injection forming method, a blow forming method and a stretching forming method. Among them, the melt-extrusion method is suitable for obtaining the optical compensation film superior in the mechanical strength and the surface precision. The producing method of film by the molten cellulose resin of the invention include the melt-casting film making method in which the film constituting materials are molted for giving fluidity and the molten material is extruded onto an endless belt to form the film.

DETAILED DESCRIPTION OF THE PRESENT INVENTION

Next, each of elements of the present invention will be explained in detail.

(Polymer)

The polymer layer according to the invention is preferably provided by coating. The polymer layer forming process can be performed without any limitation as long as at a time after the formation of film by the melt-casting of the cellulose resin film composition, for example, the polymer layer may be formed continuously in the film forming process. Another method may be applied in which the cellulose resin film is once wound up after the film forming process, and the rolled film is unwound and the polymer layer is coated and dried thereon, and then the coated layer is stretched and dried together with the cellulose resin film in a stretching process using a tenter. The melt-casting process and the polymer layer forming and stretching process are preferably performed separately from the view point of the freeness of the production and the quality grantee.

Furthermore, a method can be also applied in which the polymer layer is formed by coating on another support and the coated layer is transferred using an adhesive onto the cellulose resin film of the invention formed by melt-casting method.

The thickness of the polymer layer according to the invention is preferably from 1 to 20 μm. The desired retarding property is difficultly given to the film when the thickness is less than 1 μm. When the thickness is more than 20 μm, the thickness is made too large so that the easiness of handling is degraded by occurrence of cracks and breaking. The thickness of the polymer layer is preferably not more than 15 μm, more preferably not more than 12 μm and particularly from 2 to 10 μm, for thinning and giving the objective retarding property.

As the polymer to be employed to the polymer layer, a solid polymer having heat resistivity and capable of forming a layer excellent in the light transparence having a light transparency of not less than 75%, particularly not less than 85%, is preferable. In the invention, one or a mixture of two or more of poly(ether ketone), particularly poly(aryl ether ketone), polyamide, polyester, polyimide, polyamidoimide and polyesterimide is preferably employable.

Concrete examples of the poly(ether ketone), particularly poly(arylether ketone) include ones having the repeating unit represented by the following Formula 1 (Japanese Patent O.P.I. Publication No. 2001-49110).

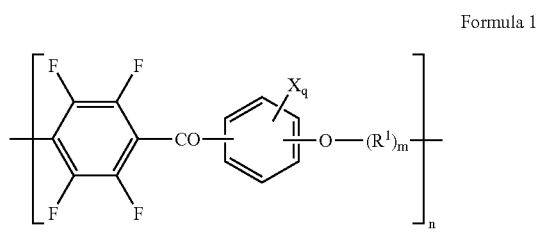

Formula 1

In the above Formula 1, X is a halogen atom, an alkyl group or an alkoxyl group, and the number q of the X bonded to the benzene ring, namely the substituted number of hydrogen atom at the remaining sites of the benzene ring other than the sites where the p-tetrafluorobenzoylene group and the oxyalkylene group are each bonded, is an integer of from 0 to 4. $R^1$ is a group represented by the following Formula 2, and m is an integer of from 0 or 2. n is polymerization degree which is preferably from 2 to 5,000, and particularly preferably from 5 to 500.

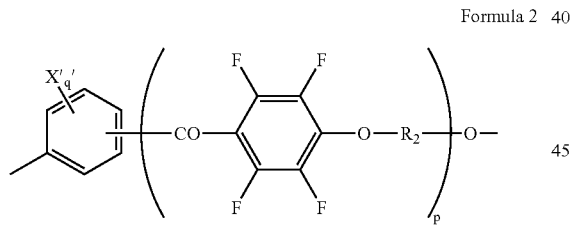

Formula 2

The halogen atom represented by X in Formula 1 is a fluorine atom, a bromide atom or an iodine atom, for example, and the fluorine atom is preferred. Examples of the alkyl group include a straight- or branched-chain alkyl group having 1 to 6, particularly 1 to 4 carbon atoms such as a methyl group, an ethyl group, a propyl group, an isopropyl group and a butyl group. Among them, the methyl group, ethyl group, and a halogenoalkyl group derived from them such as a trifluoromethyl group is preferable.

As the alkoxyl group, a straight- or branched-chain alkoxyl group having 1 to 5, particularly 1 to 4, carbon atoms such as a methoxy group, an ethoxy group, a propoxy group, an isopropoxy group and butoxy group are cited and the methoxy group, ethoxy group, and a halogenoalkoxy group such as a trifluoromethoxy group are preferred. In the above particularly preferred X is a fluorine atom.

In the group represented by Formula 2, X' is a halogen atom, an alkyl group or an alkoxy group, and the bonding number q' of the X' bonded to the benzene ring is an integer of from 0 to 4. The halogen atom, alkyl group and alkoxy group represented by X' are each the same as those represented by X.

Preferable X' is a fluorine atom, a methyl group, an ethyl group or a halogenoalkyl group derived from them such as trifluoromethyl group, or a methoxy group, an ethoxy group, or a halogenoalkoxy group such as trifluoromethoxy group, and the fluorine atom is preferred.

In Formula 1, X and X' may be the same or different. In Formulas 1 or 2, when q or q' is 2 or more, two or more of X or X' may be independently the same or different.

The particularly preferred group represented by R' is a group represented by Formula 3.

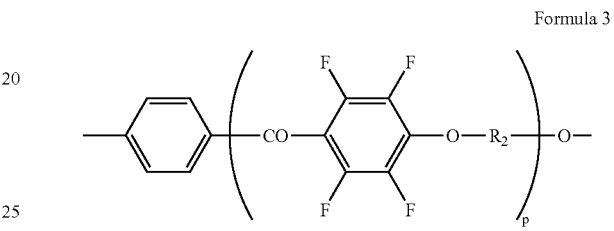

Formula 3

In the Formula 2 or 3, $R^2$ is a di-valent aromatic group, and p is 0 or 1. Examples of the di-valent aromatic group include an o-, m- or p-phenylene group, a naphthalene group, a biphenyl group, an anthracene group, an o-, m- or p-terphenyl group, a phenanthrene group, a dibenzofuran group, a biphenyl ether group, a biphenylsulfonyl group, and a di-valent aromatic group represented by the following formulas. In the di-valent group, the hydrogen atoms directly bonded to the aromatic ring may be substituted by the foregoing halogen atom, alkyl group or alkoxy group.

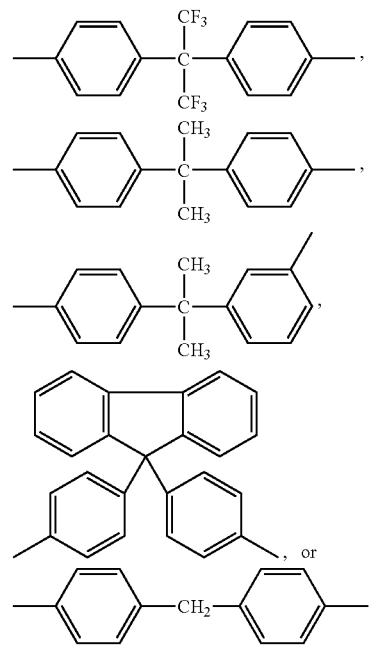

In the above, preferably di-valent aromatic group $R^2$ is one represented by the following formulas.

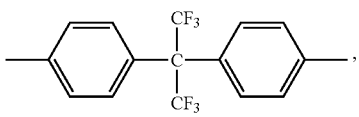

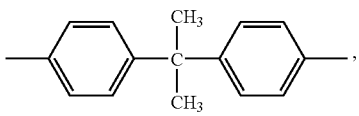

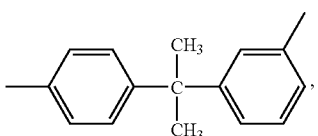

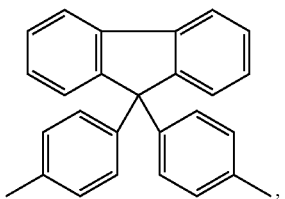

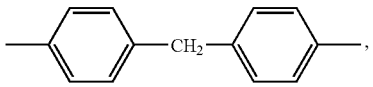

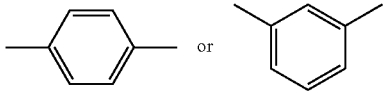 or

The poly(ether ketone) represented by Formula 1 may be constituted by the same repeating units or two or more kinds of repeating unit. In the later case, the repeating units may be in a blocked state or random state.

On the above premises, preferred ones represented by the poly(arylether ketone) represented by Formula 1 are those represented by the following Formula 4.

Formula 4

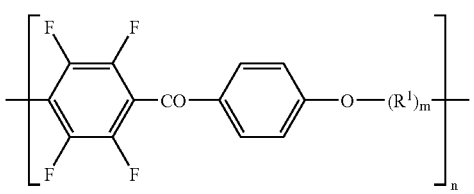

Preferable poly(arylether ketone) including the terminal group of the molecule is those represented by the following Formula 5 corresponding to Formula 1, or those represented by Formula 4 corresponding to Formula 6. In these compounds, the fluorine atoms are bonded to the p-tetrafluorobenzoylene group side and hydrogen atoms are bonded to the oxyalkylene group side.

Formula 5

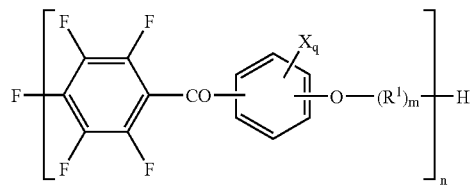

Formula 6

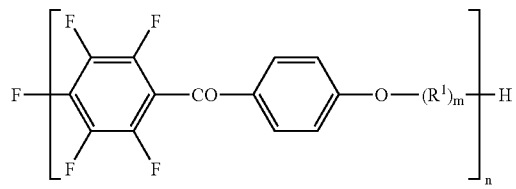

As concrete examples of the above-described polyamide or the polyester, ones having a repeating represented by the following Formula 7 can be cited.

Formula 7

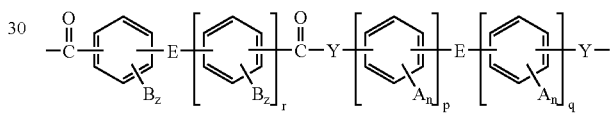

In Formula 7, B is a halogen atom, an alkyl group having 1 to 3 carbon atoms or halogenized group thereof, a phenyl group substituted by one or more kinds of the above groups or an unsubstituted phenyl group. z is an integer f from 0 to 3.

E is a covalent bond, an alkyl group having 1 to 3 carbon atoms or halogenized group thereof, a $CH_2$ group, a $C(CX_3)_2$ group, a CO group, an O atom, an S atom, an $SO_2$ group, an $Si(R)_2$ group or an NR group. X in the foregoing $C(CX_3)_2$ group is a hydrogen atom or a halogen atom, and R in the $Si(R)_2$ group and the NR group is an alkyl group having from 1 to 3 carbon atoms or a halogenized group thereof. E exists at the meta- or para-position regarding the carbonyl group or the group represented by Y. The halogen atom is a fluorine atom, a chlorine atom, an iodine atom or a bromide atom the same as that in Formula 7.

Y is an O atom or an NH group. A is a hydrogen atom, a halogen atom, an alkyl group having from 1 to 3 carbon atoms or a halogenized group thereof, an nitro group, a cyano group, a thioalkyl group having from 1 to 3 carbon atoms, an alkoxy group having from 1 to 3 carbon atoms or a halogenized group thereof, an alkylester group having from 1 to 9 carbon atoms, an arylester group having from 1 to 12 carbon atom or a substituted derivative thereof, or an arylamido group having from 1 to 12 carbon atom or a substituted derivative thereof.

n is an integer of from 0 to 4, p is an integer of from 1 to 3, q is an integer of from 1 to 3, and r is an integer of from 0 to 3. The preferable polyamide or polyester is ones each having the repeating unit represented by the following Formula 8 in which r and q are each 1 and at least one of the biphenyl rings is substituted at the 2- and 2'-positions.

Formula 8

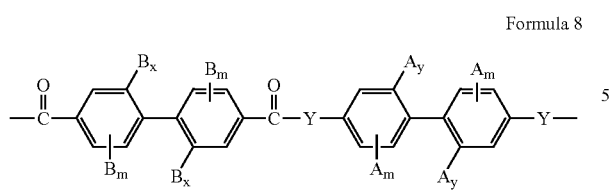

In Formula 8, m is an integer of from 0 to 3, and preferably 1 or 2, x and y are each 0 or 1, provided that they are not 0 at the same time. The other symbols are the same as those in Formula 7, and E is a covalent bond being at the para-position regarding the carbonyl group or the group represented by Y.

In Formulas 7 and 8, each of plural B, E, Y or A may be the same or different when a plurality of each of them is contained in the molecule. Each of plural z, n, m, x, or y may be also the same or different. In such the case, B, E, Y, A, z, n, m, x and y are each independently decided.

The polyamide or the polyester represented by Formula 7 each may be one constituted by the same repeating units or two or more kinds of repeating unit. In the later case, the repeating units may be in a blocked state or random state.

Concrete examples of the polyimide include a condensed polymer of 9,9-bis(aminoaryl)fluolene and an aromatic tetra-carboxylic acid anhydride, and one having one or more repeating units represented by Formula 9 can be cited.

Formula 9

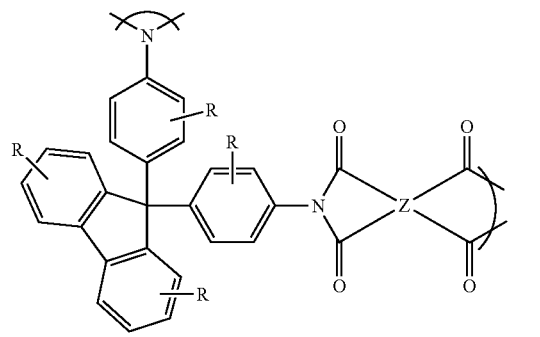

In Formula 9, R is a hydrogen atom, a halogen atom, a phenyl group or a phenyl group substituted by 1 to 4 halogen atoms or an alkyl group having 1 to 10 carbon atoms. The four Rs can be independently decided and one to four thereof can be substituted. Though the substituent is preferably the foregoing ones, different one may be partially contained. The halogen is a fluorine atom, a chlorine atom, an iodine atom or a bromine atom the same that in Formula 9.

Z is a tri-substituted aromatic group having 6 to 20 carbon atoms. The preferable groups represented by Z are a polycyclic aromatic group such as pyromeritylene group, a naphthylene group, a fluorenylene group, a benzofluorenylene group and anthracenylene group and derivatives thereof and the groups represented by the following Formula 10. A halogen atom and alkyl group having 1 to 10 carbon atoms and flu-orinated group thereof are applicable for the substituent in the foregoing derivatives of the polycyclic aromatic group.

Formula 10

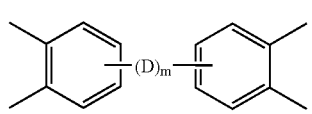

In Formula 10, D is a covalent bond, a $C(R^2)_2$ group, a CO group, an O atom, an S atom, an $SO_2$ group, an $Si(C_2H_5)_2$ group, an $N(R^3)_2$ group or a combination thereof, m is an integer of from 1 to 10. $R^2$s are each independently a hydrogen atom or a $C(R^4)_3$ group. $R^3$s are each independently a hydrogen atom, an alkyl group having 1 to about 20 carbon atoms or an aryl group having 6 to about 20 carbon atoms. $R^4$s are each independently a hydrogen atom, a fluorine atom or a chlorine atom.

As the polyimide other than the above, ones having a unit represented by Formula 11 or 12 can be cited. Polyimide having a unit represented by Formula 13 is preferable.

Formula 11

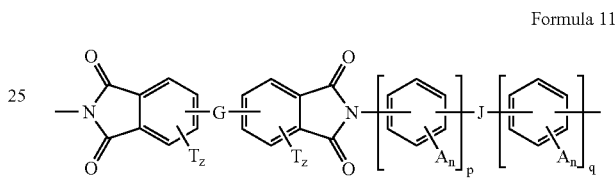

Formula 12

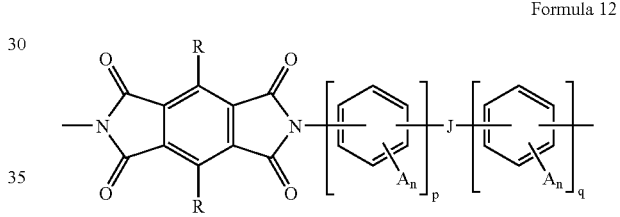

Formula 13

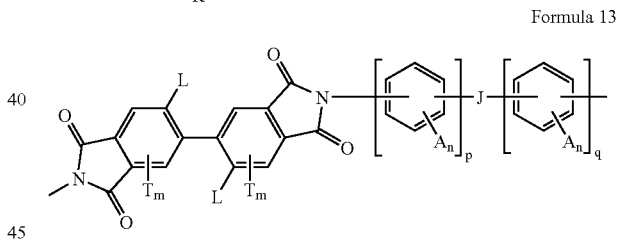

In Formulas 11, 12 and 13, T and L are each a halogen atom, an alkyl group having 1 to 3 carbon atoms or a halogenized group thereof, a phenyl group substituted by one or more of the above groups, or an unsubstituted phenyl group. The halogen atom is a fluorine atom, a chlorine atom, an iodine atom or a bromine atom the same that in Formulas 11, 12 and 13.

G and J are each a covalent bond, a linking bonding, a $CH_2$ group, a $C(CX_3)_2$, a CO group, an o atom, an S atom, an $SO_2$ group, an $Si(C_2H_5)_2$ group or an $N(CH_3)$ group. X in the $C(CX_3)_2$ group is a hydrogen atom or a halogen atom (it is the same in Formula 11, 12 and 13).

A is a hydrogen atom, a halogen atom, an alkyl group or a halogenized group thereof, a nitro group, a cyano group, a thioalkyl group, an alkoxy group or a halogenized group thereof, an aryl group or a halogenized group thereof, or an alkylester group of a derivative thereof.

R is a hydrogen atom, a halogen atom, a phenyl group or a substituted phenyl group such as a halogenized phenyl group, or an alkyl group or a substituted alkyl group such as a halogenized alkyl group. n is an integer of from 0 to 4, p is an integer of from 0 to 3 and q is an integer of from 1 to 3.

In Formulas 11, 12 and 13, plural T, A, R or L each may be the same or different when a plurality of each of them is independently present in the molecule. z, n, m may be also the same or different. T, A, R, L, z, n and m are each independently decided.

The polyimide represented by Formula 11, 12 or 13 may be constituted by the same repeating units or two or more kinds of repeating units different from each other. The different repeating unit may be one formed by copolymerizing an acid dianhydride other than the above-described or/and one or more kinds of diamine. The diamine is preferably an aromatic diamine. When the later different repeating units are contained, they may be in a blocked state or in a random state.

Examples of the acid dianhydride for constituting the different repeating unit include pyromeritic dianhydride, 3,6-diphenylpyromeritic dianhydride, 3,6-bis(trifluoromethyl) pyromeritic dianhydride, 3,6-dibromopyromeritic dianhydride, 3,6-dichloropyromeritic dianhydride, 3,3',4,4'-benzophenonetetracarboxylic dianhydride, 2,3,3',4'-benzophenonetetracarboxylic dianhydride, 2,2',3,3'-benzophenonetetracarboxylic dianhydride, 3,3',4,4'-biphenylcarboxylic dianhydride and bis(2,3-dicarbophenyl) methane dianhydride.

Furthermore, bis(2,5,6-trifluoro-3,4-dicarboxylphenyl) methane dianhydride, 2,2-bis(3,4-dicarboxylphenyl)-1,1,1,3,3-hexafluoropropane dianhydride, bis(3,4-dicarboxyphenyl)ether dianhydride (4,4'-oxydiphtalic anhydride), bis(3,4-dicarboxyphenyl)sulfone dianhydride (3,3',4,4'-diphenylsulfonetetracarboxylic anhydride) and 4,4'-[4,4'-isopropylidene-di(p-phenyleneoxy)]bis(phthalic anhydride) are cited as the examples of the acid dianhydride.

Preferably usable acid dianhydride is a 2,2'-substituted dianhydride such as 2,2'-bromo-4,4',5,5'-biphenyl-tetracarboxylic dianhydride, 2,2'-dichloro-4,4',5,5'-biphenyltetracarboxylic dianhydride and 2,2'-trihalo-substituted dianhydride, and 2,2-bis(trifluoromethyl)-4,4',5,5'-biphenyltetracarboxylic dianhydride is particularly preferable.

Examples of the diamine for constituting the different repeating unit include a benzenediamine such as o-, m- and p-phenylenediamine, 2,4-diaminotoluene, 1,4-diamino-2-methoxybenzene, 1,4-diamono-2-phenylbenzene and 1,3-diamino-4-chlorobenzene, and 4,4'-diaminodiphenyl, 4,4-diamino-diphenylmethane, 2,2-bis(4-aminophenyl)propane, 2,2-bis(4-aminophenyl)-1,1,1,3,3,3-hexafluoropropane, 4,4'-diaminodiphenyl ether, 3,4'-diaminodiphenyl ether, 1,3-bis(3-aminophenoxy)benzene, 1,3-bis(4-aminophenoxy)-benzene and 1,4-bis(4-aminophenoxy)benzene.

4,4'-bis(4-aminophenoxy)biphenyl, 4,4'-bis(3-aminophenoxy)biphenyl, 2,2-bis(4-(aminophenoxy)phenyl)-propane, 2,2-bis[4-(4-aminophenoxy)phenyl]-1,1,1,3,3,3-hexafluoropropane, 4,4'-diaminodiphenyl thioether, 4,4'-diaminodiphenylsulfone, 2,2'-diaminopenzophenone, 3,3'-diaminopnezophenone, a naphthalenediamine such as 1,8-diaminonaphthalene and 1,5-diaminonaphthalene, and a heterocyclic aromatic diamine such as 2,6-diaminopyridine, 2,4-diaminopyridine and 2,4-diamino-s-triazine are also cited as the example of the diamine.

Preferably usable polyimide is a heat resistive and solvent-soluble polyamine derived from the aromatic diamine such as 2',2'-bis(3,4-dicarboxyphenyl)hexafluoropropane dianhydride, 4,4'-bis(3,4-dicarboxyphenyl)-2,2-diphenyl-propane dianhydride, naphthalenetetracarboxylic dianhydride and bis (3,4-dicarboxyphenyl)sulfone dianhydride.

A heat resistive and solvent-soluble polyamines derived from an aromatic diamine such as 4,4-(9-fluorenylidene)-dianiline, 2,2'-bis(trifluoromethyl)-4,4'-diaminobiphenyl, 3,3'-dichloro-4,4'-diaminodiphenylmethane, 2,2'-dichloro-4,4'-diaminobiphenyl, 2,2',5,5'-tetrachlorobenzidine, 2,2-bis (4-aminophenoxyphenyl)propane, 2,2-bis(4-amino-phenoxyphenyl)heaxafluoropropane, 1,4-bis(4-aminophenoxy)-benzene and 1,3-bis(3-aminophenoxy)benzne is preferably usable.

The above-mentioned polyamideimide or polyesterimide is not specifically limited, and one kind or not less than two kinds is/are appropriately used. Of these, polyamideimide described in Japanese Patent O.P.I. Publication No. 61-162512, and polyesterimide described in Japanese Patent O.P.I. Publication No. 64-38472 are preferably employed.

Though the molecular weight of the solid polymer for forming the polymer layer is not specifically limited, it is preferable that the polymer is soluble in a solvent. A weight average molecular weight of from 10,000 to 1,000,000 is preferable, and more preferably from 20,000 to 500,000, particularly preferably from 50,000 to 200,000 from the viewpoint of the precision of the thickness of the coated layer, the precision and the smoothness of the surface, the strength of the layer, the preventing ability to occurrence of cracks caused by the expansion and contraction of the film and the solubility in the solvent (for preventing gelation). The weight average molecular weight is a value measured by gel permeation chromatography (GPC) using poly(ethylene oxide) as a standard sample.

The foregoing solid polymer such as poly(aryletherketone), polyamide, polyester and polyimide may be employed solely or in a state of mixture of two or more of the same kind for forming the polymer layer. Two or more kinds of the polymer each having different functional group such as poly (arylether ketone) and polyamide may be also employed in a mixed state.

One or more kinds of suitable polymer other than the foregoing polymer may be employed with together within the range in which the orientation ability of the foregoing solid polymer is not considerably lowered. Examples of the polymer usable in combination include thermoplastic resins such as polyethylene, polypropylene, polystyrene, poly(methyl methacrylate), ABS resin, AS resin, polyacetate, polycarbonate, polyamide, poly(ethylene terephthalate), poly(butylene terephthalate), poly(phenylene sulfide), poly(ether sulfone), polyketone, polyimide, poly(cyclohexanedimethanol terephthalate), polyallylate and a liquid crystal polymer (including a photo-polymerizable liquid crystal monomer)

A thermal curable resin such as epoxy resin, phenol resin and novolac resin can be cited as the above resin for using in combination. Though the adding amount of the resin for combination use is not specifically limited as long as the orientating ability is not considerably lowered, the amount is usually not more than 50%, preferably not more than 40%, and particularly preferably not more than 30%, by weight.

For liquefying the solid polymer for constituting the polymer layer, a suitable method such as a method by thermally melting the solid resin when the resin is thermoplastic and a method by dissolving the solid resin in a solvent can be applied. Consequently, the solidification of the polymer layer can be performed by cooling the polymer layer in the former case of the molten liquid or drying by removing the solvent in the later case of the solution. Various additives such as a stabilizer, a plasticizer and a metal can be added according to necessity.

The drying after coating of the polymer layer can be carried out by natural drying (wind drying) and a heat drying, usually by hot air, infrared rays, a heating roller and microwave heating. Hot air is preferably applied form the simplicity thereof. It is preferable considering the stretching temperature by the tenter in next process that the drying temperature is gradually raised by 3 to 5 steps within the range of from 40 to 180° C., and more preferably from 80 to 170° C. for raising the physical property of the polymer such as the anti-damaging ability and the dimension stability layer.

As the solvent, halogenized hydrocarbons such as chloroform, dichloromethane, carbon tetrachloride, dichloroethane, trichloroethylene, tetrachloroethylene, chlorobenzene and orthodichlorobenzene, phenols such as phenol and parachlorophenol, aromatic hydrocarbons such as benzene, toluene, xylene, methoxybenzene and 1,2-dimethoxybenzene, ketones such as acetone, methyl ethyl ketone, methyl isobutyl ketone, cyclohexanone, cyclopentanone, 2-pyrrolidone and N-methyl-2-pyrrolidone, and esters such as ethyl acetate and butyl acetate are usable.

Furthermore, alcohols such as t-butyl alcohol, ethylene glycol, triethylene glycol, ethylene glycol monomethyl ether, Diethylene glycol dimethyl ether, propylene glycol, dipropylene glycol and 2-methyl-2,4-pentanediol, amides such as dimethylformamide and dimethylacetamide, nitrites such as acetonitrile and butylonitryl, ethers such as diethyl ether, dibutyl ether and tetrahydrofuran, and methylene chloride, carbon disulfide and ethyl cellosolve are cited as the examples of the solvent.

The solvent may be employed solely or in a suitable combination of two or more kinds thereof. The solution is preferably constituted by from 2 to 100 parts, preferably from 5 to 50 parts, particularly from 10 to 40 parts, by weight of the solid polymer dissolved in 100 parts of the solvent.

A suitable film forming method such as a casting method such as a spin coating method, a roller coating method, a flow coating method, a printing method, a dipping coating method, a casting film forming method, a bar coating method and a gravure printing method and a extrusion method can be applied. Among them the solution film forming method such as the casting method is preferably applied for mass production of the film lowered in the ununiformity of the thickness and the orientation.

The polymer layer is formed by coating the polymer solution prepared by dissolving the polymer in the solvent on the support and then subjected to the following stretching treatment together with the support. The stretching treatment is preferably carried out by the tenters. The polymer layer supported by the support film can be treated with high production efficiency and precision of the treatment, and continuous production can be performed by such the method.

(Cellulose Resin)

The support of the polymer layer relating to the invention is characterized that the support is produced by melt-casting the composition containing cellulose resin in which the amount of sulfuric acid remaining in the cellulose resin is from 0.1 to 50 ppm.

The cellulose resin film of the invention is produced by the melt-casting method so that the using amount of the organic solvent can be considerably reduced. Therefore, the film largely improved in the environmental suitability can be obtained compared with the solution casting method using large amount of the organic solvent.

The melt-casting method in the invention is a film forming method using the cellulose resin molten substantially not using any solvent by heating by a temperature, at which the cellulose resin shows fluidity, the molten resin is extruded through a die to form the film, for example.

The cellulose resin includes cellulose ester, cellulose ester blended with another resin and one modified by copolymerization. Among them, cellulose ester is preferred. Cellulose ester to be used in the invention is described below.

Cellulose ester constituting the optical film is not specifically limited as long as the cellulose ester is capable of forming film by the melt-casting, and an aromatic carboxylic acid ester can be employed. However, the use of a low carboxylic acid ester of cellulose is preferable considering the properties of resultant optical film such as optical characteristics. In the invention, the lower carboxylic acid of the lower carboxylic acid ester of cellulose is a carboxylic acid having 5 or less carbon atoms. Cellulose acetate, cellulose propionate, cellulose butylate and cellulose pivalate are cited as examples of preferable lower carboxylic acid cellulose ester. A mixed fatty acid ester such as cellulose acetate propionate, cellulose acetate propionate butylate, cellulose propionate butylate and cellulose acetate butylate is preferable for making compatibility of the mechanical properties with the suitability for melt-casting film formation.

Consequently, the most preferable cellulose lower fatty acid ester is one having an acyl group having 2 to 5 carbon atoms, in which the substituting degree X by acetic acid or the substituting degree of acetyl group and the substituting degree Y by the organic acid having 3 to 5 carbon atoms, particularly an acyl group introduced from an aliphatic organic acid such as a propionyl group or butylyl group satisfy the following Formulas 2 and 3.

$$2.0 \leq X+Y \leq 2.9 \qquad \text{Formula 2}$$

$$0.1 \leq Y \leq 2.0 \qquad \text{Formula 3}$$

Of these, cellulose acetate propionate is particularly preferably employed. Of them, it is preferable to use cellulose esters satisfying the following formulas.

$$2.5 \leq X+Y \leq 2.9, 1.5 \leq X \leq 2.5, \text{and } 0.5 \leq Y \leq 1.0$$

The portion which is not substituted with an acyl group is present as a hydroxyl group. It is possible to synthesize the above cellulose esters employing commonly known methods.

Preferably employed is a cellulose ester in which the total acyl substitution degree at the 2-, 3- and 6-position per a glucose unit of the cellulose ester is in the range of 2.0-2.9, and the average substitution degree of an acyl group at 6-position in average substitution degree is 0.5-0.9.

The ratio of weight average molecular weight, Mw/number average molecular weight Mn, of cellulose resins employed in the present invention is commonly 1.0-5.5, is preferably 1.4-5.0, but is most preferably 2.0-3.0. Further, Mw of the cellulose resins is commonly 100,000-500.000 but is preferably 200,000-400,000.

The average molecular weight and its distribution can be measured by known method using a high speed liquid chromatography. The number average molecular weight and the weight average molecular weight are calculated from the above measured results.

The measuring conditions were as follows.
Solvent: Methylene chloride
Column: Shodex K806, K805 and K803 (Showa Denko Co., Ltd.) were connected for measurement.
Sample concentration: 0.1% by weight
Detector: RI Model 504 (GL Science Co., Ltd.)
Pump: L6000 (Hitachi Seisakusho Co., Ltd.)
Flowing amount: 10 ml/min
Calibration curve: A calibration curve prepared by using thirteen standard samples of Mw of from 500 to 1,000,000 was employed. It is preferable that the intervals of the Mw of each of the samples are approximately equal.

The raw cellulose of the cellulose ester to be employed in the invention may be wood pulp or cotton linter. Though the wood pulp may be coniferous tree pulp or broad-leaved tree pulp, and the coniferous tree pulp is preferable. The cotton linter is preferably employed from the viewpoint of the peeling ability on the occasion of film making. Cellulose ester made from these pulps may be employed solely or in suitably mixing state.

The cellulose ester derived from the cotton linter, that derived from the coniferous tree pulp and that derived from the broad-leaved tree pulp can be employed in a ratio of 100:0:0, 90:10:0, 85:15:0, 50:50:0, 20:80:0, 10:90:0, 0:100:0, 0:0:100, 80:10:10, 85:0:15 and 40:30:30, for example.

It is possible to prepare cellulose resins by replacing the hydroxyl group of cellulose raw materials with an acetyl group, an propionyl group, and/or a butyl group, employing acetic anhydride, propionic anhydride, and/or butyric anhydride based on conventional methods. Synthesis methods of such cellulose resins are not particularly limited, and it is possible to synthesize them with reference to, for example, Japanese Patent O.P.I. Publication No. 10-45804 or Published Japanese translation of PCT international Publication No. 6-501040. Or, cellulose resins described in Japanese Patent O.P.I. Publication No. 2005-281645 may be used.

It is possible to determine the degree of substitution of the acetyl group, propionyl group, and butyl group based on ASTM-D817-96.

The cellulose ester is industrially synthesized using sulfuric acid as a catalyst, and the sulfuric acid is not completely removed. The content of the remaining sulfuric acid in the cellulose ester to be used in the invention is from 0.1 to 50 ppm in terms of elemental sulfur since the remaining sulfuric acid causes various decomposing reactions on the occasion of the melt-casting so that the quality of the film is influenced. It is supposed that the sulfuric acid is contained in a state of salt. A content of sulfuric acid of not more than 45 ppm is preferable since the adhering matter on the lip portion of die is reduced, and breaking on the occasion of stretching or slitting after the stretching is difficultly caused. The smaller amount of the remaining sulfuric acid is preferable, but the amount of less than 0.1 ppm is not preferable because the load to the washing process for the cellulose ester is made too large and the film becomes easily broken. Such the phenomenon may be caused by increasing the washing time though the reason is not cleared yet. A content of from 0.1 to 30 ppm is more preferable. It is also possible to determine the content of the remaining sulfuric acid based on the following measuring method.

(Measuring Method of Residual Sulfuric Acid Content)
<Pre-Treatment>

A weighed sample of 500 mg (M) is placed in a polypropylene vessel, and ultrapure water of 10 ml is added into it. After the above is dispersed by an ultrasonic cleaner for 30 minutes, it is filtrated with a water-based chrimatodisc (0.45 μm) to prepare a sample.

(Quantitative Determination of $SO_4$)
<Apparatus> Ionchromatography DX-120 produced by DIONEX
<Column> IonPac AG14(4 mm)+IonPac AS14(4 mm)
<Suppressor> ASRS-ULTRAII (4 mm)
<Eluting solution> 3.5 mM-$Na_2CO_3$ 1.0 mM-$NaHCO_3$
<SRS current> 50 mA
<Flow rate> 1.0 ml/min
<Dose> 25 μm
<Conversion method>

Content(ppm)=measured value (mg/1)/1000×10/M (mg)×1000000

The content of the remaining sulfuric acid can be made to within the above range by further sufficiently washing the synthesized cellulose ester compared with that for the solution casting. By such the treatment, the matter adhering to the lip portion can be reduced on the occasion of the melt-casting, and the film superior in the flatness, dimension stability, mechanical strength, transparency, moisture shielding ability, and the later-mentioned Rt value and Ro value can be obtained.

The cellulose ester to be used in the invention is preferably one causing small number of bright spot foreign substance in the film. The bright spot foreign substance is a spot through where light from the light source shines when the cellulose ester film is placed between a pair of polarizing palates positioned in cross nicol state and light is irradiated to one side of them from a light source and the cellulose ester film is observed. For such the evaluation, the polarization plate is preferably one using a protective film having no bright spot foreign substance, and one using a glass plate for the protecting the polarization plate is preferred. It is supposed that the non acetated or low acetated cellulose contained in the cellulose is one of causes of the bright spot foreign substance. The bright spot foreign substance can be eliminated by using cellulose ester containing small amount of bright spot foreign substance, by filtering the molten cellulose ester or by dissolving and filtering a solution of the cellulose ester on a later step in the course of synthesizing process or precipitation process.

The number of bright spot foreign substance tends to be decreased accompanied with reducing in the film thickness or in the content of the cellulose ester in the film, and the number of the bright spot foreign substance having a spot diameter of not less than 0.01 mm is preferably not more than 200/$cm^2$, preferably not more than 100/$cm^2$, preferably not more than 50/$cm^2$, more preferably not more than 30/$cm^2$, further preferably not more than 10/$cm^2$, and most preferably not at all.

When the bright spot foreign substance is removed by filtering the solution, the filtration of a composition containing a plasticizer, a degradation preventing agent and an antioxidant together with the cellulose ester is preferable in the bright spot foreign substance removing efficiency compared to the filtration of the simple solution of the cellulose ester. The bright spot foreign substance may be removed of course by dissolving the cellulose ester in a solvent and filtering the resultant solution in the course of the synthesizing the cellulose ester. On such the occasion, a UV absorbent and another additive can be suitably mixed before the filtration. The viscosity of the molten composition containing the cellulose ester to be filtered is preferably not more than 10,000 P, more preferably not more than 5,000 P, further preferably not more than 1,000 P, and particularly preferably not more than 500 P. As the material for the filter, known filtering material such as glass fiber, cellulose fiber, filter paper and fluoroester such as ethylene tetrafluoride can be preferably employed and ceramics and metal are particularly preferred. The absolute filtering accuracy of the filter to be used is preferably not more than 50 μm, more preferably not more than 30 μm, further preferably not more than 10 μm, and particularly preferably not more than 5 μm. These materials may be used in suitable combination. Though the filter may surface type or depth type, the depth type is preferable since which is relatively not blocked.

In another embodiment, cellulose ester which is at least once dissolved in a solvent and then dried may be employed. In such the case, cellulose ester is employed, which is dissolved in the solvent together with at least one of the plasticizer, UV absorbent, degradation preventing agent, antioxidant and matting agent and then dried. As the solvent, a good solvent usually used in the solution casting method such as methylene chloride, methyl acetate and dioxoran can be employed and a poor solvent such as methanol, ethanol and butanol may also be employed with together. The cellulose ester may be cooled by −20° C. or less or heated by 80° C. or more in the course of the dissolution. By the use of such the cellulose ester, the additives can be easily made uniform on the occasion of melting so that the uniform optical properties can be obtained.

(UV absorbent)

The UV absorbent relating to the invention is preferably one having a weight average molecular weight of from 490 to 50,000, and is preferably one having two or more benzotriazole skeletons. It is preferable that the UV absorbent contains a compound having a weight average molecular weight of from 490 to 2,000 and a compound having a weight average molecular weight of from 2,000 to 50,000.

The UV absorbent relating to the invention is described in detail below.

As the UV absorbent, ones excellent in the absorbing ability for UV rays of wavelength of less than 370 nm and having low absorption for visible rays of not less than 400 nm are preferable from the viewpoint of the degradation prevention of the polarizing plate and the displaying apparatus caused by UV rays, and from the viewpoint of displaying ability of the liquid crystal. For example, an oxybenzophenone type compound, a benzotriazole type compound, a salicylate type compound, a benzophenone type compound, a cyanoacrylate type compound, a triazine type compound and a nickel complex type compound are employable. The UV absorbents described in Japanese Patent O.P.I. Publication No. 10-182621 and Japanese Patent O.P.I. Publication No. 8-337574 and the polymer UV absorbents described in Japanese Patent O.P.I. Publication No. 6-148430 are also employable.

Among these UV absorbent, ones having a weight average molecular weight of from 490 to 50,000 are preferable for enhancing the effects of the invention. The UV absorbents having a molecular weight of not more than 490 are usually employed because the compatibility with the cellulose ester is lowered accompanied with increasing in the molecular weight. However, bleeding out of the UV absorbent to the film surface and coloring during the storage tend to occur when the molecular weight is not more than 490. When the molecular weight exceeds 50,000, the compatibility with the cellulose ester tends to be considerably lowered.

It is also preferable embodiment that the film contains a UV absorbent A having a weight average molecular weight of from 490 to less than 2,000 and a UV absorbent B having a weight average molecular weight of from 2,000 to 50,000. The combination use of UV absorbents different from each other in the molecular weight is preferable for enhancing the effects of the invention and improving the bleeding out and the compatibility. The mixing ratio of UV absorbent A and B is suitably selected from the range of from 1:99 to 99:1.

Preferable example of the UV absorbent having a weight average molecular weight within the preferable range of the invention and two or more UV absorbing skeletons include bisbenzotriazolyl-phenol compounds represented by the following Formula 14.

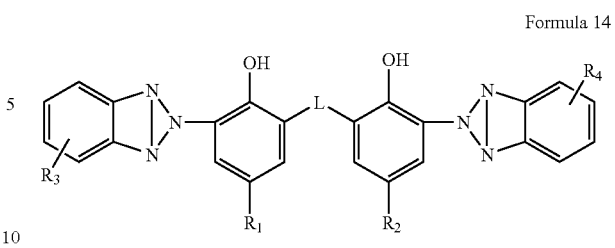

Formula 14

In the above formula, $R_1$ and $R_2$ are each a hydrogen atom, or a substituted or unsubstituted alkyl group having from 1 to 20 carbon atoms, $R_3$ and $R_4$ are each a hydrogen atom or a halogen atom, and L is an alkylene group having from 1 to 4 carbon atoms. The substituent of the alkyl group is, for example, a halogen atom such as a chlorine atom, a bromine atom a fluorine atom, a hydroxyl group and a phenyl group which may be substituted by an alkyl group or a halogen atom.

Concrete examples of the bisbenzotriazolephenol compound represented by Formula 14 include the followings. However, the compound is not limited to them.

1) RUVA-10/110 (Ootsuka Kagaku Co., Ltd.)
2) RUVA-206 (Ootsuka Kagaku Co., Ltd.)
3) Tinuvin-306 (Ciba Specialty Chemicals Co., Ltd.)
4) Adecastub LA-31 (Asahi Denka Co., Ltd.)
5) Adecastub LA-31RG (Asahi Denka Co., Ltd.)

Furthermore, it is preferable that at least one of the UV absorbents is a copolymer of a UV absorbing monomer having a mole absorption coefficient of not less than 4,000 at 380 nm and an ethylenic unsaturated monomer, and the ethylenic unsaturated monomer has a hydrophilic group.

In the invention, the optical compensation film improved in the foregoing problems can be obtained by adding the UV absorbing copolymer of the UV absorbing monomer having a mole absorption coefficient at 380 nm of not less than 4,000 and the ethylenic unsaturated monomer, and the copolymer has a weight average molecular weight of from 490 to 50,000.

The absorption coefficient at 380 nm of not less than 4,000 shows good UV absorption ability, and sufficient effect for cutting YV rays can be obtained. Therefore, the problem of yellow coloring of the optical compensation film is improved and the transparency of the film itself is raised.

The mole absorption coefficient at 380 nm of the UV absorbing monomer to be used for the UV absorbing copolymer is not less than 4,000, preferably mot less than 8,000, and more preferably not less than 10,000. When the mole absorption coefficient at 380 nm is less than 4,000, large amount of the UV absorbent is necessary for obtaining the desired UV absorbing ability. As a result of that, the transparency of the film is considerably decreased by increasing of the haze and the bleeding out of the UV absorbent, and the strength of the film tends to be reduced.

The ratio of the mole absorption at 380 to that at 400 nm in the UV absorbing monomer to be employed in the UV absorbing copolymer is preferably not less than 20.

In the invention, it is preferable that the copolymer contains a UV absorbing monomer capable of absorbing UV rays as strong as possible and inhibited in the absorption near 400 nm.

a. UV Absorbing Monomer

The UV absorbing monomer (UV absorbent) preferably has one having the ratio of the mole absorption coefficient at 380 nm is not less than 4,000, and the ratio of a absorption coefficient at 380 nm to that at 400 nm of not less than 20.

As examples of the UV absorbing monomer the followings are known; a salicylic acid type UV absorbent such as phenyl salicylate and p-tert-butyl salicylate, a benzophenone type UV absorbent such as 2,4-dihydroxybenzophenone and 2,2'-dihydroxy-4,4'-dimethoxybenzophenone, a benzotriazole type UV absorbent such as 2-(2'-hydroxy-3'-tert-butyl-5'-methylphenyl)-5-chlorobenzotriazole, 2-(2'-hydroxy-3,5-di-tert-butylphenyl)-5'-chlorobenzotriazole and 2-(2'-hydroxy-3,5-di-tert-amyl-phenyl)benzotriazole, a cyanoacrylate type UV absorbent such as 2'-ethylhexyl-2-cyano-3,3'-diphenyl acrylate and ethyl-2-cyano-3-(3',4'-methylenedioxyphenyl) acrylate, a triazine type UV absorbent such as 2-2'-hydroxy-4'-hexyloxyphenyl)-4,6-diphenyltriazine, and the compounds described in Japanese Patent O.P.I. Publication Nos. 58-185677 and 59-149350.

Suitable skeletons are selected from the above-described various types of known UV absorbent, and a substituent containing the ethylenic unsaturated bond is introduced to each of the skeletons of polymerizable compounds. Ones having an absorption coefficient at 380 nm of not less than 4,000 are preferably selected as the UV absorbent monomer to be used in the invention. The UV absorbing monomer in the invention is preferably benzotriazole type compounds from the view point of the storing stability. Particularly preferable compounds are represented by Formula 15.

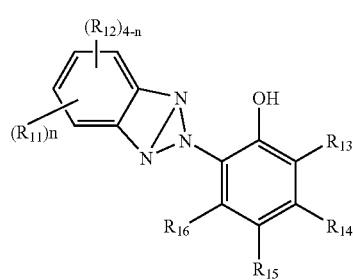

Formula 15

In Formula 15, the substituents represented by $R_{11}$ through $R_{16}$ each may have a substituent as long as no specific limitation is noted.

In Formula 15, any one of groups represented by $R_{11}$ through $R_{16}$ has a polymerizable group represented by the above-described group as the partial structure.

In the formula, L is a di-valent linking group or a simple bond, and $R_1$ is a hydrogen atom or an alkyl group. $R_1$ is preferably a hydrogen atom or an alkyl group having from 1 to 4 carbon atoms. The foregoing group containing the polymerizable group may be any one of the groups represented by $R_{11}$ through $R_{16}$, among them $R_{11}$, $R_{13}$, $R_{14}$ or $R_{15}$ is preferable and $R_{14}$ is particularly preferable.

In Formula 15, $R_{11}$ is a halogen atom, an oxygen atom, a nitrogen atom or a group substituting on the benzene ring through a sulfur atom. The halogen atom includes a fluorine atom, a chlorine atom and a bromide atom, and the chlorine atom is preferable.

Examples of the group substituting on the benzene ring through an oxygen atom include a hydroxyl group, an alkoxy group such as a methoxy group, an ethoxy group, a t-butoxy group and a 2-ethoxyethoxy group, an aryloxy group such as a phenoxy group, a 2,4-di-t-amylphenoxy group and a 4-(4-hydroxyphenyl-sulfonyl)phenoxy group, a heterocyclic oxy group such as a 4-pyridyloxy group and 2-hexahydropyranyloxy group, a carbonyloxy group, for example, an alkoxycarbonyloxy group such as an acetyloxy group, a trifluoroacetyloxy group and a pivaloyloxy group, an aryloxy group such as a benzoyloxy group and a pentafluorobenzoyloxy group, a urethane group, for example, an alkylurethane group such as an N,N-dimethylurethane, and an aryl urethane group such as an N-phenylurethane and an N-(p-cyanophenyl)urethane group, a sulfonyloxy group, for example, an alkylsulfonyl group such as a methanesulfonyl group, a trifluoromethane-sulfonyloxy group and an n-dodecane-sulfonyloxy group, and an arylsoufonyloxy group such as a benzenesulfonyloxy group and a p-toluenesulfonyloxy group. Among them, an alkoxy group having from 1 to 6, particularly from 2 to 4, carbon atoms is preferable.

Examples of the group substituting on the benzene ring through a nitrogen atom include a nitro group, an amino group, such as an alkylamino group, for example, a dimethylamino group, a cyclohexylamino group and an n-dodecylamino group, and an arylamino group, for example, an anilino group and a p-t-octylanilino group, a sulfonylamino group such as an alkylsulfonylamino group, for example, a methanesupfonylamino group, a heptafluoropropanesulfonylamino group and a hexadecylsulfonylamino group, and an arylsulfonylamino group such as a p-toluenesulfonylamino group and pentafluorobenzene-sulfonylamino group, a sulfamoylamino group such as an alkylsulfaoylamino group, for example, an N,N-dimethylsulfamoylamino group, and an arylsulfamoylamino group, for example, an N-phenylsulfamoyl group, an acylamino group such as an alkylcarbonylamino group, for example, an acetylamino group and a mystoylamino group, and an arylcarbonylamino group, for example, a benzoylamino group, and a ureido group such as an alkylureido group, for example, an N,N-dimethylaminoureido group, and an arylureido group, for example, an N-phenylureido group and an N-(p-cyanophenyl)-ureido group. The acylamino groups are preferable.

Examples of the group substituting on the benzene ring through a sulfur atom include an alkylthio group such as a methylthio group and a tpoctylthio group, an arylthio group such as a phenylthio group, a heterocyclic thio group such as a 1-phenyltetrazole-5-thio group and a 5-methyl-1,3,4-oxadiazole-2-thio group, a sulfinyl group such as an alkylsulfinyl group, for example, a methanesulfinyl group and a trifluoromethanesulfinyl group, and an arylsulfinyl group, for example, a p-toluenesulfinyl group, sulfonyl group such as an alkylsulfonyl group, for example, a methanesulfonyl group and a trifluoromethanesulfonyl group, and an arylsulfonyl group, for example, a p-toluenesulfonyl group, and a sulfamoyl group such as an alkylsulfamoyl group, for example, a dimethylsulfamoyl group and a 4-(2,4-di-t-aminophenoxy)-butylaminosulfonyl group, and anarylsulfamoyyl group, for example, phenylsulfamoyl group. Among them, the sulfinyl group, particularly an alkylsulfinyl group having from 4 to 12 carbon atoms is preferable.

In Formula 15, n is an integer of from 1 to 4, and 1 or 2 is preferable. When n is 2, the plural groups represented by $R_{11}$ may be the same or different. Though the substituting position of the substituent represented by $R_{11}$ is not specifically limited, position-4 or position-5 is preferable.

In Formula 15, $R_{12}$ is a hydrogen atom, an aliphatic group such as an alkyl group, an alkenyl group and an alkynyl group, an aromatic group such as a phenyl group and p-chlorophenyl group, or a heterocyclic group such as a 2-tetrahydrofuryl group, a 2-thiophenyl group, a 4-imidazolyl group, an indoline-1-yl group and a 2-pyridyl group. $R_{12}$ is preferably a hydrogen atom or an alkyl group.

In Formula 15, $R_{13}$ is a hydrogen atom, an aliphatic group, an aromatic group or a heterocyclic group. $R_{13}$ is preferably a hydrogen atom or an alkyl group having from 1 to 12 carbon atoms, and a branched-chain alkyl group such as an i-propyl group, a t-butyl group and a t-amyl group is preferable because which is superior in the durability.

In Formula 15, $R_{14}$ is a group substituting on the benzene ring through an oxygen atom or a nitrogen atom, which is concretely the same as the group substituting on the benzene ring through an oxygen atom or a sulfur atom represented by $R_{11}$. $R_{14}$ is preferably an acylamino group or an alkoxy group. When the polymerizable group is contained in $R_{14}$ as a partial structure, $R_{14}$ is preferably groups represented by the following formulas.

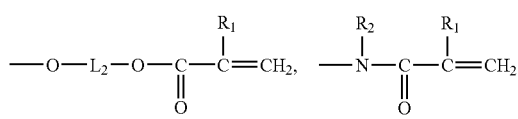

In the above formulas, $L_2$ is an alkylene group having from 1 to 12 carbon atoms, preferably a linear-, branched- or cyclic alkylene group having from 3 to 6 carbon atoms. $R_1$ is a hydrogen atom or a methyl group, and $R_2$ is an alkyl group having from 1 to 12 carbon atoms, and preferably from 2 to 6 carbon atoms.

In Formula 15, $R_{15}$ is a hydrogen atom, an aliphatic group, an aromatic group or a heterocyclic group, preferably a hydrogen atom or an alkyl group having from 1 to 12 carbon atoms, and particularly preferably a branched-alkyl group such as an i-propyl group, a t-butyl group and a t-amyl group.

In Formula 15, $R_{16}$ is a hydrogen atom, an aliphatic group, an aromatic group or a heterocyclic group, and preferably a hydrogen atom.

Examples of preferable UV absorbing monomer to be employed in the invention are listed below, but the UV absorbing monomer is not limited to them.

UVM-1

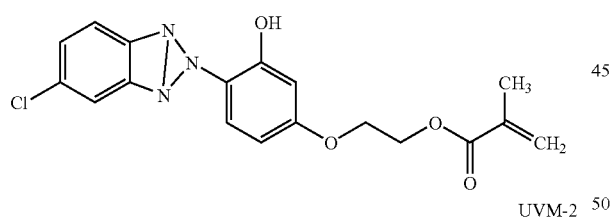

UVM-2

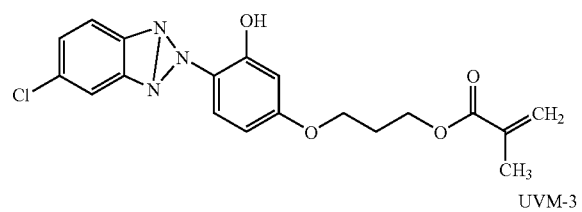

UVM-3

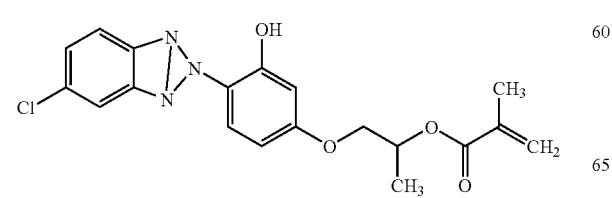

UVM-4

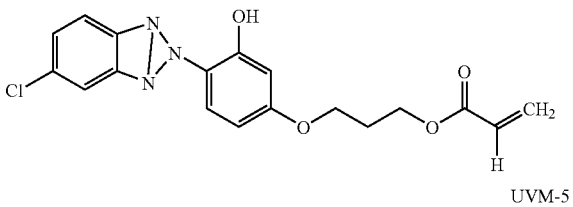

UVM-5

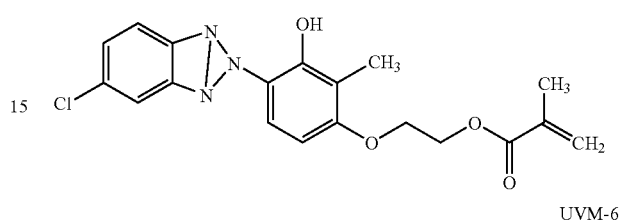

UVM-6

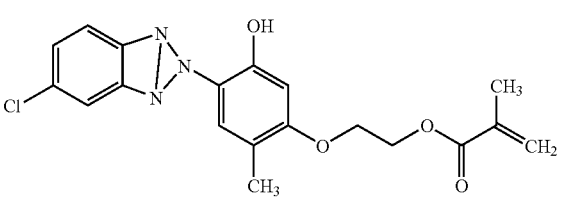

UVM-7

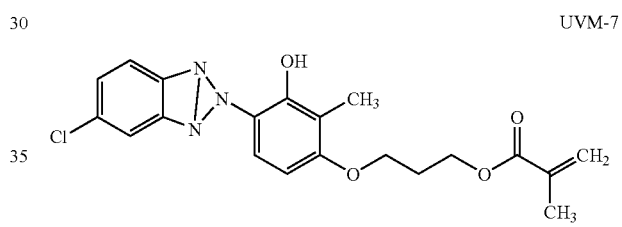

UVM-8

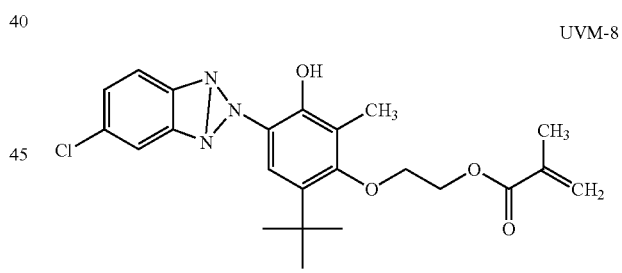

UVM-9

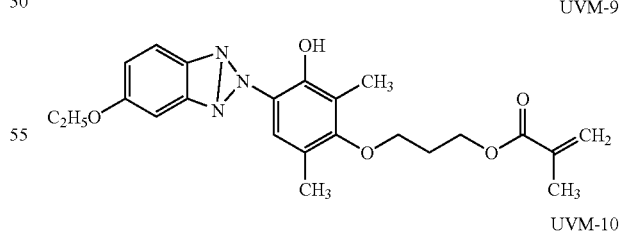

UVM-10

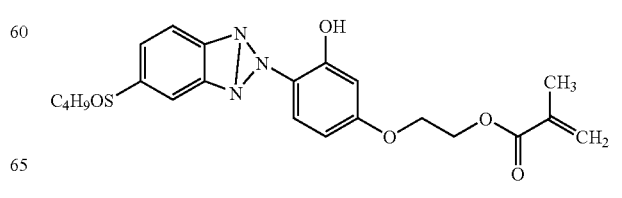

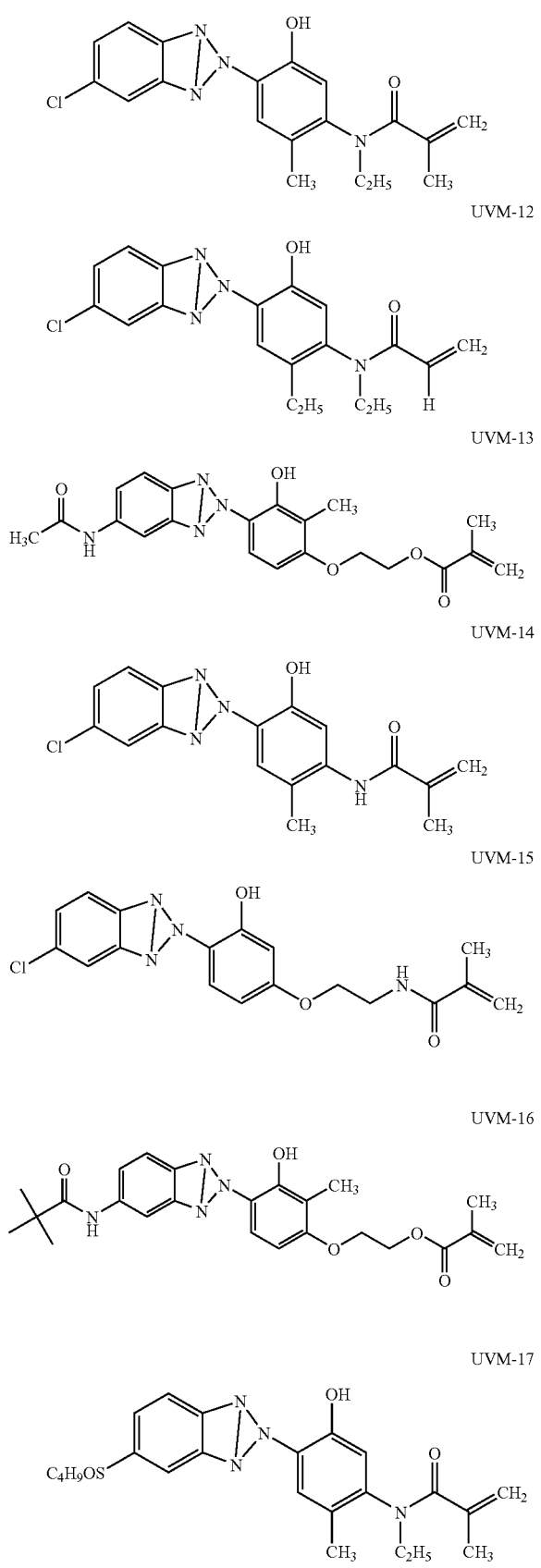

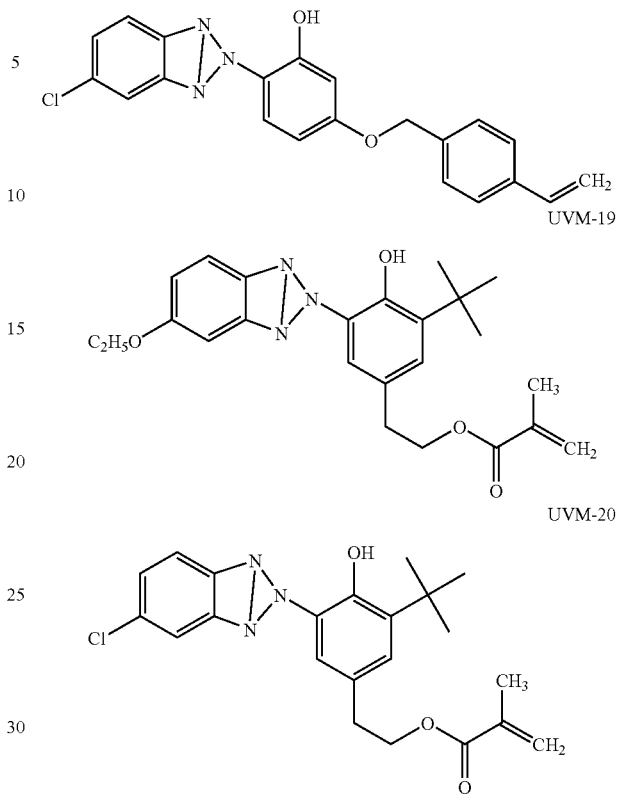

b. Description of the Polymer

The UV absorbing copolymer is characterized in that the polymer is a copolymer of the foregoing UV absorbing monomer and the ethylenic unsaturated monomer and has a weight average molecular weight of from 490 to 50,000.

By making the UV absorbent to the copolymer, the optical compensation film reduced in the haze and superior in the transparency can be obtained. In the invention, the weight average molecular weight of the UV absorbing copolymer is within the range of from 490 to 50,000, preferably from 2,000 to 20,000, and more preferably from 7,000 to 15,000. When the molecular weight is not more than 490, bleeding out of the UV absorbent onto the film surface and coloring during the storage tend to occur. When the molecular weight exceeds 50,000, the compatibility with the ester tends to be considerably lowered.

As the ethylenic unsaturated monomer polymerizable with the UV absorbing monomer, the followings can be cited; for example, methacrylic acid and its ester derivatives such as methyl methacrylate, ethyl methacrylate, propyl methacrylate, butyl methacrylate, i-butyl methacrylate, t-butyl methacrylate, cyclohexyl methacrylate, octyl methacrylate, 2-hydroxyethyl methacrylate, 2-hydroxyethyl methacrylate, 2-hydroxypropyl methacrylate, tetrahydrofurfulyl methacrylate, benzyl methacrylate, dimethylaminoethyl methacrylate and diethylaminoethyl methacrylate; acrylic acid and its ester derivative such as methyl acrylate, ethyl acrylate, propyl acrylate, butyl acrylate, i-butyl acrylate, t-butyl acrylate, octyl acrylate, cyclohexyl acrylate, 2-hydroxyethyl acrylate, 2-hydroxypropyl acrylate, tetrahydrofurfulyl acrylate, 2-ethoxyethyl acrylate, (diethylene glycol)ethoxylate acrylate, 3-methoxybutyl acrylate, benzyl acrylate, dimethylaminoethyl acrylate and diethylaminoethyl acrylate; an alkylvinyl ether such as methyl vinyl ether, ethyl vinyl ether and butyl vinyl ether, an alkyl vinyl ester such as vinyl formate, vinyl acetate, vinyl butylate, vinyl caprate and vinyl stearate; acrylonitrile; vinyl chloride and styrene.

Among the above ethylenic unsaturated monomers, acrylic ester and methacrylic ester each having a hydroxyl group or an ether bond such as 2-hydroxyl methacrylate, 2-hydroxypropyl methacrylate, tetrahydrofurfulyl methacrylate, 2-hydroxyethyl acrylate, 2-ethoxyethyl acrylate, (diethylene glycol)ethoxylate acrylate and 3-methoxybutyl acrylate, are preferable. They can be copolymerized solely or in mixture of two or more kinds with the UV absorbing monomer.

The ratio of the UV absorbing monomer and the polymerizable ethylenic unsaturated monomer is decided considering the compatibility of the resultant UV absorbing copolymer with the transparent cellulose ester and influence on the transparency and the mechanical strength of the optical compensation film. It is preferable that both of the components is combined so that the content of the UV absorbing monomer in the copolymer is from 20 to 70% by weight, and more preferably from 30 to 60% by weight. When the content of the UV absorbing monomer is less than 20% by weight, addition of large amount of the copolymer is necessary for desired UV absorbing ability so that the lowering in the transparence caused by increasing in the haze and separation of the copolymers tend to be caused. When the content of the UV absorbing monomer is larger than 70% by weight, the compatibility with the transparent cellulose ester tends to be decreased and the working efficiency is lowered.

c. Description of the Polymerization Method

In the invention, the method for polymerizing the UV absorbing copolymer is not specifically limited, and usually known methods such as a radical polymerization method, an anion polymerization method and a cation polymerization method can be widely applied. As the initiator of the radical polymerization, an azo compound and a peroxide compound such as azobisisobutylylonitrile (AIBN), diester of azobisisobutylic acid and benzoyl peroxide are usable. The solvent for polymerization is not specifically limited and, for example, an aromatic hydrocarbon type solvent such as toluene and chlorobenzene, a halogenized hydrocarbon type solvent such as dichloroethane and chloroform, an ether type solvent such as tetrahydrofuran and dioxane, an amide type solvent such as dimethylformamide, an alcohol type solvent such as methanol, an ester type solvent such as methylacetate and ethyl acetate, a ketone type solvent such as acetone, cyclohexanone and methyl ethyl ketone, and water are employable. Solution polymerization which is performed in a uniform system, precipitation polymerization in which the formed polymer is precipitated and emulsion polymerization which is performed in a micelle state can be applied according to selection of the solvent.

The weight average molecular weight of the UV absorbing copolymer to be employed in the invention can be controlled by known molecular weight controlling methods. As an example of such the method, a method using a chain-transfer agent such as carbon tetrachloride, laurylmercaptane or octyl thioglycolate is applicable. The polymerization is usually performed at a temperature of from room temperature to 130° C., and preferably from 50 to 100° C.

The UV absorbing copolymer is preferably mixed with the transparence ester for constituting the optical compensation film in a ratio of from 0.01 to 40%, and more preferably from 0.1 to 10%, by weight. On such the occasion, the haze of the resultant optical compensation film may be not more than 0.5, and preferably not more than 0.2. It is more preferable that the haze of the resultant film is not more than 0.2 and the transparency at 380 nm is not more than 10%.

Moreover, it is also preferable that at least on of the UV absorbent contains a polymer derived from a UV absorbing monomer represented by the following Formula 16.

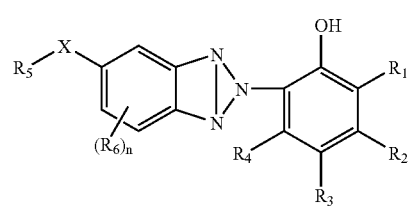

Formula 16

In the above formula, n is an integer of from 0 to 3, $R_1$ through $R_5$ are each a hydrogen atom, a halogen atom or a substituent, X is a —COO— group, a —CONR$_7$— group, an —OCO— group or an —NR$_7$CO— group, $R_6$ is a hydrogen atom, an alkyl group, an alkenyl group, an alkynyl group or an aryl group, and $R_7$ is a hydrogen atom, an alkyl group or an aryl group. The group represented by $R_6$ contains a polymerizable group as the partial structure thereof. In Formula 16, plural groups represented by $R_5$ may be the same or different and may form a 5- to 7-member ring by linked with each other when n is 2 or more.

$R_1$ through $R_5$ are each a hydrogen atom, a halogen atom or a substituent. The halogen atom is, for example, a fluorine atom, a chlorine atom, a bromine atom and an iodine atom, and preferably a fluorine atom and a chlorine atom. Examples of the substituent include an alkyl group such as a methyl group, an ethyl group, an isopropyl group, a hydroxyethyl group, a methoxymethyl group, a trifluoromethyl group and a t-butyl group, an alkenyl group such as a vinyl group, an allyl group and a 3-butene-1-yl group, an aryl group such as a phenyl group, a naphthyl group, a p-tolyl group and p-chlorophenyl group, a heterocyclic group such as a pyridyl group, a benzimidazolyl group, benzothiazolyl group and benzoxazolyl group, an alkoxy group such as a methoxy group, an ethoxy group, an isopropoxy group and an n-butoxy group, an aryloxy group such as a phenoxy group, a heterocyclic oxy group such as a 1-phenyltetrazole-5-oxy group and a 2-tetrahydrpyranyloxy group, an acyloxy group such as an acetoxy group, a pivaloyloxy group and a benzoyloxy group, an acyl group such as an acetyl group, a propanoyl group and a butyloyl group, an alkoxycarbonyl group such as a methoxycarbonyl group and an ethoxycarbonyl group, an aryloxycarbonyl group such as a phenoxycarbonyl group, a carbamoyl group such as a methylcarbamoyl group, an ethylcarbamoyl group and a dimethylcarbamoyl group, an amino group, an alkylamino group such as a methylamino group, an ethylamino group and a diethylamino group, an anilino group such as an anilino group and an N-methylanilino group, an acylamino group such as an acetylamino group and a propionylamino group, a hydroxyl group, a cyano group, a nitro group, a sullfonamido group such as a methanesulfonamido group, and a benzenesulfonamido group, a sulfamoylamino group such as a dimethylsulfamoylamino group, a sulfonyl group such as a methanesulfonyl group, a butanesulfonyl group and a phenylsulfonyl group, a sulfamoyl group such as an ethylsulfamoyl group and dimethylsulfamoyl group, a sulfonylamino group such as a methanesulfonylamino group and a bebzenesulfonylamino group, a ureido group such as a 3-methylureido group, a 3,3-dimethylureido group and a 1,3-dimethylureido group, an imido group such as a phthalimido group, a silyl group such as a trimethylsilyl group, triethylsilyl group and a t-butylsilyl group, an alkylthio group such as a methylthio group, an ethylthio group and an n-butylthio group, and an arylthio group such as a phenylthio group, and preferably an alkyl group and an aryl group.

In Formula 16, each of the groups represented by $R_1$ through $R_5$ may have a substituent when they are each a group capable of being substituted, and the group $R_1$ through $R_4$ may form a 5- to 7-membered ring by linking with adjacent groups.

$R_6$ is a hydrogen atom, an alkyl group, a cycloalkyl group, an alkenyl group, an alkynyl group, an aryl group or a heterocyclic group. The alkyl group is, for example, a methyl group, an ethyl group, a propyl group, an isopropyl group, an n-butyl group, an isobutyl group, a t-butyl group, an amyl group, an iso amyl group or a hexyl group. The alkyl group may have a halogen atom such as a fluorine atom, chlorine atom, a bromine atom and an iodine atom, or a substituent. Examples of the substituent include an aryl group such as a phenyl group, a naphthyl group, a p-tolyl group and a p-chlorophenyl group, an acyl group such as an acetyl group, a propanoyl group and a butyloyl group, an alkoxy group such as a methoxy group, an ethoxy group, a propoxy group and an n-butoxy group, an aryloxy group such as a phenoxy group, an amino group, an alkylamino group such as a methylamino group, an ethylamino group and a diethylamino group, an anilino group such as an anilino group and an N-methylanilino group, an acylamino group such as an acetylamino group and a propionylamino group, a hydroxyl group, a cyano group, a carbamoyl group such as a methylcarbamoyl group, an ethylcarbamoyl group and dimethylcarbamoyl group, an acyloxy group such as an acetoxy group, a pivaloyloxy group and a benzoyloxy group, an alkoxycarbonyl group such as a methoxycarbonyl group and an ethoxycarbonyl group, and an aryloxycarbonyl group such as a phenoxycarbonyl group.

The cycloalkyl group is, for example, a saturated cyclic hydrocarbon group such as a cyclopentyl group, a cyclohexyl group, a norbornyl group and an adamantyl group which may be unsubstituted or substituted.

The alkenyl group is, for example, a vinyl group, a 1-methyl-2-propenyl group, a 3-butenyl group, a 2-butenyl group, a 3-methyl-2-butenyl group and an oleyl group, and preferably the vinyl group and 1-methyl-2-propenyl group.

The alkynyl group is, for example, an ethynyl group, a butadiyl group, a phenylethynyl group, a propalgyl group, a 1-methyl-2-propynyl group, a 2-butynyl group and a 1,1-dimethyl-2-propynyl group, and preferably the ethynyl group and propalgyl group.

The aryl group is, for example, a phenyl group, a naphthyl group and an anthranyl group, which may have a halogen atom such as a fluorine atom, a chlorine atom, a bromine atom and an iodine atom, or a substituent. Examples of the substituent include an alkyl group such as a methyl group, an ethyl group, an isopropyl group, a hydroxyethyl group, a methoxymethyl group, a trifluoromethyl group and a t-butyl group, an acyl group such as an acetyl group, a propanoyl group and a butyloyl group, an alkoxy group such as a methoxy group, an ethoxy group, an isopropoxy group and an n-butoxy group, an aryloxy group such as a phenoxy group, an amino group, an alkylamino group such as a methylamino group, an ethylamino group and a diethylamino group, an anilino group such as an anilino group and an N-methylanilino group, an acylamino group such as an acetylamino group and a propionylamino group, a hydroxyl group, a cyano group, a carbamoyl group such as a methylcarbamoyl group, an ethylcarbamoyl group and dimethylcarbamoyl group, an acyloxy group such as an acetoxy group, a pivaloyloxy group and a benzoyloxy group, an alkoxycarbonyl group such as a methoxycarbony group and an ethoxycarbonyl group, and aryloxycarbonyl group such as phenoxycarbonyl group.

As the heterocyclic group, for example, a pyridyl group, a benzimidazolyl group, a benzothiazolyl group and a benzoxazolyl group, can be cited. $R_6$ is preferably the alkyl group.

In Formula 16, X is a —COO— group, a —CONR— group, an —OCO— group or an —NR$_7$CO— group.

$R_7$ is an alkyl group, a cycloalkyl group, an aryl group or a heterocyclic group. Examples of the alkyl group are a methyl group, an ethyl group, a propyl group, an isopropyl group, an n-butyl group, an isobutyl group, a t-butyl group, an amyl group, an isoamyl group and a hexyl group. The alkyl group may have a halogen atom such as a fluorine atom, a chlorine atom, a bromine atom and an iodine atom, or a substituent. Examples of the substituent include an aryl group such as a phenyl group, a naphthyl group, a p-tolyl group and a p-chlorophenyl group, an acyl group such as an acetyl group, a propanoyl group and a butyloyl group, an alkoxy group such as a methoxy group, an ethoxy group, an isopropoxy group and an n-butoxy group, an aryloxy group such as a phenoxy group, an amino group, an alkylamino group such as a methylamino group, an ethylamino group and a diethylamino group, an anilino group such as an anilino group and an N-methylanilino group, an acylamino group such as an acetylamino group and a propionylamino group, a hydroxyl group, a cyano group, a carbamoyl group such as a methylcarbamoyl group, an ethylcarbamoyl group and dimethylcarbamoyl group, an acyloxy group such as an acetoxy group, a pivaloyloxy group and a benzoyloxy group, an alkoxycarbonyl group such as a methoxcarbony group and an ethoxycarbonyl group, and aryloxycarbonyl group such as phenoxycarbonyl group.

The cycloalkyl group is, for example, a saturated cyclic hydrocarbon group such as a cyclopentyl group, a cyclohexyl group, a norbornyl group and an adamantyl group which may be unsubstituted or substituted.

The aryl group is, for example, a phenyl group, a naphthyl group and an anthranyl group, which may have a halogen atom such as a fluorine atom, a chlorine atom, a bromine atom and an iodine atom, or a substituent. Examples of the substituent include an alkyl group such as a methyl group, an ethyl group, an isopropyl group, a hydroxyethyl group, a methoxymethyl group, a trifluoromethyl group and a t-butyl group, an acyl group such as an acetyl group, a propanoyl group and a butyloyl group, an alkoxy group such as a methoxy group, an ethoxy group, an isopropoxy group and an n-butoxy group, an aryloxy group such as a phenoxy group, an amino group, an alkylamino group such as a methylamino group, an ethylamino group and a diethylamino group, an anilino group such as an anilino group and an N-methylanilino group, an acylamino group such as an acetylamino group and a propionylamino group, a hydroxyl group, a cyano group, a carbamoyl group such as a methylcarbamoyl group, an ethylcarbamoyl group and dimethylcarbamoyl group, an acyloxy group such as an acetoxy group, a pivaloyloxy group and a benzoyloxy group, an alkoxycarbonyl group such as a methoxcarbony group and an ethoxycarbonyl group, and aryloxycarbonyl group such as phenoxycarbonyl group.

As the heterocyclic group, for example, a pyridyl group, a benzimidazolyl group, a benzothiazolyl group and a benzoxazolyl group can be cited. $R_7$ is preferably a hydrogen atom.

In the invention, the polymerizable group is an ethylenic unsaturated polymerizable group or a di-functional type polycondensable group, and preferably the ethylenic unsaturated polymerizable group. Concrete examples of the ethylenic unsaturated group include a vinyl group, an acryl group, an acryloyl group, a methacryloyl group, a styryl group, an acrylamido group, a methacrylamido group, a cyanized vinyl group, a 2-cyanoacryloxy group, a 1,2-epoxy group, a vinylbenzyl group and a vinyl ether group, and the vinyl group, acryloyl group, acrylamido group and methacrylamido group are preferable. The term of "to be contained as partial structure" means that the polymerizable group is bonded directly or through two or a di- or more-valent linking group. The di- or more-valent linking group is, for example, an alkylene group such as a methylene group, a 1,2-ethylene group, a 1,3-propylene group, a 1,4-butylene group and a cyclohexane-1,4-diyl, an alkenylene group such as an ethane-1,2-diyl group, and a butane-1,3-diin-1,4-diyl, a linking group derived from a compound containing at least one aromatic group such as a substituted and unsubstituted benzne, a condensed polycyclic hydrocarbon compound, an aromatic heterocyclic ring, a group of an aromatic hydrocarbon ring and a group of an aromatic heterocyclic ring, a hetero atomic link such as a oxygen atom, a sulfur atom, a nitrogen atom, a silicon atom and a phosphor atom, and preferably the alkylene group and the linking by the hetero atom. These linking groups may form a composite group by combing with together. The weight average molecular weight of the UV absorbing polymer derived from the UV absorbing monomer is preferably from 2,000 to 30,000, and more preferably from 5,000 to 20,000.

The weight average molecular weight of the UV absorbing copolymer to be employed in the invention can be controlled by known molecular weight controlling methods. As an example of such the method, a method using a chain-transfer agent such as carbon tetrachloride, laurylmercaptane or octyl thioglycolate is applicable. The polymerization is usually carried out at a temperature of from room temperature to 130° C., and preferably from 50 to 100° C.

The UV absorbing polymer to be used in the invention is preferably a copolymer of the UV absorbing monomer and another polymerizable monomer. Examples of another polymerizable monomer include an unsaturated compound, for example, a styrene derivative such as styrene, α-methylstyrene, o-methylstyrene, m-methylstyrene, p-methylstyrene and vinylnaphthalene, an acrylate derivative such as methyl acrylate, ethyl acrylate, propyl acrylate, butyl acrylate, i-butyl acrylate, t-butyl acrylate, octyl acrylate, cyclohexyl acrylate and benzyl acrylate, a methacrylate derivative such as methyl methacrylate, ethyl methacrylate, propyl methacrylate, butyl methacrylate, i-butyl methacrylate, t-butyl methacrylate, octyl methacrylate, cyclohexyl methacrylate and benzyl methacrylate, an alkyl vinyl ether such as methyl vinyl ether, ethyl vinyl ether and butyl vinyl ether, an alkyl vinyl ester such as vinyl formate, vinyl acetate, vinyl butylate, vinyl caproate and vinyl stearate, crotonic acid, maleic acid, fumalic acid, itaconic acid, acrylonitrile, methacrylonitrile, vinyl chloride, acrylamide and methacrylamide. Methyl acrylate, methyl methacrylate and vinyl acetate are preferable.

It is also preferable that the copolymer component other than the UV absorbing monomer in the polymer derived from the UV absorbing monomer contains at least one kind of hydrophilic ethylenic unsaturated monomer.

The hydrophilic ethylenic unsaturated monomer is not specifically limited as long as that is hydrophilic and has a polymerizable unsaturated double bond. Examples of the hydrophilic ethylenic unsaturated monomer are an unsaturated carboxylic acid such as acrylic acid and methacrylic acid or a ester of acrylic acid or methacrylic acid having a hydroxyl group or an ether bond such as 2-hydroxlethyl methacrylate, 2-hydroxypropyl methacrylate, tetrahydrofurfuryl methacrylate, 2-hydroxyethyl acrylate, 2-hydroxypropyl acrylate, 2,3-dihydroxy-2-methylpropyl methacrylalate, tetrahydrofurfuryl acrylate, 2-ethoxyethyl acrylate, (diethylene glycol) ethoxylate acrylate and 3-methoxybutyl acrylate, and an N-substituted (meth)acrylamide such as acylamide, N,N-dimethyl(metha)acrylamide, N-vinylpyrrolidone and N-vinyloxazolidone.

As the hydrophilic ethylenic unsaturated monomer, a (meth)acrylate having a hydroxyl group or a carboxylic acid in the molecule thereof is preferable, and 2-hydroxyethyl methaacrylate, 2-hydroxypropyl methacrylate, 2-hydroxyethyl acrylate and 2-hydroxypropyl acrylate are particularly preferable.

One or more kinds of the polymerizable monomers may be copolymerized with the UV absorbing monomer.

In the invention, the method for polymerizing the UV absorbing copolymer is not specifically limited, and usually known methods such as a radical polymerization method, an anion polymerization method and a cation polymerization method can be widely applied. As the initiator of the radical polymerization, an azo compound and a peroxide compound such as azobisisobutylylonitrile (AIBN), diester of azobisisobutylic acid and benzoyl peroxide are usable. The solvent for polymerization is not specifically limited, and, for example, an aromatic hydrocarbon type solvent such as toluene and chlorobenzene, a halogenized hydrocarbon type solvent such as dichloroethane and chloroform, an ether type solvent such as tetrahydrofuran and dioxane, an amide type solvent such as dimethylformamide, an alcohol type solvent such as methanol, an ester type solvent such as methylacetate and ethyl acetate, a ketone type solvent such as acetone, cyclohexanone and methyl ethyl ketone, and water are employable. Solution polymerization which is performed in a uniform system, precipitation polymerization in which the formed polymer is precipitated, emulsion polymerization performed in a micelle state, and suspension polymerization performed in a suspension state can be applied according to selection of the solvent.

The using ratio of the UV absorbing monomer, the monomer polymerizable with the UV absorbing monomer and the hydrophilic ethylenic unsaturated monomer is suitably decided considering the influence on the compatibility of the resultant UV absorbing copolymer with another transparent polymer, the transparency and the mechanical strength of the optical compensation film.

The content of the UV absorbing monomer in the polymer derived from the UV absorbing monomer is preferably from 1 to 70%, and more preferably from 5 to 60%, by weight. When the content of the UV absorbing monomer in the UV absorbing polymer is less than 1%, the use of large amount of the polymer is required for satisfying desired UV absorbing ability so that the strength and the transparence are lowered by separation of the polymer and the lowering in the strength is caused. When the content of the UV absorbing monomer in the UV absorbing polymer exceeds 70% by weight, the compatibility of the polymer with another polymer is lowered so that the transparent optical compensation film is difficultly obtained sometimes.

The hydrophilic ethylenic unsaturated monomer is preferably contained in the UV absorbing copolymer in a ratio of from 0.1 to 50% by weight. When the content is less than 0.1%, the improvement effect of the hydrophilic ethylenic unsaturated monomer on the compatibility cannot be obtained. When the content is more than 50% by weight, the separation and purification of the copolymer become difficult. The more preferable content of the hydrophilic ethylenic unsaturated monomer is from 0.5 to 20% by weight. When the UV absorbing monomer it self is substituted by a hydrophilic group, the total amount of the hydrophilic UV absorbing monomer and the hydrophilic ethylenic unsaturated monomer is preferably with in the above range.

An ethylenic unsaturated monomer having no hydrophilic group is preferably copolymerized additionally to the UV absorbing monomer and the hydrophilic monomer for satisfying the preferable ratio of the UV absorbing monomer and the hydrophilic monomer.

Two or more kinds of each of the UV absorbing monomer, hydrophilic monomer and non-hydrophilic monomer may be mixed and copolymerized.

Typical examples of the UV absorbing monomer preferably employed in the invention are listed below, but the monomer is not limited to them.

MUV-1

MUV-2

MUV-3

MUV-4

MUV-5

MUV-6
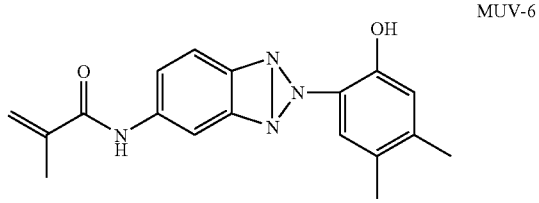

MUV-7
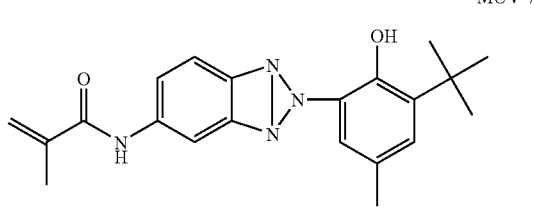

MUV-8
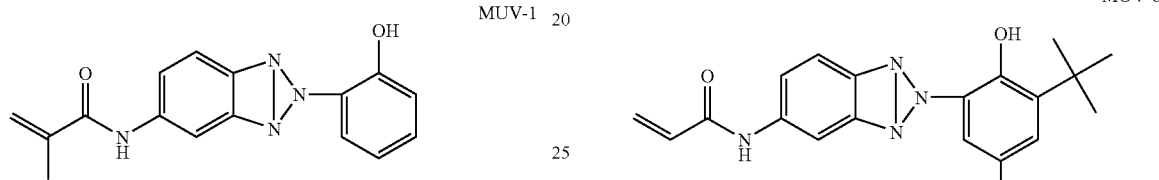

MUV-9
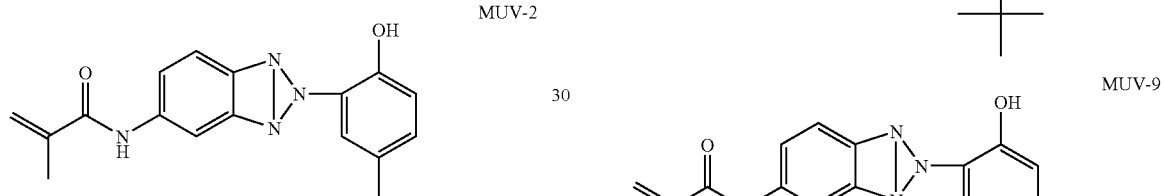

MUV-10
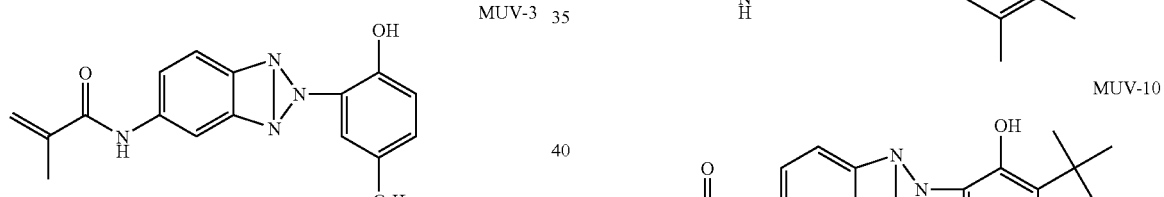

MUV-11
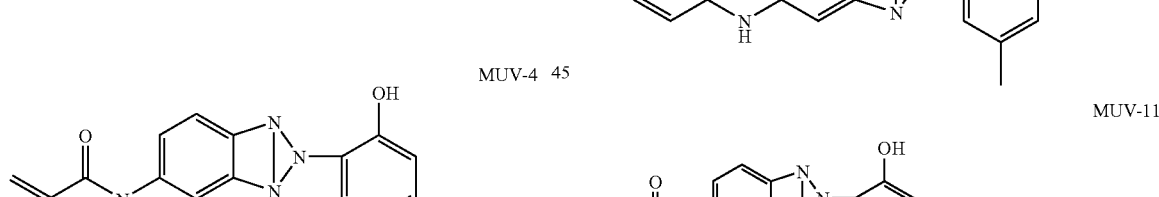

MUV-12
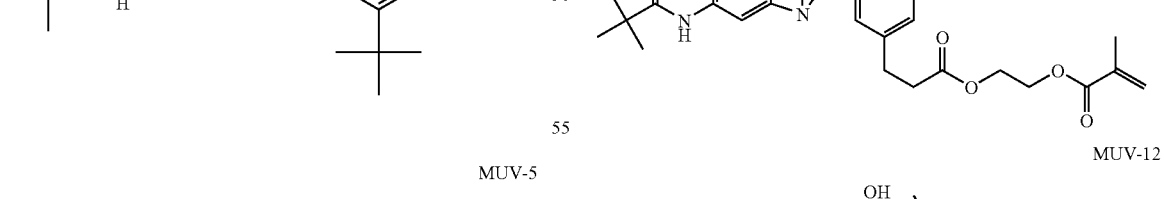

MUV-13
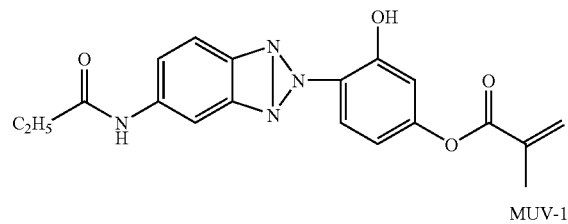
MUV-14
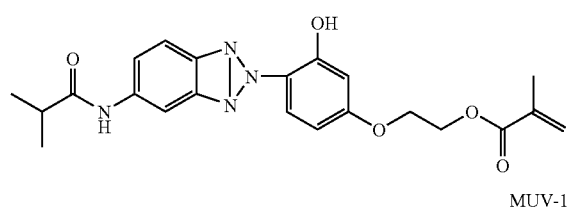
MUV-15
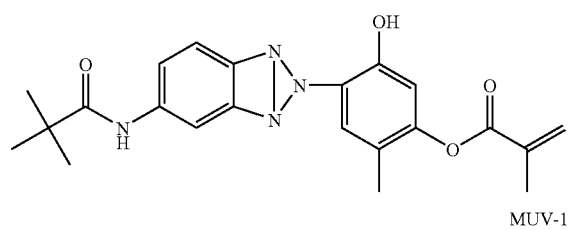
MUV-16
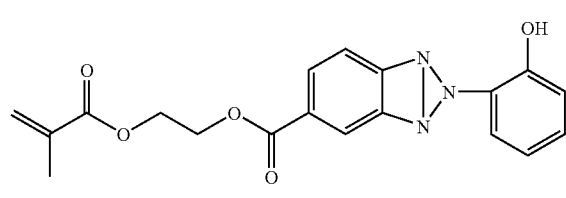
MUV-17
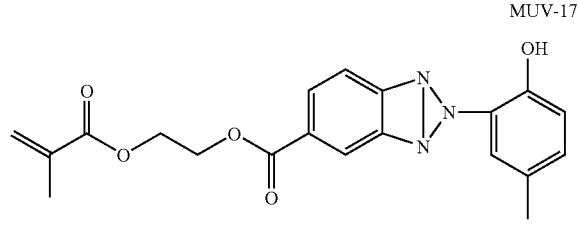
MUV-18
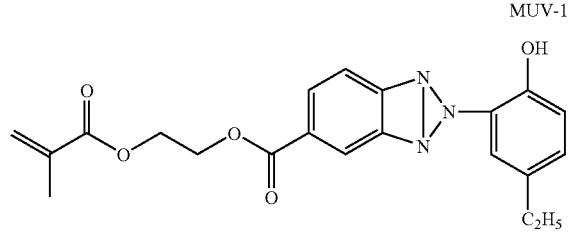
MUV-19
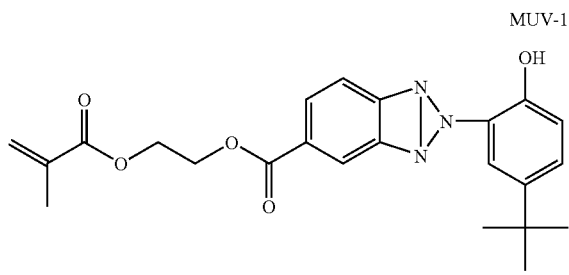
MUV-20
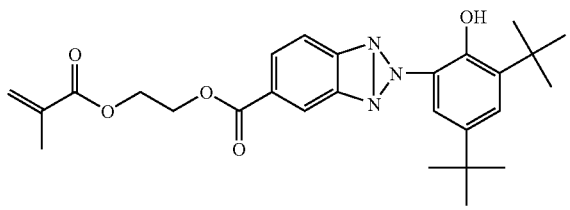
MUV-21
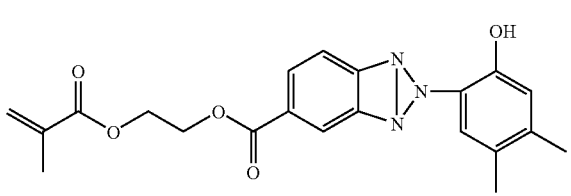
MUV-22
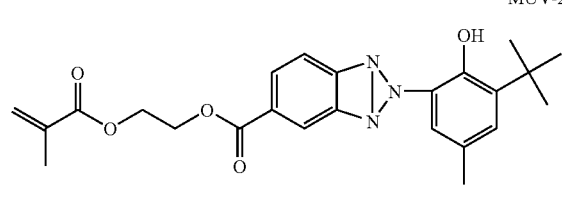
MUV-23
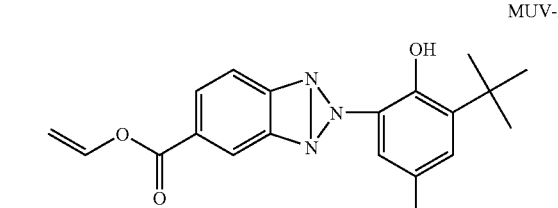
MUV-24
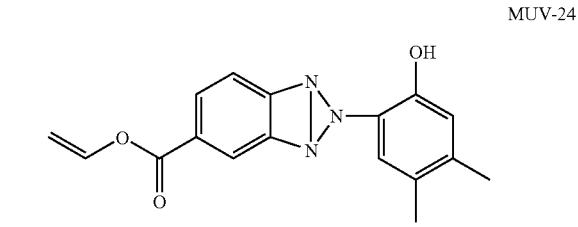
MUV-25
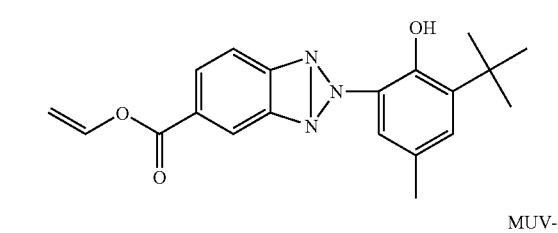
MUV-26
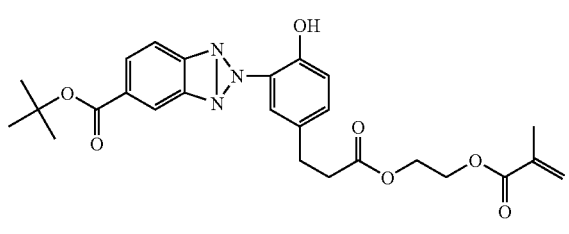

MUV-27
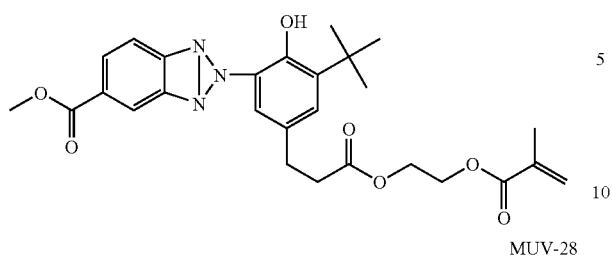
MUV-28
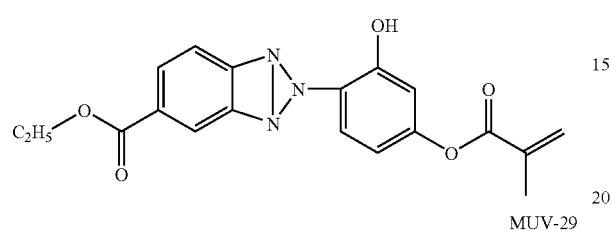
MUV-29
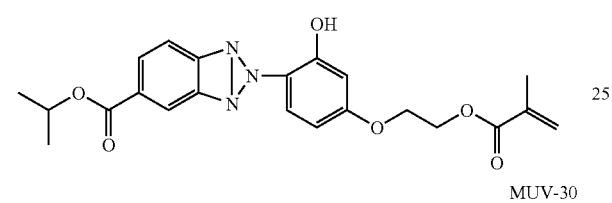
MUV-30
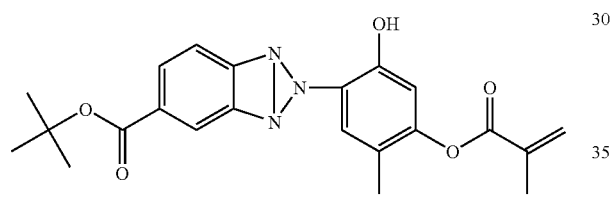
MUV-31
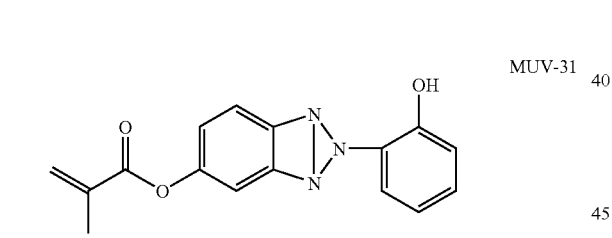
MUV-32
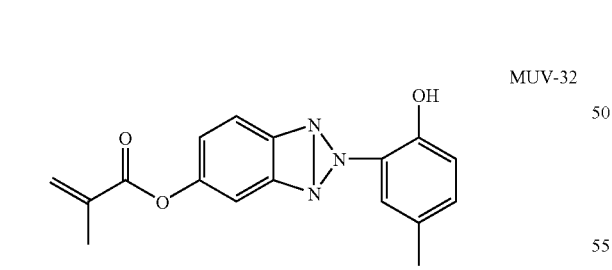
MUV-33
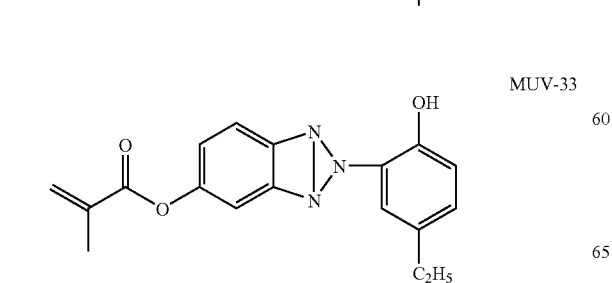
MUV-34
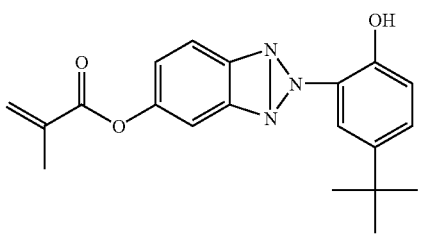
MUV-35
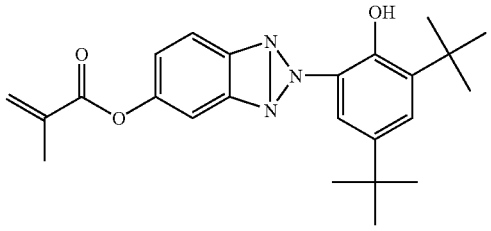
MUV-36
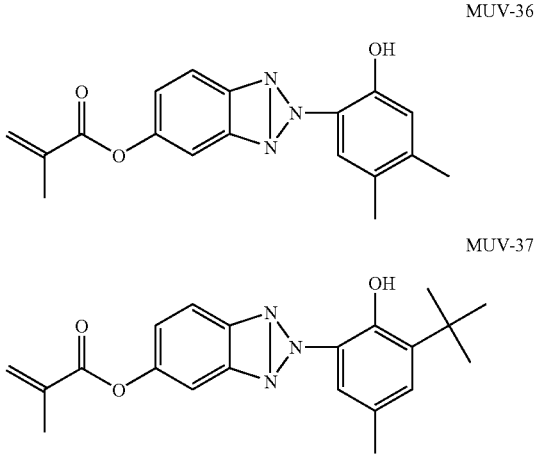
MUV-37
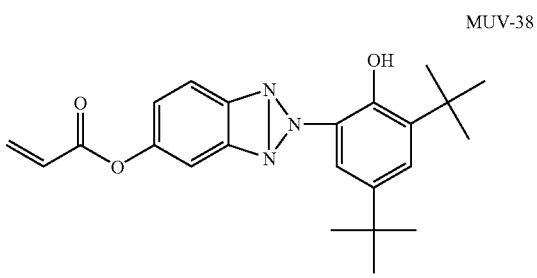
MUV-38
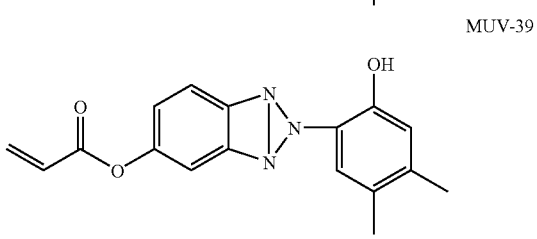
MUV-39
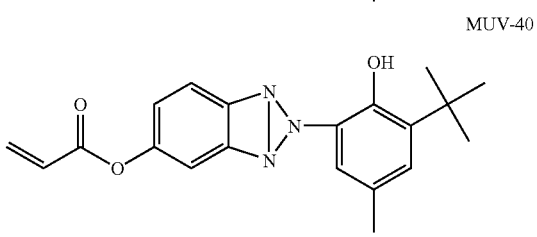
MUV-40

MUV-41
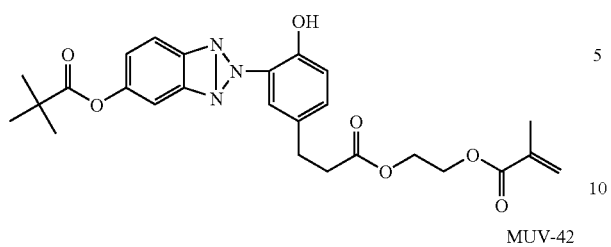

MUV-42
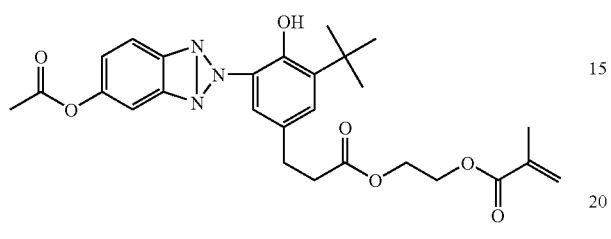

MUV-43
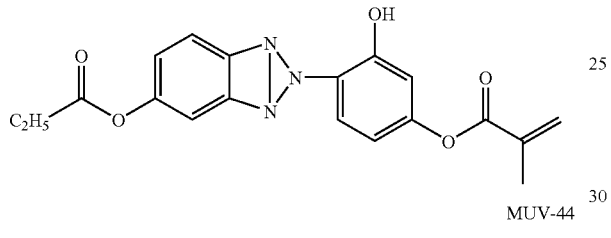

MUV-44
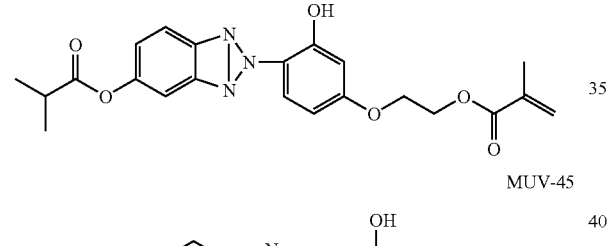

MUV-45
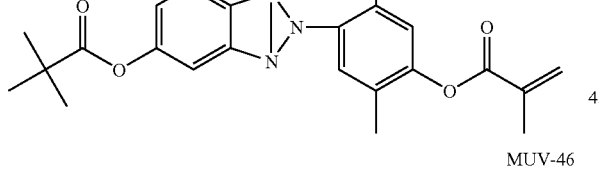

MUV-46
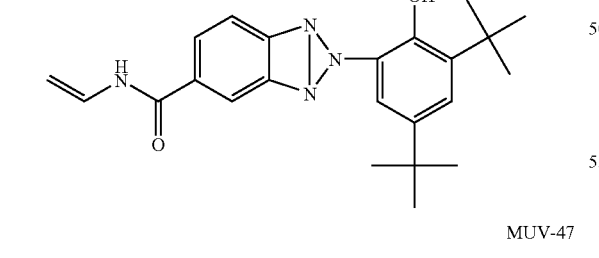

MUV-47
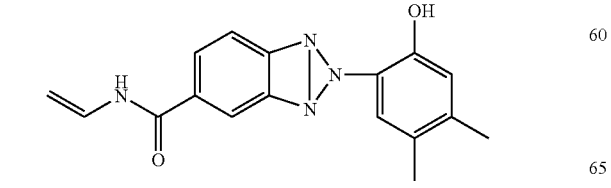

MUV-48
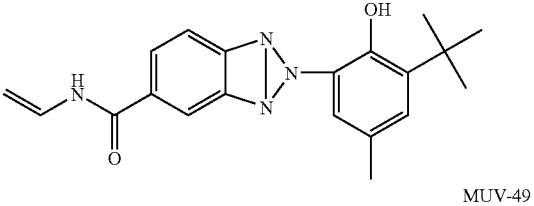

MUV-49
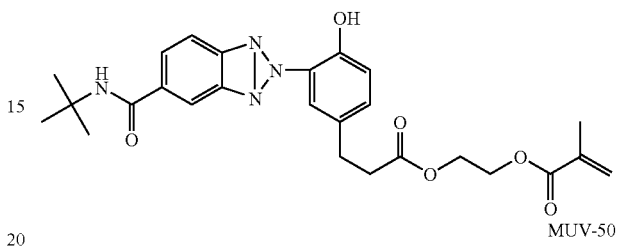

MUV-50
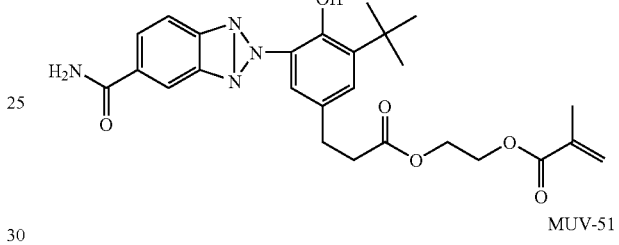

MUV-51
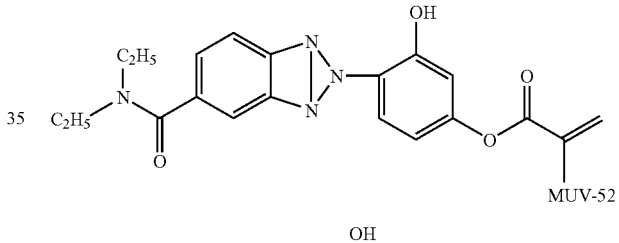

MUV-52
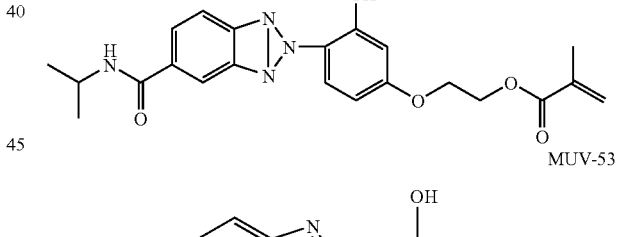

MUV-53
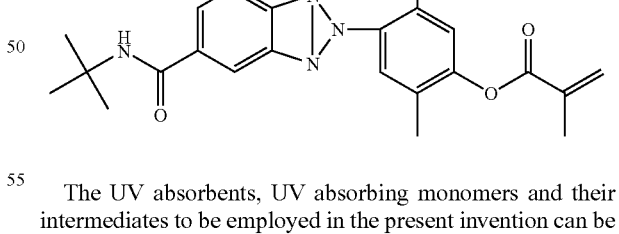

The UV absorbents, UV absorbing monomers and their intermediates to be employed in the present invention can be synthesized by referring published documents. For example U.S. Pat. Nos. 3,072,585, 3,159,646, 3,399,173, 3,761,373, 4,028,331 and 5,683,861, European Patent No. 86,300,416, Japanese Patent O.P.I. Publication Nos. 63-227575 and 63-185969, "Polymer Bulletin" V. 20 (2), 169-176, and "Chemical Abstracts V. 109, No. 191389 can be referred for synthesizing.

The UV absorbent and the UV absorbing polymer to be used in the invention may be used together with a low molecular weight compound or an inorganic compound on the occasion of mixing with the other transparent polymer. For example, it is preferable embodiment that the UV absorbing polymer and another UV absorbent having relatively low molecular weight are simultaneously mixed with the other transparent polymer. It is also one of preferable embodiments that an additive such as an antioxidant, a plasticizer and a flame retardant is simultaneously mixed.

The adding method of the UV absorbent and the UV absorbing polymer to be used in the invention is not specifically limited, and they may be kneaded together with the ester or once dissolved in a solvent together with the ester and dried to solidify.

The using amount of the UV absorbent and the UV absorbing polymer to be used in the invention is varied depending on the kind of the compound and the using condition. In the case of the UV absorbent, the amount is preferably from 0.1 to 5.0 g, more preferably from 0.1 to 3.0 g, further preferably from 0.4 to 2.0 g, and particularly preferably from 0.5 to 1.5 g, per square meter of the optical compensation film. In the case of the UV absorbing polymer, the amount is preferably from 0.1 to 10 g, more preferably from 0.6 to 9.0 g, further preferably from 1.2 to 6.0 g, and particularly preferably from 1.5 to 3.0 g, per square meter of the optical compensation film.

As above-mentioned, one is preferable which is superior in the UV absorbing ability in the wavelength region of not more than 380 nm from the viewpoint of the prevention of degradation of the liquid crystal, and low in the in the visible light absorption in the wavelength range of not less than 400 nm from the visibility of the liquid crystal display. In the invention, the transmission at 380 nm is preferably not more than 8%, more preferably not more than 4% and particularly preferably not more than 1%.

The UV absorbing monomers usable in the invention which are available on the market includes UMV-1, 1-(2-benzotriazole)-2-hydroxy-5-(2-vinyloxycarbonylethyl)benzene, and a reactive UV absorbent RUVA-93, 1-(2-benzotriazole)-2-hydroxy-5-(2-methacrolyloxyethyl)benzene, manufactured by Ootsuka Kagaku Co., Ltd., and similar compounds. A polymer and copolymer in which such the compounds are polymerized solely or in combination are preferably usable, but the UV absorbent polymer is not limited to them. For example, a polymer UV absorbent PUVA-30M put on the market by Ootsuka Kagaku Co., Ltd., is also preferably employed. Two or more kinds of the UV absorbent may be employed.

(Plasticizer)

It is preferable to add a compound known as plasticizer to the optical compensation film of the invention from the viewpoint of improvement of film properties such as improvement of the mechanical property, provision of softness and anti-moisture absorption ability, and reducing in the moisture permeation. In the melt-casting method of the invention, the object of the addition of the plasticizer includes to make lower the melting temperature of the film constituting material than that of the glass transition point of the cellulose ester itself, and to make lower the viscosity of the film constituting material than that of the cellulose ester itself.

In the invention, the melting temperature of the film constituting material is a temperature of the material liquefied by heating on the occasion of the extrusion for film forming.

The fluidity of cellulose ester itself for film formation is not appeared at a temperature lower than the glass transition point thereof. The cellulose ester shows fluidity by lowering in the elasticity or viscosity at a temperature higher than the glass transition point thereof. It is preferable for melting the film constituting material that the plasticizer to be added has a melting point or a glass transition point lower than the glass transition point of the cellulose ester.

Though the plasticizer relating to the invention is not specifically limited, the plasticizer preferably has a functional group capable of interacting with the cellulose derivative or another additive by a hydrogen bond so that the plasticizer does not causes haze in the film or does not bleeds out or vaporize from the film.

As such the functional group, a hydroxyl group, an ether group, a carbonyl group, an ester group, a residue of carboxylic acid, an amino group, an imino group, an amido group, an imido group, a cyano group, a nitro group, a sulfonyl group, a residue of sulfonic acid, a phosphonyl group and a residue of phosphoric acid are cited, and the carbonyl group, ester group and phosphonyl group are preferable.

As the plasticizer, a phosphate type plasticizer, a phthalate type plasticizer, a trimellitate type plasticizer, a pyromellitic acid type plasticizer, a polyol ester type plasticizer, a glycolate type plasticizer, a citrate type plasticizer, a fatty acid ester type plasticizer, a carboxylic acid ester type plasticizer and a polyester type plasticizer are preferably employed, and a non-phosphate type plasticizer such as the polyol ester type plasticizer, the polyester type plasticizer, the citrate type plasticizer and the phthalate type plasticizer are particularly preferable. The combination use of these plasticizers with the UV absorbent having a molecular weight of 490 to 50,000 is preferable from the viewpoint of the compatibility.

The polyol ester is an ester of a di- or more valent aliphatic polyol and a monocarboxylic acid which preferably has an aromatic ring or a cycloalkyl ring in the molecule thereof.

The polyol to be used in the invention is represented by the following Formula 17.

$$R_1\text{—}(OH)_n \qquad \text{Formula 17}$$

In the above, $R_1$ is an n-valent organic group, and n is a positive integer.

Examples of preferable polyol include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol, and triethylene glycol, tetraethylene glycol, dipropylene glycol, tripropylene glycol, sorbitol, trimethylolpropane and Xylitol are preferable.

Among them, the polyol ester using a polyol having 5 or more particularly 5 to 20, carbon atoms is preferred.

The monocarboxylic acid to be used for the polyol ester is not specifically limited and known aliphatic monocarboxylic acids, alicyclic monocarboxylic acids and aromatic monocarboxylic acids are employable. The use of the alicyclic monocarboxylic acid or the aromatic monocarboxylic acid is preferable for improving the moisture permeation ability and the reservation ability.

The followings can be cites as the preferable monocarboxylic acid, but the invention is not limited to them.

As the aliphatic monocarboxylic acid, ones having a linear or branched chain of 1 to 32 carbon atoms are preferably employed. The number of the carbon atom is more preferably from 1 to 20, and further preferably from 1 to 10. Acetic acid is preferably contained for improving the compatibility with the cellulose derivative, and the mixed use of the acetic acid and another monocarboxylic acid is also preferable.

Examples of the preferable monocarboxylic acid include saturated fatty acids such as acetic acid, propionic acid, butylic acid, valerianic acid, capronic acid, enanthic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanic acid, arachinic acid, behenic acid, lignoceric acid, cerotic acid, heptaconic acid, montanic acid, mellisic acid and lacseric acid, and unsaturated fatty acids-such as undecylic acid, oleic acid, sorbic acid, linolic acid, linolenic acid and arachidonic acid.

Preferable examples of the alicyclic monocarboxylic acid include cyclopentene carboxylic acid, cyclohexane carboxylic acid, cycloocatne carboxylic acid and their derivatives.

Preferable examples of the aromatic monocarboxylic acid include benzoic acid and ones constituted by introducing a substituent such as an alkyl group to the benzene ring of benzoic acid such as toluic acid, and aromatic acids having two or more benzene rings such as biphenyl carboxylic acid and naphthalene carboxylic acid and their derivatives, and benzoic acid are particularly preferable.

Though the molecular weight of the polyol ester is not specifically limited, that is preferably from 300 to 3,000, and more preferably from 350 to 1,500. Larger molecular weight is preferable for inhibiting evaporation and smaller molecular weight is preferable for improving the moisture permeation and the compatibility with the cellulose derivative.

The carboxylic acid used in the polyol ester may be one kind or a mixture of two or more kinds. The OH groups of the polyol may be entirely esterized or partially leaved.

The concrete compounds of polyol ester are listed below.

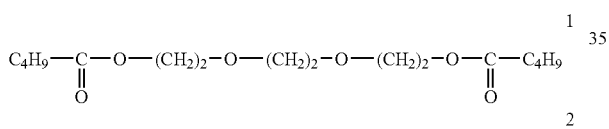

1

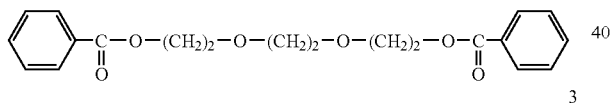

2

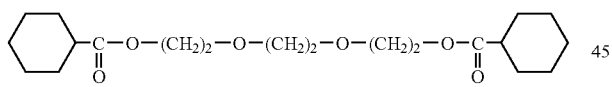

3

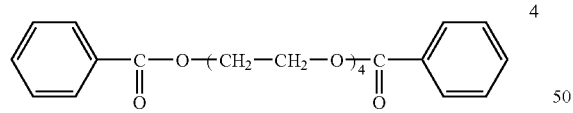

4

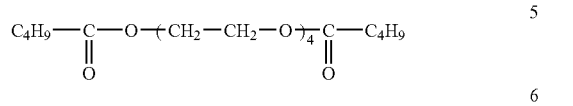

5

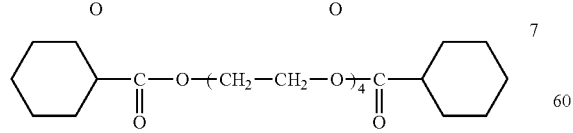

6

7

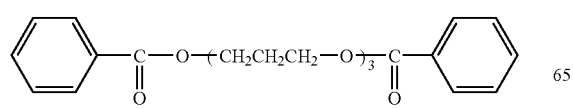

8

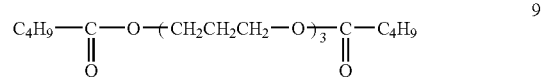

9

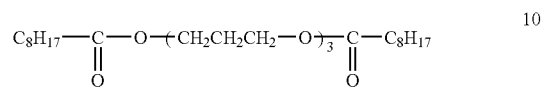

10

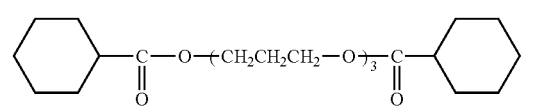

11

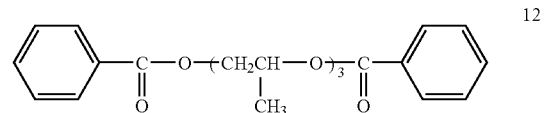

12

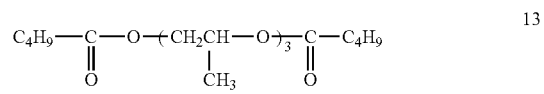

13

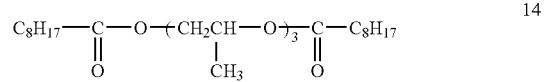

14

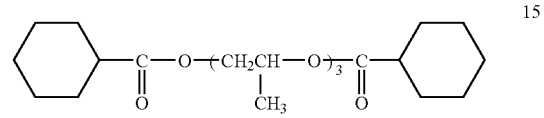

15

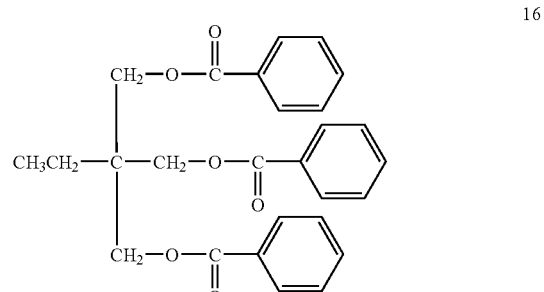

16

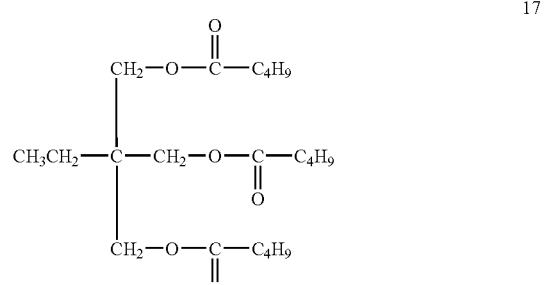

17

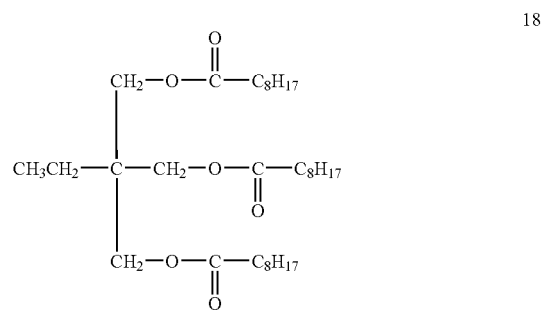

18

19
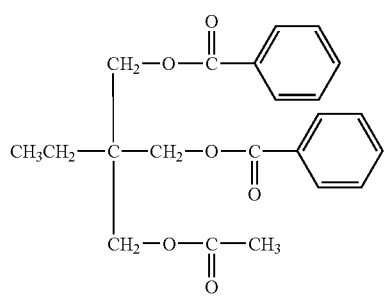
20
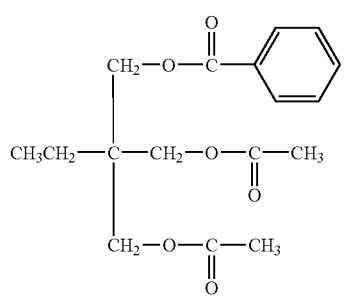
21
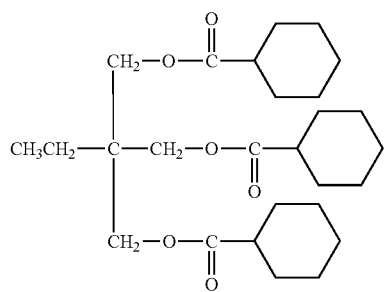
22
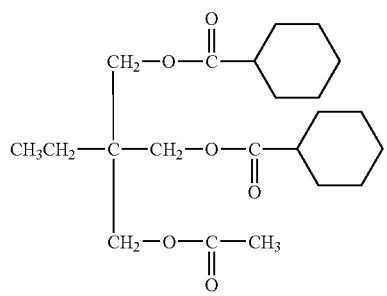
23
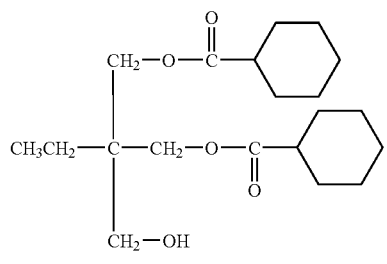
24
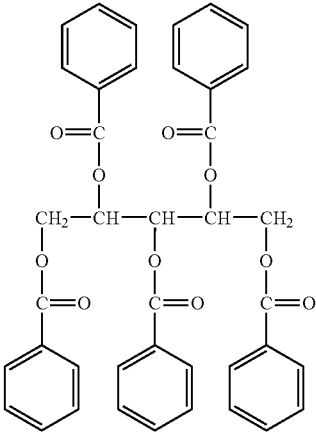
25
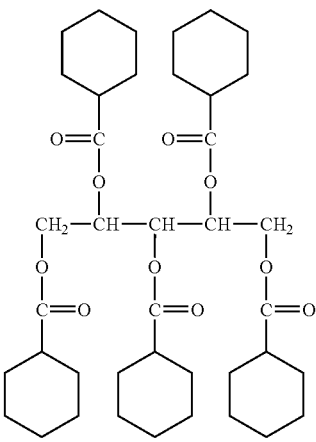
26
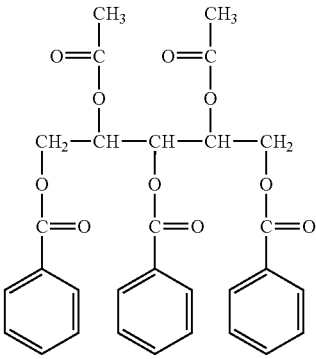
27
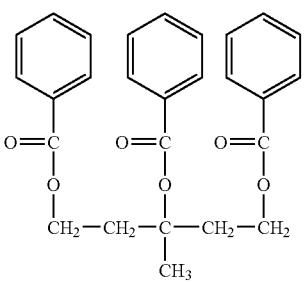

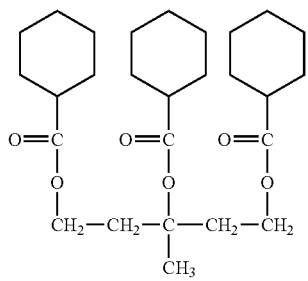

28

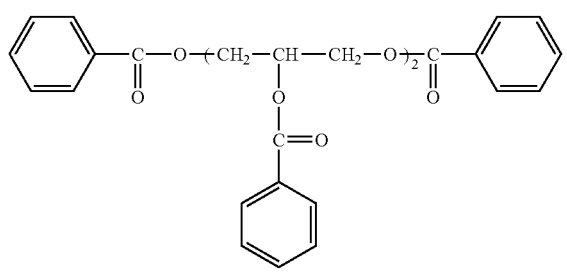

29

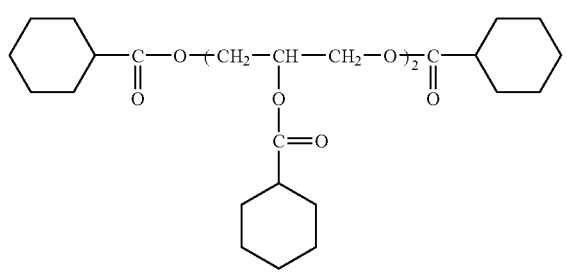

30

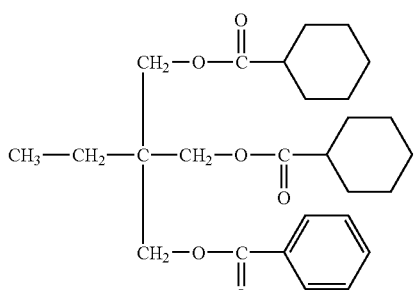

31

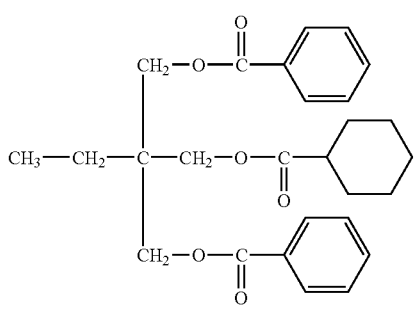

32

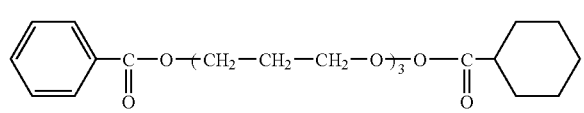

33

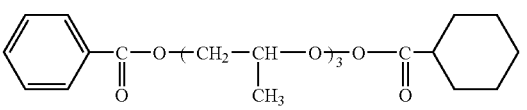

34

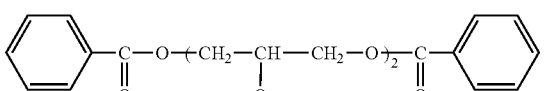

35

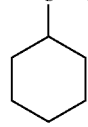

The polyester type plasticizers each having a cycloalkyl group in the molecule thereof are also preferably employable. Though there is no limitation on the polyester type plasticizer, plasticizers represented by the following Formula 18 are preferable.

$$B\text{-}(G\text{-}A)_n\text{-}G\text{-}B \qquad \text{Formula 18}$$

In the above formula, B is a residue of benzene monocarboxyllic acid, G is a residue of alkylene glycol having from 2 to 12 carbon atoms, a residue of aryl glycol having from 6 to 12 carbon atoms or a residue of oxyalkylene glycol having from 4 to 12 carbon atoms, A is a residue of alkylene dicarboxylic acid having from 4 to 12 carbon atoms or a residue of aryl dicarboxylic acid having from 6 to 12 carbon atoms, and n is an integer of 0 or more. The polyester type plasticizer is constituted by the benzene monocarboxylic acid residue represented by B, the alkylene glycol residue, oxyalkylene glycol residue or aryl glycol residue represented by G and the alkylene dicarboxylic acid residue or aryl dicarboxylic acid residue represented by A, which can be obtained by reaction similar to that for usual polyester plasticizer.

As the benzene dicarboxylic acid component of the polyester plasticizer relating to the invention, for example, benzoic acid, para-tertiary-butylbenzoic acid, ortho-toluic acid, meta-toluic acid, para-toluic acid, dimethylbenzoic acid, ethylbenzoic acid, normal-poropylbenzoic acid, aminobenzoic acid and actoxybenzoic acid are employable. They may be used solely or a mixture of two or more kinds.

As the alkylene glycol component having from 2 to 12 carbon atoms relating to the invention, for example, ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol and 1,12-ocatadecandiol are employable. These glycols may be used solely or in combination of two or more kinds thereof.

As the oxyalkylene glycol component having 4 to 12 carbon atoms of the aromatic terminal ester relating to the invention, for example, diethylene glycol, triethylene glycol, tetraethylene glycol, dipropylene glycol and tripropylene glycol are applicable. These glycols may be used solely or in combination of two or more kinds thereof.

As the alkylene dicarboxylic acid component having 4 to 12 carbon atoms of the aromatic terminal ester relating to the invention, for example, succinic acid, maleic acid, fumalic acid, glutaric acid, adipic acid, azelaic acid, sebacic acid and dodecane dicarboxylic acid are applicable. They may be used solely or in combination of two or more kinds thereof. Examples of the arylene dicarboxylic acid component include phthalic acid, terephthalic acid, 1,5-naphthalene dicarboxylic acid and 1,4-naphthalene dicarboxylic acid.

The number average molecular weight of the polyester plasticizer to be employed in the invention is from 250 to 10,000, preferably from 300 to 5,000, and more preferably from 300 to 2,000. The acid value of that is preferably not more than 0.5 mg KOH/g, and more preferably not more than 0.3 mg KOH/g, and the hydroxyl value is preferably not more than 25 mg KOH/g, and more preferably not more than 15 mg KOH/g.

Synthesizing examples of the polyester type plasticizer having aromatic terminals to be used in the invention is described below.

<Sample No. 1 (Sample of Aromatic Terminal Polyester)>

Into a reaction vessel, 263 parts (2.5 moles) of adipic acid, 610 parts, 418 parts of (5.5 moles) of 1,2-propylene glycol, 610 parts (5 moles) of benzoic acid, and 0.30 parts of tetraisopropyltitanate as a catalyst were charged at once. The resultant mixture was stirred under nitrogen gas stream and heated at a temperature from 130 to 250° C. until the acid value become to not more than 2 while refluxing excessive mono-valent alcohol by a reflux condenser and continuously removing formed water. Then distillable constituent was removed at a temperature of from 200 to 230° C. under a reduced pressure of $1.33 \times 10^4$ Pa, and finally not more than $4 \times 10^2$ Pa. After that, the resultant substance was filtered to obtain aromatic terminal polyester having the following properties.

Viscosity (25° C., mPa·s): 815

Acid value: 0.4

<Sample No. 2 ((Sample of Aromatic Terminal Polyester)>

An aromatic terminal polyester sample having the following properties was obtained in the same manner as in Sample No. 1 except that 265 parts (2.5 moles) of adipic acid, 610 parts (5 moles) of benzoic acid and 583 parts (5.5 moles) of diethylene glycol and 0.45 parts of tetraisopropyltitanate as the catalyst are put into the reaction vessel.

Viscosity (25° C., mPa·s): 90

Acid value: 0.05

<Sample No. 3 ((Sample of Aromatic Terminal Polyester)>

An aromatic terminal polyester sample having the following properties was obtained in the same manner as in Sample No. 1 except that 410 parts (2.5 moles) of phthalic acid, 610 parts (5 moles) of benzoic acid and 583 parts (5.5 moles) of dipropylene glycol and 0.40 parts of tetraisopropyltitanate as the catalyst are put into the reaction vessel.

Viscosity (25° C., mPa·s): 43,400

Acid value: 0.2

Concrete compounds of the aromatic terminal polyester type plasticizer are listed below, but the invention is not limited them.

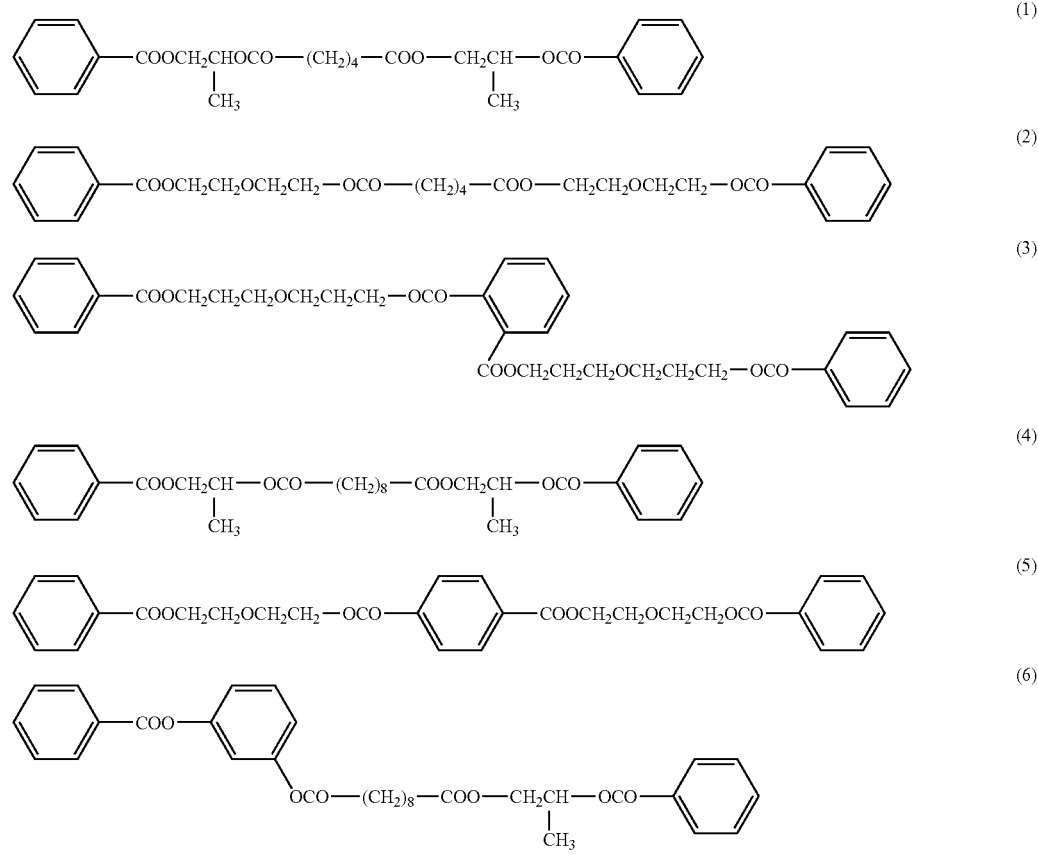

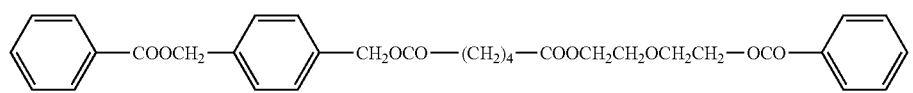
(7)

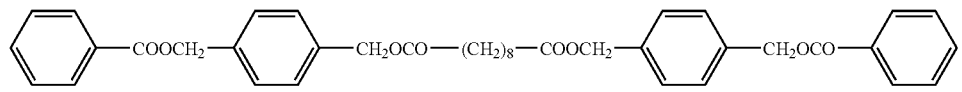
(8)

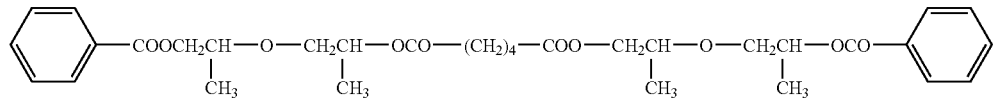
(9)

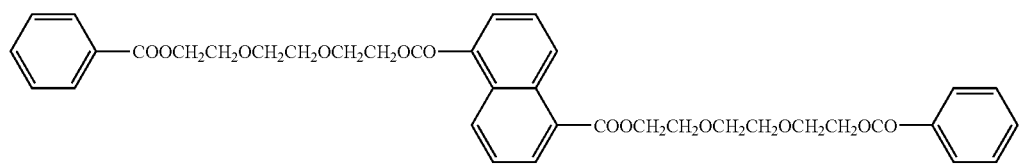
(10)

The content of the polyester type plasticizer in the cellulose ester film of the invention is preferably from 1 to 20%, and particularly from 2 to 11%, by weight.

The optical compensation film of the invention preferably contains a plasticizer other than those described above.

The dissolving out of the plasticizer can be inhibited by the combination use of two or more kinds of the plasticizer. Though the reason of such the effect is not cleared yet, it is supposed that the dissolving out of the plasticizer is inhibited by that the adding amount per one kind can be reduced, and interaction between the two kinds of the plasticizer, and that between the plasticizers and the cellulose ester.

Examples of phthalate type plasticizer include diethyl phthalate, dimethoxethyl phthalate, dimethyl phthalate, dioctyl phthalate, dibutyl phthalate, di-2-ethylhexyl phthalate, dioctyl phthalate, dicyclohexyl phthalate and dicyclohexyl terephthalate. Moreover, a phthalate dimer represented by Formula (1) described in Japanese Patent O.P.I. Publication No. 11-349537 is preferably employed. In concrete, Compound-1 and Compound-2 described in paragraphs 23 and 26 of the patent document are preferably employable.

Formula 1

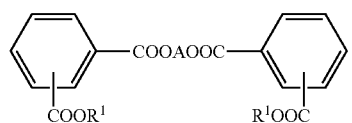

A: —(CH$_2$)$_n$— or —(CH$_2$CH$_2$O)— n: An integer of from 1 to 10

R$^1$: An alkyl group having from 1 to 12 carbon atoms which may substituted by an alkoxycarbonyl group Compound 1

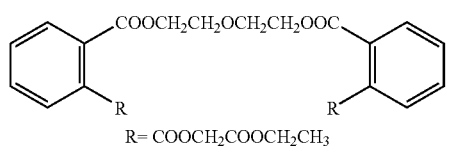

R= COOCH$_2$COOCH$_2$CH$_3$

Compound 2

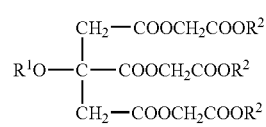

The phthalate type dimer compound is a compound having the chemical structure represented by the above Formula 1, which can be obtained by dehydrating esterization reaction by mixing and heating two phthalic acids with di-valent alcohol. The average molecular weight of the phthalate type dimer or the bisphenyl type compound having terminal hydroxyl groups is preferably from 250 to 3,000, and particularly preferably from 300 to 1,000. The molecular weight of less than 250 causes a problem on the thermal stability, volatility and mobility of the plasticizer and one having a molecular weight of not more than 3,000 is superior in the compatibility and plasticizing ability of the plasticizer and in the facility of the processing, transparency and the mechanical property of the fatty acid cellulose ester resin composition.

The citrate type plasticizer is not specifically limited and, acetyl trimethyl citrate, acetyl triethyl citrate and acetyl tributyl citrate can be exemplified. Citrate compounds represented by the following Formula 19 are preferred.

Formula 19

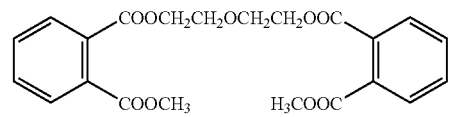

In the formula R$^1$ is a hydrogen atom or an aliphatic acyl group, and R$^2$ is an alkyl group.

In Formula 19, the aliphatic acyl group represented by R$^1$ is preferably one having from 1 to 12, and particularly preferably from 1 to 5, carbon atoms even though there is no specific limitation to the aliphatic acyl group. In concrete, a formyl group, a propionyl group, a butylyl group, a valeryl group, a palmitoyl group and an oleyl group can be exemplified. Though the alkyl group represented by R$^2$ is not specifically limited and may have a straight chain or branched chain, and which is preferably an alkyl group having from 1 to 24, and particularly preferably from 1 to 4, carbon atoms. In concrete, a methyl group, an ethyl group, an n-propyl group, an isopropyl group, an n-butyl group, an isobutyl group, a sec-butyl group and t-butyl group are exemplified. Particularly preferable plasticizer for the acetic cellulose ester is ones in which $R^1$ is a hydrogen atom and $R^2$ is a methyl group or an ethyl group, and ones in which $R^1$ is an acetyl group and $R^2$ is a methyl group or an ethyl group.

<Preparation Method of the Citrate Compound in which $R^1$ is a Hydrogen Atom>

Among the citrate compounds to be used in the invention, ones in which $R^1$ is a hydrogen atom can be produced by a known method. As the known method, a method described in British Patent No. 931,781 can be applied in which a phthalyl glycolate is produced from a half ester of phthalic acid and an alkyl α-halogenoacetate. One mole of trisodium citrate, tripotassium citrate, hereinafter referred to as citric acid raw material, preferably sodium citrate is reacted with an alkyl α-monohalogenoacetate as the alkyl ester corresponding to $R^2$ such as methyl monochloroacetate and ethyl monochloroacetate in an amount larger than the stoichiometric amount, preferably from 1 to 10 moles, and more preferably from 2 to 5 moles. Hydrous raw materials are employed as possible since the presence of water in the reaction system lowers the yield of the objective substance. For the reaction, an open-chain or cyclic tertiary amine such as trimethylamine, triethylamine, tri-n-propylamine, triisopropylamine, tri-n-butylamine and dimethylcyclohexylamine can be employed as a catalyst. Among them, terethylamine is preferable. The using amount of the catalyst is from 0.01 to 1.0 mole, and preferably from 0.2 to 0.5 moles. The reaction is performed at a reaction temperature of from 60 to 150° C. for a time of from 1 to 24 hours. Though any solvent is not necessary, toluene, benzene, xylene and methyl ethyl ketone can be employed. After the reaction, for example, sub-products and the catalyst are removed by adding water and washing the oil layer, after that unreacted raw materials were separated by distillation to isolate the objective substance.

<Production Method of Citrate Compound in which $R^1$ is an Aliphatic Acyl Group>

The citrate compound relating to the invention in which $R^1$ is an aliphatic acyl group and $R^2$ is an alkyl group can be produced by employing the above citrate compound in which $R^1$ is a hydrogen atom. Namely, 1 mole of the citrate compound is reacted with from 1 to 10 moles of a halogenoacyl group corresponding to the aliphatic cyano group represented by $R^1$ such as formyl chloride and acetyl chloride. As the catalyst, 0.1 to 2 moles of basic pyridine can be used to 1 mole of the citrate compound. The reaction can be performed at a temperature of from 80 to 100° C. for a time of from 1 to 5 hours with no solvent. After the reaction, water and a water-insoluble organic solvent such as toluene were added to the reacting mixture to dissolve the objective substance into the organic solvent, and then the water layer and the solvent layer are separated. The organic solvent layer is washed by water and the objective substance can be isolated by an ordinary method such as distillation.

The citrate compound to be used in the invention is preferable for obtaining the effects of the invention when that is combined with the UV absorbent having a weight average molecular weight of from 490 to 50,000.

The content of the citrate compound in the film is preferably from 1 to 30%, and more preferably from 2 to 20%, by weight.

The glycolate type plasticizer is not specifically limited, and a glycolate type plasticizer having an aromatic ring or a cycloalkyl ring is preferably employed. Examples of the preferably usable glycolate type plasticizer include butylphthalylbutyl glycolate, ethylphthalylethyl glycolate and methylphthalylethyl glycolate.

As the phosphate type plasticizer, triphenyl phosphate, tricresyl phosphate, cresyl diphenyl phosphate, octyl diphenyl phosphate, diphenyl biphenyl phosphate, octyl phosphate and tributyl phosphate can be cited. In the invention, the content ratio of the phosphate type plasticizer is not more than 40% by weight of the total content of plasticizer, and particularly preferably the content of the phosphate type plasticizer is less than 1% by weight. It is further preferable that the phosphate type plasticizer is not added.

Ethylene glycol ester type plasticizer: Concretely, an ethylene glycol alkyl ester type plasticizer such as ethylene glycol diacetate, ethylene glycol dibutylate, an ethylene glycol cycloalkyl ester type plasticizer such as ethylene glycol dicyclopropyl carboxylate and ethylene glycol dicyclohexyl calboxylate, and an ethylene glycol aryl ester type plasticizer such as ethylene glycol benzoater and ethylene glycol di-4-methylbenzoate are cited. The alkylate group, the cycloalkylate group and the arylate group in the molecule may be the same or different and may have a substituent. Moreover, the alkylate group, the cycloalkylate group and the arylate group may be mixed and the substituents may be bonded by a covalent bond. The ethylene glycol moiety also may be substituted, and the partial structure of the ethylene glycol ester may be partially or regularly bonded to the polymer as a pendant, and may be introduced as a partial structure of the antioxidant, acid scavenger or UV absorbent.

Glycerol ester type plasticizer: Concretely, a glycerol alkyl ester such as triacetine, toributyline, glycerol diacetate caprylate and glycerol oleate propionate, a glycerol cycloalkyl ester such as glycerol tricyclopropylcarboxylate and glycerol tricyclohexylcarboxylate, a glycerol aryl ester such as glycerol benzoate and glycerol 4-methylbenzoate, a diglycerol alkyl ester such as diglycerol tetraacetylate, diglycerol tetrapropionate, diglycerol acetate tricalrylate and diglycerol tetralaurate, a diglycerol cycloalkyl ester such as diglycerol tetracyclobutylcarblxylate and diglycerol tetracyclopentylcarboxylate, and a diglycerol aryl ester such as diglycerol tetrabenzoate and diglycerol 3-methylbenzoate are cited. The alkylate group, the cycloalkylate group and the arylate group in the molecule may be the same or different and may have a substituent. Moreover, the alkylate group, the cycloalkylate group and the arylate group may be mixed and the substituents may be bonded by a covalent bond. The ethylene glycol moiety also may be substituted, and the partial structure of the ethylene glycol ester may be bonded partially or regularly to the polymer as a pendant, and may be introduced as a partial structure of the antioxidant, acid scavenger or UV absorbent.

Carboxlate type plasticizer: Concretely, an alkyl alkyldicarboxylate type plasticizer such as dodecylmalonate (C1), dioctyladipate (C4), dibutylsebacate (C8), an alkyl alkyldicarboxylate type plasticizer such as dicyclopentyl succinate and dicyclohexyl adipate, a aryl alkyldicarboxylate type plasticizer such as diphenyl succinate and di-4-methyl-phenyl glutarate, an alkyl cycroalkyldicarboxylate type plasticizer such as didecylbicyclo 1,4-cyclohexane-dicarboxylate and didecylbicyclo[2.2.1]heptane-2,3-dicarboxylate, a cycloalkyl cycloalkyldicarboxylate type plasticizer such as dicyclohexyl 1,2-cyclobutane-dicarboxylate and dicyclopropyl 1,2-dicyclohexyl-dicarboxylate, an aryl cycloalkyldicarboxylate type plasticizer such as diphenyl 1,1-cyclopropyldicarboxylate and di-2-naphthyl 1,4-cycloheanedicarboxylate, an alkyl aryldicarboxylate such as diethyl phthalate, dimethyl phthalate, dioctyl phthalate, dibutyl phthalate and 2-2-ethylhexyl phthalate, a cycloalkyl aryldicarboxylate type plasticizer such as dicyclopropyl phthalate and dicyclohexyl phthalate, and a aryl aryldicarboxylate such as diphenyl phthalate and di-4-methylphenyl phthalate are cited. The alkoxy group, and the cycloalkoxy group in the molecule may be the same or different and may have one substituent, and the substituent may further have a substituted. Moreover, the alkyl group and the cycloalkyl group may be mixed and the substituents may be bonded with together by a covalent bond. The aromatic ring of the phthalic acid also may be substituted, and the plasticizer may be a polymer such as a dimer, trimer and tetramer. The partial structure of the phthalate may be partially or regularly bonded to the polymer as a pendant, and may be introduced as a partial structure of the antioxidant, acid scavenger or UV absorbent.

Polycarboxylate type plasticizer: Concretely, an alkyl alkylpolycarboxlate type plasticizer such as tridecyl tricarbalate and teributyl meso-butan-1,2,3,4-tetracarboxylate, a cycloalkyl alkylpolycarboxylater type plasticizer such as tricyclohexyl tricarbalate and tricyclopropyl 2-hydroxy-1,2,3-propanetricarboxylate, an aryl alkylpolycarboxylate type plasticizer such as triphenyl 2-hydroxy-1,2,3-propanetricarboxylate and tetra-3-methylphenyl tetrahydrofuran-2,3,4,5-tetracarboxylate, an alkyl cycloalkylpolycarboxylate type plasticizer such as tetrahexyl 1,2,3,4-cyclobutane-tetracarboxylate and tetrabutyl 1,2,3,4-cyclopentane-tetracarboxylate, a cycloalkyl cycloalkylpolycarboxylate type plasticizer such as tetracyclopropyl 1,2,3,4-cyclobutane-tetracarboxylate and tricyclohexyl 1,3,5-cyclohexyl-tricarboxylate, an aryl cycloalkylpolycarboxylate type plasticizer such as triphenyl 1,3,5-cyclohexyltricarboxylate and hexa-4-methylphenyl 1,2,3,4,5,6-cyclohexylcarboxylate, an alkyl arylpolycarboxylate type plasticizer such as tridodecyl benzene-1,2,4-tricarboxylate and tetraoctyl benzene-1,2,4,5-tetracarboxylate, a cycloalkyl arylpolycarboxylate type plasticizer such as tricyclopentyl benzne-1,3,5-tricarboxylate and tetracyclohexyl benzene-1,2,3,5-tetracarboxylate, and an aryl arylpolycarboxylate type plasticizer such as triphenyl benzene-1,3,5-tricarboxylate and hexa-4-methylphenyl benzene-1,2,3,4,5,6-hexacarboxylate are cited. The alkoxy group and the cycloalkoxy group may be the same or different, and may be monosubstituted one and the substituent may be further substituted. The alkyl group and the cycloalkyl group may be mixed and the substituents may be bonded with together by a covalent bond. The aromatic ring of the phthalic acid may be substituted and may be a polymer such as a dimer, trimer and tetramer. The partial structure of the phthalate may be partially or regularly bonded to the polymer as a pendant, and may be introduced as a partial structure of the antioxidant, acid scavenger or UV absorbent.

Polymer plasticizer: Concretely, an aliphatic hydrocarbon type polymer, an alicyclic hydrocarbon type polymer, an acryl type polymer such as poly(ethyl acrylate) and poly(methyl methacrylate), a vinyl type polymer such as polyvinyl isobutyl ether) and poly(N-vinylpyrrolidone), a styrene type polymer such as polystyrene and poly(4-hydroxystyrene), a polyester such as poly(butylene succinate), poly(ethylene terephthalate) and poly(ethylene naphthalate), a polyether such as poly(ethylene oxide) and poly(propylene oxide), a polyamide, a polyurethane and a polyurea are cited. The number average molecular weight is preferably about from 1,000 to 500,000, and particularly from 5,000 to 200,000. A problem of volatility is caused when the molecular weight is less than 1,000, and the plasticizing ability is lowered and the mechanical properties of the cellulose ester composition are badly influenced when the molecular weight exceeds 500,000. Such the polymer plasticizers may be a homopolymer constituted by one kind of repeating unit or a copolymer constituted by plural kinds of repeating units. These polymers may be used in combination of two or more kinds thereof, and may contain another plasticizer, antioxidant, acid scavenger, UV absorbent, slipping agent and matting agent.

These plasticizers may be employed solely or in combination of two or more kinds thereof. The entire content of the plasticizer in the film of less than 1% by weight is not preferable since the effect of reducing the moisture permeability of the film is insufficient. When the content exceeds 30% by weight, problems of the compatibility and the bleed out tend to be caused and the physical properties of the film are degraded. Therefore, a content of from 1 to 30% by weight is preferable and that of from 5 to 25% by weight is more preferable and that from 8 to 20% by weight is particularly preferable.

(Mixing of the Cellulose Ester and Additives)

In the invention, it is preferable that the cellulose ester is mixed with additives such as the plasticizer and the UV absorbent before melting by heat.

For mixing the additives, a method by mixing fine powder of the cellulose ester and fine powder of the additives, and a method in which the cellulose ester is dissolved in a solvent and the additives are dissolved or dispersed in the resultant solution and then the solvent is removed, are applicable. The solvent can be removed by known methods such as a method of drying in liquid, a method of drying in gas, a method by co-precipitation in liquid, a freeze drying method and solution casting method can be applied. The mixture of the cellulose and the additives after removing the solvent can be prepared in a form of powder, granule, pellet and film.

Though the mixing of the additives is carried out by dissolving the solid cellulose ester, the separation and solidification may be simultaneously carried out in the synthesizing process of the cellulose ester.

In the method of drying in liquid, for example, an aqueous solution of a surfactant such as sodium laurylsulfate is added to a solution of cellulose ester and the additives and dispersed for emulsifying. The solvent is removed by distillation under normal or reduced pressure to obtain a dispersion of the cellulose ester mixed with the additives. A centrifugal or decantation treatment is preferably applied for removing the surfactant. For emulsifying, various methods can be utilized and an emulsifying dispersion apparatus by ultrasonic wave, shearing by high speed rotation or high pressure can be applied.

Both of a butch system and a continuous system can be applied for the emulsifying by the ultrasonic wave. The butch system is suitable for preparation of a small amount of sample and the continuous system is suitable for preparation of a large amount of sample. For example, an apparatus such as UH-600SR, manufactured by SMT Co., Ltd., can be applied for the continuous system. In the case of the continuous system, the applying time of ultrasonic wave can be decided by an expression of (dispersing chamber volume)/(flowing rate×circulation number). When plural ultrasonic wave sources are employed, the applying time is the sum of the applying time of each of the ultrasonic wave sources. The applying time is practically not more than 10,000 seconds. When a dispersing time of more than 10,000 is necessary, the time should be shortened by a means such as change of the dispersion agent in practice since the load onto the manufacturing process becomes large. Accordingly, the dispersing time of more than 10,000 is not necessary, and preferably time is form 10 to 2,000 seconds.

For the emulsification by the high speed rotation shearing apparatus, for example, a dispermixer, a homomixer and an ultramixer can be applied. The type of the disperser can be selected depending on the viscosity of the liquid on the occasion of the emulsification.

For the emulsification by high pressure, an apparatus such as LAB 2000, manufactured by SMT Co., Ltd can be applied. The emulsification and dispersion capacity is proportional to the pressure applied to the sample. The pressure is preferably within the range of from $10^4$ kPa to $5 \times 10^5$ kPa.

An anionic, cationic and amphoteric surfactant and a polymer dispersing agent can be employed as the surfactant. The surfactant can be selected according to the solvent and the size of the objective emulsified particle.

In the gas drying method, a solution of the cellulose ester and a solvent is sprayed and dried by a spray dryer such as GS310, manufactured by Yamato Kagaku Co., Ltd.

In the solvent co-precipitation method, a solvent solution of the cellulose ester is added to a poor solvent for the cellulose ester and the additive. The poor solvent can be mixed with the solvent of the cellulose ester in an optional ratio. The poor solvent may be a mixed solvent. The poor solvent may be added to a solution of a solvent and the cellulose ester.

The mixture of the cellulose ester and the additive precipitated by the above procedure can be isolated by filtering and drying.

In the mixture of the cellulose ester and the additive, the particle diameter of the additive is preferably not more than 1 μm, more preferably not more than 50 nm, and particularly preferably not more than 200 nm. Smaller particle size is preferable because the mechanical and optical properties of the melt-formed matter become uniform.

The mixture of the cellulose ester and the additive and an additive to be added on the occasion of the melting by heat are preferably dried before or at the time of melting by heat. The drying is to remove water absorbed by any of the material to be molten, water or the solvent employed at the preparation of the mixture of the cellulose ester and the additive or the solvent mixed at the time of synthesizing of the additive.

Known method such as a heating method, a pressure reducing method and a method by heating under reduced pressure can be applied for drying the mixture of the cellulose and the additive. The drying may be performed in air or nitrogen gas as inactive gas. When such the drying method is applied, the temperature is preferably in a range in which the materials are not decomposed.

The content of the moisture or solvent remaining after the drying process is preferably not less than 1%, more preferably not less than 0.1%, and further preferably not less than 0.01%, by weight of the entire weight of the film constituting materials. The temperature for the drying is preferably not less than 100° C. and not more than Tg of the material. The drying temperature is more preferably from 100° C. to (Tg−5)° C., and further preferably from 110° C. to (Tg−20)° C. when the prevention of fusion of the materials with together is considered. The drying time is preferably from 0.5 to 24 hours, more preferably from 1.5 to 12 hours, further preferably from 1 to 18 hours, and particularly preferably from 1.5 to 12 hours. When the drying temperature is lower than the above range, the drying tends to be insufficient or the drying time tends to become too long. When the material having a Tg is heated by a temperature of higher than the Tg, the material is fused so that the material tends to be difficultly handled.

The drying process may be divided into two or more steps, for example, the material may be molten and cast through a storage process for preliminary drying and a drying process to be applied in the range of from just before to a week before the melt-casting.

(Additives)

As the additives, an antioxidant, an acid capturing agent, a light-stabilizer, a peroxide decomposing agent, a radical capturing agent, a metal inactivating agent, a metal compound such as a matting agent, a retardation controlling agent, a dye and a pigment car cited additionally to the plasticizer and the UV absorbent. Another additive having one of the above functions can be employed even when the compound is usually not classified into the above.

The additives are employed for preventing the oxidation of the film constituting material, capturing an acid formed by the decomposition of the material, inhibiting or preventing the decomposing reaction caused by a radical formed by light or heat, inhibiting deterioration such as coloring, molecular weight lowering, decomposition of which cause is not cleared, and formation of a volatile component caused by decomposition of the raw material, and for providing a function such as a moisture permeation ability and a high slipping ability.

Besides, the decomposition reaction of the film constituting material is considerably progressed by melting by heat so that the degradation in the strength of the constituting material by coloring and molecular weight lowering is caused sometimes. Moreover, formation of an undesirable volatile component tends to be caused by the decomposition reaction of the film constituting material.

It is preferable that the film constituting material contains the additives on the occasion of the melting by heat, and the material containing the additives is superior in the inhibition of the lowering in the strength caused by the degradation and the decomposition of the material, and in the keeping of the inherent strength of the material.

Furthermore, the addition of the above additives is effectual for inhibiting the coloring and keeping the high transparency and the low haze on the occasion of the melting by heat. For obtaining such the effect, know technique such as use of inert as such as nitrogen or argon, deaeration by reduced pressure or vacuum and operation in a closed environment can be also applied. At least one of the above three method can be applied together with the addition of the additives. It is preferable for the object of the invention that the degradation of the film constituting material can be inhibited by reducing the probability of contacting the material with oxygen.

The optical compensation film is preferably utilized as the polarization plate protective film, and the presence of the additives in the film constituting material is preferable for improving the durability of the polarization plate according to the invention and the polarizing elements constituting the polarization plate.

In the liquid crystal display using the polarization plate of the invention, the durability of the optical compensation can be improved since the deterioration and the degradation are inhibited by the presence of the additives, and the displaying quality of the liquid crystal display is superior since the functions of the optical compensation design of the optical compensation film can be held for long period.

The additives are described in detail below.

(Antioxidant)

As the antioxidant, a phenol type antioxidant, a phosphor type antioxidant, a sulfur type antioxidant, a heat resistive stabilizer and an oxygen scavenger are applicable, and the phenol type antioxidant, particularly an alkyl-substituted phenol type antioxidant, are preferred. The coloring and the lowering of the strength caused by the heating or oxidation on the occasion of the film formation can be prevented without degradation in the transparency and the heat resistivity by the addition of such the antioxidants. The antioxidants may be employed solely or in combination of two or more kinds thereof. The adding amount of the antioxidant can be optionally decided within the range in which the objects of the invention is not disturbed, and the adding amount is preferably from 0.001 to 5, and more preferably from 0.01 to 1, parts by weight to 100 parts by weight of the polymer.

As the antioxidant, hindered phenol antioxidants are preferable, which include 2,6-dialkylphenol derivatives such as those described in columns 12 to 14 of U.S. Pat. No. 4,839,405. Such the compounds include those represented by the following Formula 20.

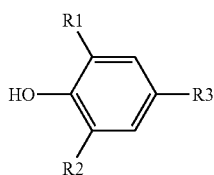

Formula 20

In the above formula, R1, R2 and R3 are each a substituted or unsubstituted alkyl group. Concrete examples of the hindered phenol compound include n-octadecyl 3-(3,5-di-t-butyl-4-hydroxyphenyl)propionate, n-octadecyl 3-(3,5-di-t-butyl-4-hydroxyphenyl)acetate, n-octadecyl 3,5-di-t-butyl-4-hydroxybenzoate, n-hexyl 3,5-di-t-butyl-4-hydroxyphenylbenzoate, n-dodecyl 3,5-di-t-butyl-4-hydroxyphenylbenzoate, neo-dodecyl 3-(3,5-di-t-butyl-4-hydroxyphenyl)propionate, dodecyl β-(3,5-di-t-butyl-4-hydroxyphenyl)propionate, ethyl α-(4-hydroxy-3,5-di-t-butyl phenyl)iso butylate, octadecyl α-(4-hydroxy-3,5-di-t-butyl phenyl)iso butylate, octadecyl α-(4-hydroxy-3,5-di-t-butyl-4-hydroxy-phenyl)propionate, 2-(n-octyl thio)ethyl 3,5-di-t-butyl-4-hydroxy-benzoate, 2-(n-octyl thio)ethyl 3,5-di-t-butyl-4-hydroxyphenylacetate, 2-(n-octadecylthio)ethyl 3,5-di-t-butyl-4-hydroxy-phenylacetate, 2-(n-octadecylthio) ethyl 3,5-di-t-butyl-4-hydroxybenzoate, 2-(2-hydroxyethylthio)ethyl 3,5-di-t-butyl-4-hydroxybenzoate, diethyl glycol bis-(3,5-di-t-butyl-4-hydroxy-phenyl)propionate, 2-(n-octadecylthio)ethyl 3-(3,5-di-t-butyl-4-hydroxy-phenyl)-propionate, stearylamido N,N-bis[ethylene 3-(3,5-di-t-butyl-4-hydroxyphenyl)propionate], n-butylimino N,N-bis-[ethylene 3-(3,5-di-t-butyl-4-hydroxyphenyl)-propionate], 2-(2-stearoyloxyethylthio)ethyl 3,5-di-t-butyl-4-hydroxybenzoate, 2-(2-stearoyloxyethylthio)ethyl 7-(3-methyl-5-t-butyl-4-hydroxyphenyl)heptanate, 1,2-poropylene glycol bis-[3-(3,5-di-t-butyl-4-hydroxyphenyl)propionate], ethylene glycol bis-[3-(3,5-di-t-butyl-4-hydroxyphenyl)propionate], neopentyl glycol bis-[3-(3,5-di-t-butyl-4-hydroxyphenyl)propionate], ethylene glycol bis-[3-(3,5-di-t-butyl-4-hydroxyphenyl)acetate], glycerol-1-n-octadecanoate-2,3-bis-(3,5-di-t-butyl-4-hydroxyphenylacetate), Pentaerythrytol tetrakis-[3-(3',5'-di-t-butyl-4-hydroxy-phenyl)propionate], 1,1,1-trimethylolethane-tris-[3-(3.5.-di-t-butyl-4-hydroxyphenyl)propionate], sorbitol hexa-[3-(3,5-di-t-butyl-4-hydroxyphenyl)propionate, 2-hydroxyethyl 7-(3-methyl-5-t-butyl-4-hydroxyphenyl)-propionate, 2-stearoyloxyethyl 7-(3-methyl-5-t-butyl-4-hydroxyphenyl)heptanoate, 1,6-n-hexanediol bis-[(3',5'-di-t-butyl-4-hydroxyphenyl)propionate] and pentaerythrytol tetrakis(3,5-di-t-butyl-4-hydroxycinnamate). The hindered phenol type antioxidant is put on the market, for example, from Ciba Specialty Chemicals Co., Ltd., under the commercial name of Irganox 1076 and Irganox 1010.

Concrete examples of another antioxidant include a phosphor type antioxidant such as trisnonylphenyl phosphite and tris(2,4-di-tert-butylphenyl)phosphite, a sulfur type antioxidant such as dilauryl 3,3'-thiopropionate, dimyristyl 3,3'-thiopropionate, distearyl 3,3'-thiopropionate and pentaerythrytyl tetrakis(3-laurylthiopropionate), an antiheating stabilizer such as 2-tert-butyl-6-(3-tert-butyl-2-hydroxy-5-methylbenzyl)-4-methylphenyl-acrylate and 2-[1-(2-hydroxy-3,5-di-tert-pentylphenyl-acrylate, a 3,4-dihydro-2H-1-benzopurane type compound described in Japanese Patent Examined Publication No. 8-27508, a 3,3'-spyrodichroman type compound, a 1,1-spyroindan type compound, morpholine, thiomorpholine, thiomorpholine oxide, thiomorpholine dioxide, a compound having piperazine skeleton as a partial structure thereof, and an oxygen scavenger such as a dialkoxybenzene type compound described in Japanese Patent O.P.I. Publication No. 3-174150. A part of each of these antioxidants may be partially or regularly bonded with a polymer in a form of pendant. Moreover, the plasticizer may be included as a partial structure of an additive such as an antioxidant, an acid scavenger and a UV absorbent.

(Acid Capturing Agent)

The acid capturing agent is preferably ones containing epoxy compounds as the acid capturing agent described in U.S. Pat. No. 4,137,201. Such the epoxy compounds as the acid capturing agent are known in the field of the art, and examples of which include diglycidyl ether of various poly glycols, particularly polyglycols and diglycidyl ether of glycerol derived by condensation of 1 mole of polyglycol and 8 to 40 moles ethylene oxide, metal epoxy compounds such as ones usually employed together with vinyl chloride polymer, condensation products of ether epoxide, glycidyl ethers of bisphenol A namely 4,4'-dihydroxydiphenyldimethylmethane, epoxides of a unsaturated fatty acid, particularly esters of an alkyl group having from 2 to 4 carbon atoms and a fatty acid having 2 to 22 carbon atoms such as butyl epoxystearate, various triglycerides of a long chain fatty acid epoxide such as soy bean oil epoxide, and of plant oil epoxides or natural unsaturated oil which are called as natural glyceride epoxide or unsaturated fatty acid. Eopxy group-containing epoxide ester compound available on the market, Epon 815c, manufactured by Miller-Stephenson Chemical Co., Ltd, and another epoxyide ether oligomer condensate represented by Formula 21 are particularly preferred.

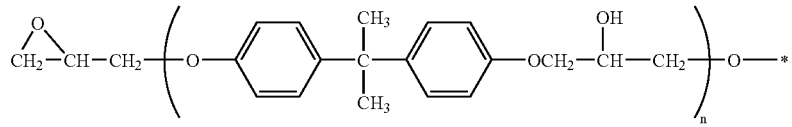

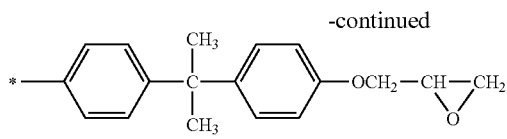

In the above formula, n is an integer of 0-12. Further employable acid capturing agent includes those described in Japanese Patent O.P.I. Publication No. 5-194788, paragraphs 87 to 105.

(Light-Stabilizing Agent)

As the light-stabilizing agent, hindered amine light-stabilizing agents (HALS) can be cited. They are known compounds including, for example, 2,2,6,6-tetraalkyl-piperidine compounds, acid adducts salt thereof and their complexes with a metal described in columns 5 to 11 of U.S. Pat. No. 4,619,956 and columns 3 to 5 of U.S. Pat. No. 4,839,405, and compounds represented by the following Formula 22.

Formula 22

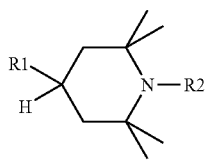

In the above formula, R1 and R2 are each a hydrogen atom or a substituent. Concrete examples of the hindered amine light-stabilizing compound include 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, 1-(4-t-butyl-2-butenyl)-4-hydroxy-2,2,6,6-tetramethylpiperidine, 4-stearyloxy-4-hydroxy-2,2,6,6-tetramethylpiperidine, 1-ethyl-4-salyciloyloxyl-2, 2,6,6-tetramethylpiperidine, 4-methacryloyloxy-1,2,2,6,6-pentamethylpiperidine, 1,2,2,6,6-pentapiperidine-4-yl-β(3,5-di-t-butyl-4-hydroxyphenyl)-propionate, 1-benzyl-2,2,6,6-teramethyl-4-piperidinylmaleinate, (di-2,2,6,6-tetramethylpiperidine-4-yl)-adipate, (di-2,2,6,6-tetramethylpiperidine-4-yl)-sebacate, (di-1,2,3,6-tetramethyl-2,6-diethyl-piperidine-4-yl)-sebacate, (di-1-allyl-2,2,6,6-tetramethyl-piperidine-4-yl)-phthalate, 1-acetyl-2,2,6,6-tetramethyl-piperidine-4-yl-acetate, tri-(2,2,6,6-tetramethyl-piperidine-4-yl)trimellitate, 1-acroyl-4-benzyloxy-2,2,6,6-tetramethylpiperidine, di-(1,2,2,6,6-pentamethyl-piperidine-4-yl)dibutylmoloate, di-(1,2,3,6-tetramethyl-2,6-diethyl-piperidine-4-yl) dibenzylmaloate, dimetyl-bis-(2,2,6,6-tetramethylpiperidine-4-oxy)-silane, tris-(1-propyl-2,2,6,6-tetramethylpiperidine-4-yl)-phosphite, tris-(1-propyl-2,2,6,6-tetramethylpiperidine-4-yl)-phosphate, N,N'-bis-(2,2,6,6-tetramethylpiperidine-4-yl)-hexamethylene-1,6-diamine, N,N'-bis-(2,2,6,6-tetramethyl-piperidine-4-yl)-hexamethylene-1,6-diacetoamide, 1-acetyl-4-(N-cylohexylaceto-4-benzylamino-2,2,6,6-tetramethyl-piperidine, N,N'-bis(2,2,6,6-tetramethylpiperidine-4-yl)-N,N'-dibutyl-adipamide, N,N'-bis(2,2,6,6-tetramethyl-piperidine-4-yl)-N,N'-dicyclohexyl-(2-hydroxypropylene), N,N'-bis(2,2,6,6-tetramethylpiperidine-4-yl)-p-xylylene-diamine, 4-(bis-2-hydroxyethyl)-amino-1,2,2,6,6-pentamethylpiperidine, 4-methacrylamido-1,2,2,6,6-pentamethylpipridine and methyl α-cyano-β-methyl-β-[N-(2,2,6,6-tetramethylpiperidine-4-yl)]-amino-acrylate. Examples of preferable hindered amine light-stabilizing agent include the following HALS-1 and HALS-2.

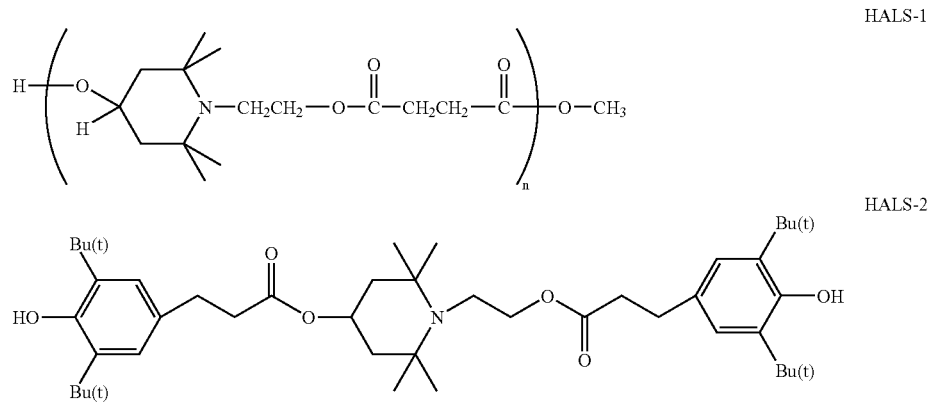

These hindered amine type light stabilizing agent may be used solely or in combination of two or more kinds thereof. The hindered amine type light stabilizing agent may be used together with another additive such as the plasticizer, the acid scavenger and the UV absorbent or introduced into a part of the molecular structure of the additives. The adding amount of the light stabilizing agent is suitably decided within the range in which the object of the invention is not disturbed, and is preferably 0.01 to 10% by weight, more preferably from 0.01 to 5%, and particularly preferably from 0.05 to 1%, by weight of the film.

(Retardation Controlling Agent)

The optical compensation function can be provided to the optical compensation film of the invention by adding a retardation controlling agent to the film or by combining the retardation by the optical compensation film and that originated in the liquid crystal layer by providing an oriented layer formed by a liquid crystal layer. The effect of reducing the coloring and the haze of the film can be expected to the addition of the retardation controlling agent since desired phase difference can be obtained without excessive stretching.

Aromatic compounds having two or more aromatic rings such as those described in EP No. 911,656A2 are also usable for controlling the retardation. For example, the following rod-shaped compounds are employable. Two or more kinds aromatic compounds can be used. The aromatic ring of the aromatic compounds includes heterocyclic rings additionally to aromatic hydrocarbon rings. Aromatic heterocyclic rings are particularly preferable, which are usually unsaturated heterocyclic rings and a 1,3,5-triazine ring is particularly preferable.

<Rod-Shaped Compound>

The optical compensation film preferably contains a rod-shaped compound having the maximum absorption wavelength $\lambda_{max}$ of not more than 250 nm.

The rod-shaped compound preferably has at least one aromatic ring and more preferably two or more aromatic rings for the function of retardation raising agent. The rod-shaped compound preferably has a linear molecular structure. The linear molecular structure means that the molecular structure of the rod-shaped compound is linear in the thermodynamically stablest structure. The thermodynamically stablest structure can be obtained by crystal structure analysis or molecular orbital calculation. The molecular structure showing the smallest heat of formation can be calculated by using, for example, a molecular orbital calculation software-WinMOPAC 2000, manufactured by Fujitsu, co., Ltd. The linear molecular structure is defined by that the angle of the thermodynamically stablest molecular structure calculated as above is not less than 140°. The rod-shaped compound is preferably one displaying liquid crystal property. It is further preferable that the rod-shaped compound displays thermotropic liquid crystal property by heating. The phase of the liquid crystal is preferably nematic phase or smectic phase.

As the rod-shaped compound, trans-1,4-cyclohexane-dicarboxylates represented by the following-Formula 23 are preferred.

$$Ar^1\text{-}L\text{-}Ar^2 \qquad \text{Formula 23}$$

In Formula 23, $Ar^1$ and $Ar^2$ are each independently an aromatic group. The aromatic group includes an aryl group (an aromatic hydrocarbon group), a substituted aryl group, an aromatic heterocyclic group and a substituted aromatic heterocyclic group. The aryl group and the substituted aryl group are more preferable than the aromatic heterocyclic group and the substituted aromatic heterocyclic group. In the aromatic heterocyclic group, the heterocyclic ring is usually unsaturated. The aromatic heterocyclic group is a 5-6- or 7-membered ring and preferably a 5- or 6-membered ring. The aromatic heterocyclic ring usually has the largest number of double bond. As the hetero atom, a nitrogen atom, an oxygen atom or a sulfur atom is preferred, and the nitrogen atom and the sulfur atom are more preferable. Examples of the aromatic heterocyclic ring include a furan ring, a thiophene ring, a pyrrole ring, an oxazole ring, an isoxazole ring, a thiazole ring, an isothiazole ring, an imidazole ring, a pyrazole ring, a furazane ring, a triazole ring, a pyrane ring, a pyridine ring, a pyridazine ring, a pyrimidine ring, a pyrazine ring and a 1,3,5-triazine ring. As the aromatic ring of the aromatic group, a benzene ring, a furan ring, a thiophene ring, a pyrrole ring, an oxazole ring, a thiazole ring, an imidazole ring, a triazole ring, a pyridine ring, a pyrimidine ring and a pyrazine ring are preferable and the benzene ring is particularly preferable.

Examples of the substituent of the substituted aryl group and the substituted heterocyclic group include a halogen atom such as a fluorine atom, a chlorine atom, a bromine atom and an iodine atom, a hydroxyl group, a carboxyl group, a cyano group, an amino group, an alkylamino group such as a methylamino group, an ethylamino group, a butylamino group and a dimethylamino group, a nitro group, a sulfo group, a carbamoyl group, an alkylcarbamoyl group such as an N-methylcarbamoyl group, an N-ethylcarbamoyl group and an N,N-dimethylcarbamoyl group, a sulfamoyl group, an alkylsulfamoyl group such as an N-methylsulfamoyl group, an N-ethylsulfamoyl group and an N,N-dimethylsulfamoyl group, a ureido group, an alkylureido group such as an N-methylureido group, an N,N-dimethylureido group and an N,N,N'-trimethylureido group, an alkyl group such as a methyl group, an ethyl group, a propyl group, a butyl group, a pentyl group, a heptyl group, an octyl group, an isopropyl group, an s-butyl group, a t-amyl group, a cyclohexyl group and a cycloheptyl group, an alkenyl group such as a vinyl group, an allyl group and a hexenyl group, an alkynyl group such as an ethynyl group and a butynyl group, an acyl group such as a formyl group, an acetyl group, a butylyl group, a hexanoyl group, and a lauryl group, an acyloxy group such as an acetoxy group, an butylyloxy group, a hexanoyloxy group and a lauryloxy group, an alkoxy group such as a methoxy group, an ethoxy group, a propoxy group, a butoxy group, a pentyloxy group, a heptyloxy group and an octyloxy group, an aryloxy group such as a phenoxy group, an alkoxycarbonyl group such as a methoxycarbonyl group, an ethoxycarbonyl group, a propoxycarbonyl group, a butoxycarbonyl group, a pentyloxycarbonyl group and heptyloxycarbonyl group, an aryloxycarbonyl group such as a phenoxycarbonyl group, an alkoxycarbonylamino group such as a butoxycarbonylamino group and a hexyloxycarbonylamino group, an alkylthio group such as a methylthio group, an ethylthio group, a propylthio group, a butylthio group, a pentylthio group, a heptylthio group and an octylthio group, an arylthio group such as a phenylthio group, an alkylsulfonyl group such as a methylsulfonyl group, an ethylsulfonyl group, a propylsulfonyl group, a butylsulfonyl group, a pentylsulfonyl group, a heptylsulfonyl group and an octylsulfonyl group, an amido group such as an acetamido group, a butylamido group, a hexylamido group, a laurylamido group, and non-aromatic heterocyclic group such as a morpholyl group and pyrazinyl group.

As the substituent of the substituted aryl group and the substituted aromatic group, the halogen atom, cyano group, hydroxyl group, amino group, alkyl-substituted amino group, alkoxycarbonyl group, acyl group, acyloxy group, amido group, alkoxycarbonyl group, alkoxylcarbonyl group, alkoxy group, alkylthio group and alkyl group are preferable. The alkyl moiety of the alkylamino group, alkoxycarbonyl group, alkoxy group and alkylthio group, and the alkyl group each may has a substituent. Examples of the substituent of the alkyl moiety and the alkyl group include a halogen atom, a hydroxyl group, a carboxyl group, a cyano group, an amino group, an alkylamino group, a nitro group, a sulfo group, a carbamoyl group, an alkylcarbamoyl group, a sulfamoyl group, an alkylsulfamoyl group, a ureido group, an alkylureido group, an alkenyl group, an alkynyl group, an acyl group, an acyloxy group, an alkoxy group, an aryloxy group, an alkoxycarbonyl group, anaryloxycarbonyl group, an alkoxycarbonylamino group, an alkylthio group, an arylthio group, an alkylsufonyl group, an amido group and a non-aromatic heterocyclic group. As the substituent of the alkyl moiety and the alkyl group, the halogen atom, hydroxyl group, amino group, alkylamino group, acyl group, acyloxy group, acylamino group, alkoxycarbonyl group, and alkoxy group are preferable.

In Formula 23, $L^1$ is an alkylene group, alkenylene group, an alkynylene group, a di-valent saturated heterocyclic group, and a di-valent linking group selected fro —O—, —CO— and a combination thereof. The alkylene group may have a cyclic structure. A cyclohexylene group, particularly a 1,4-cyclohexylene group, is preferable as the cyclic alkylene group. As the chain alkylene group, a linear alkylene group is more preferable that a branched-chain alkylene group. The number of carbon atoms of the alkylene group is preferably from 1 to 20, more preferably from 1 to 15, further preferably from 1 to 10, particularly preferably from 1 to 8, and most preferably from 1 to 6.

It is preferable that the alkenylene group and the alkynylene group each as a chain structure rather than a cyclic structure, and a linear structure is more preferable than a branched structure. The number of carbon atoms of the alkenylene group or the alkynylene group is preferably from 2 to 10, more preferably from 2 to 8, further preferably from 2 to 6, and particularly preferably from 2 to 6 and most preferably 2, namely a vinylene group or ethynylene group. The di-valent saturated heterocyclic group preferably has a 3- to 9-membered heterocyclic ring. The hetero atom of the heterocyclic ring is preferably an oxygen atom, a nitrogen atom, a boron atom, a sulfur atom, a silicon atom, a phosphor atom or a germanium atom. Examples of the saturated heterocyclic ring include a piperidine ring, a piperazine ring, a morpholine ring, a pyrrolidine ring, an imidazolidine ring, a tetrahydrofuran ring, a tetrahydropyrane ring, a 1,3-dioxane ring, a 1,4-dioxane ring, a tetrahydrothiophene ring, a 1,3-thiazolidine ring, a 1,3-oxazolidine ring, a 1,3-dioxorane ring and a 1,3,2-dioxaborolane. Particularly preferable di-valent saturated heterocyclic group is piperazine-1,4-diylene, 1,3-dioxane-2,5-diylene and 1,3,2-dioxaborolane-2,5-diylene.

Examples of di-valent linking group constituted by combining are shown below.

L-1: —O—CO-alkylene group-CO—O—
L-2: —CO—O-alkylene group-O—CO—
L-3: —O—CO-alkenylene group-CO—O—
L-4: —CO—O-alkenylene group-O—CO—
L-5: —O—CO-alkynylene group-CO—O—
L-6: —CO—O-alkynylene group-O—CO—
L-7: —O—CO-di-valent saturated heterocyclic group-CO—O—
L-8: —CO—O-valent saturated heterocyclic group-O—CO—

In the molecular structure of Formula 23, the angle formed by $Ar^1$ and $Ar^2$ at $L^1$ is preferably not less than 140°. More preferable rod-shaped compounds are those represented by the following Formula 24.

$$Ar^1\text{-}L^2\text{-}X\text{-}L^3\text{-}Ar^2 \qquad \text{Formula 24}$$

In Formula 24, $Ar^1$ and $Ar^2$ are each independently an aromatic group. Definition and examples of the aromatic group are the same as those of $Ar^1$ and $Ar^2$ in Formula 23.

In Formula 24, $L^2$ and $L^3$ are each independently an alkylene group, —O—, —CO— or a di-valent linking group selected from the groups formed by combining the foregoing groups. The alkylene group preferably has a chain structure rather than a cyclic structure, and a linear chain structure is more preferably than a branched chain structure. The number of carbon atom of the alkylene group is preferably from 1 to 10, more preferably from 1 to 8, further preferably from 1 to 6, particularly preferably from 1 to 4, and most preferably 1 or 2, namely methylene group or ethylene group. $L^2$ and $L^3$ are particularly preferably —O—CO— group or —CO—O— group.

In Formula 24, X is a 1,4-cyclohexylene group, a vinylene group or an ethynylene group. Concrete examples of compound represented by Formula 23 are listed below.

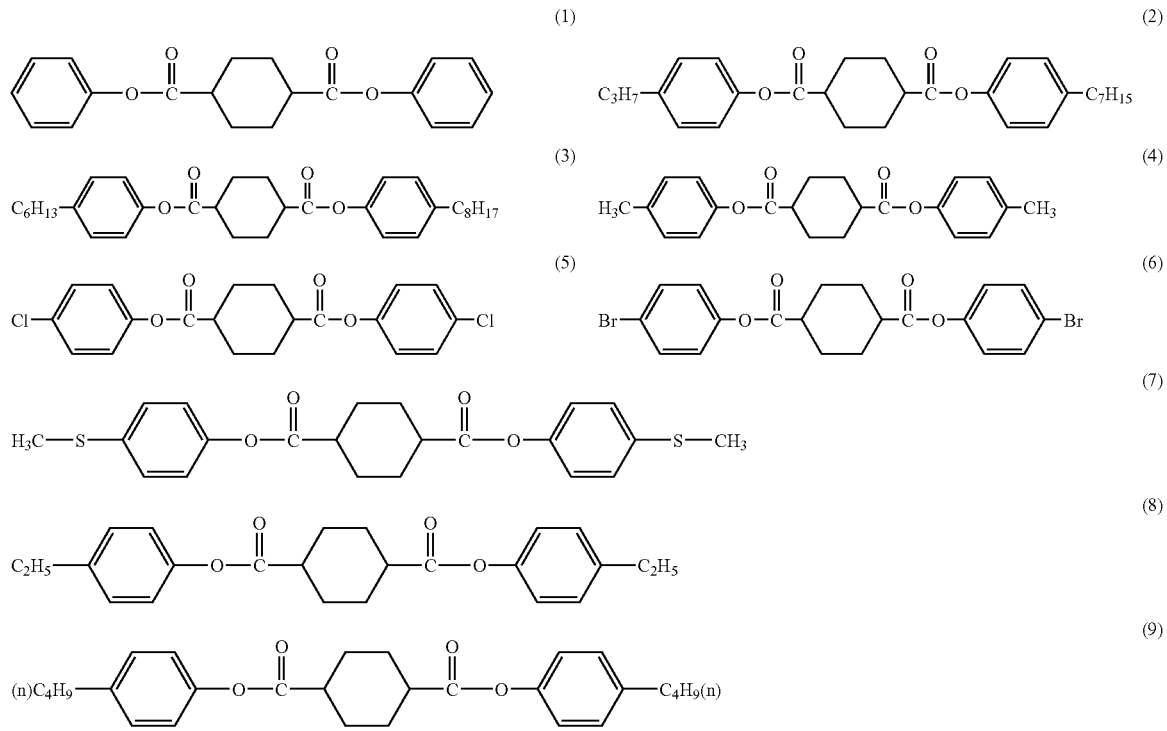

(10)
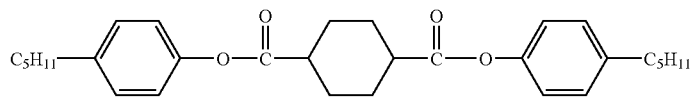
(11)
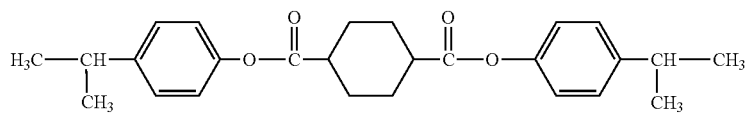
(12) (13)
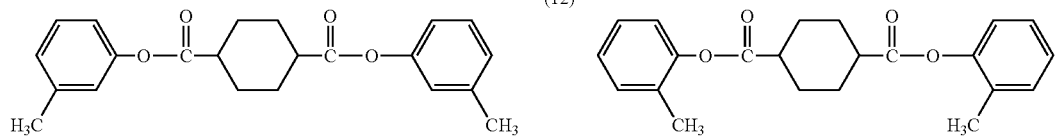
(14)
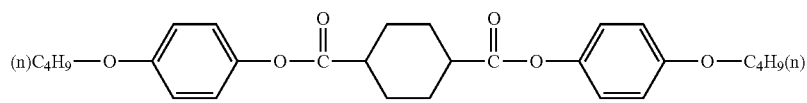
(15)
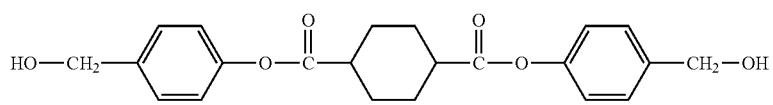
(16)
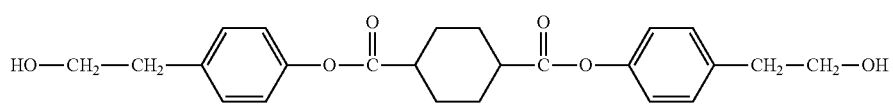
(17)
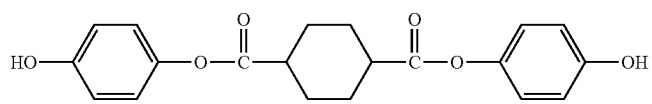
(18)
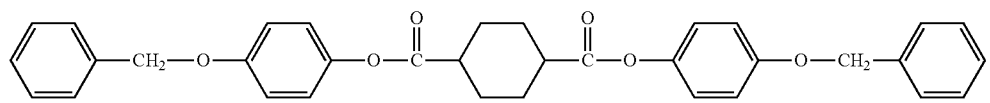
(19)
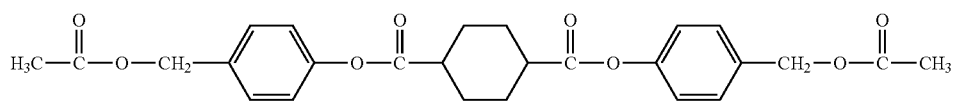
(20)
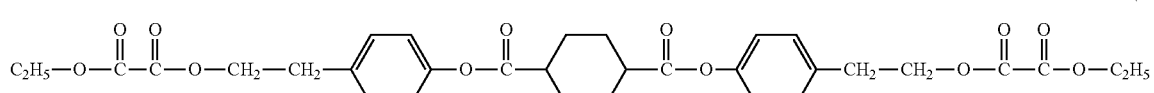
(21)
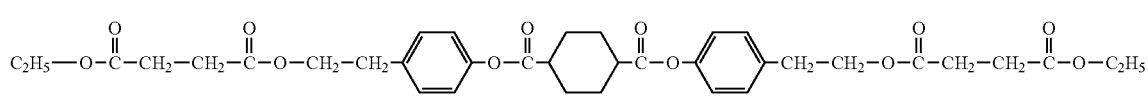
(22)
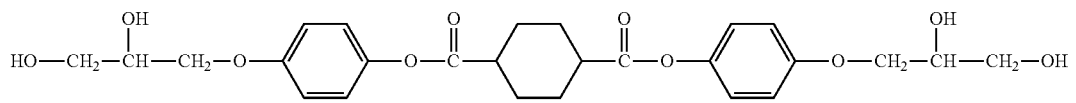
(23)
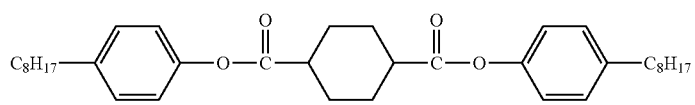
(24)
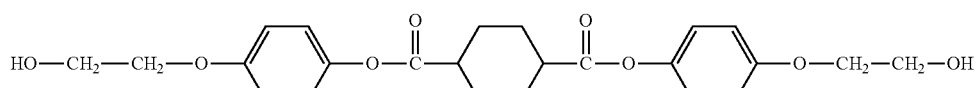

-continued
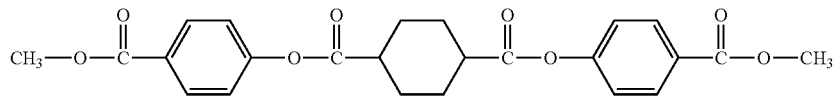
(25)
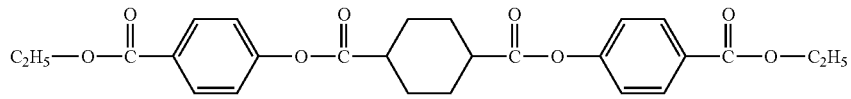
(26)
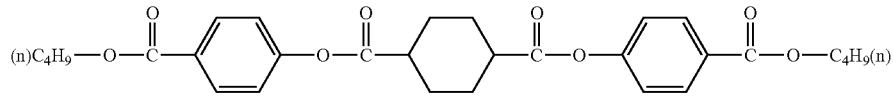
(27)
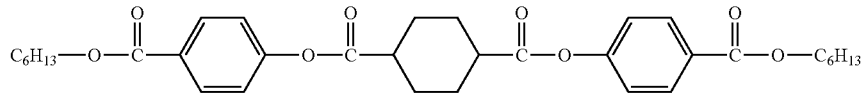
(28)
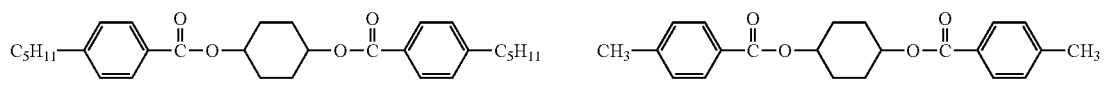
(29) (30)
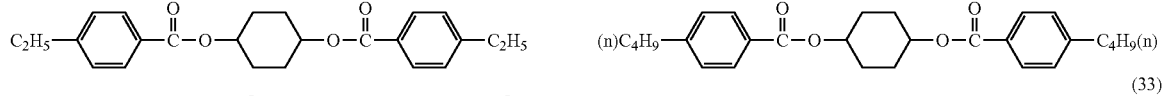
(31) (32)
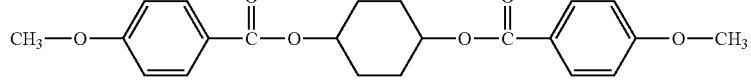
(33)
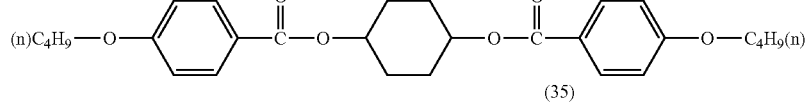
(34)
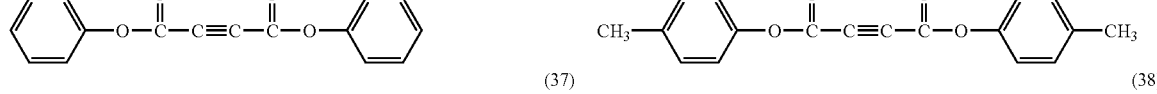
(35) (36)
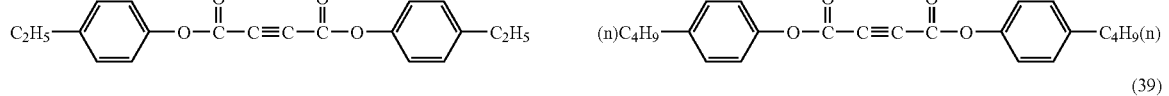
(37) (38)
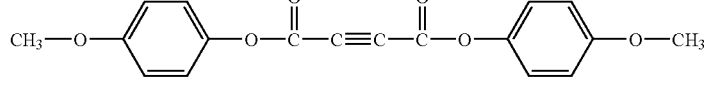
(39)
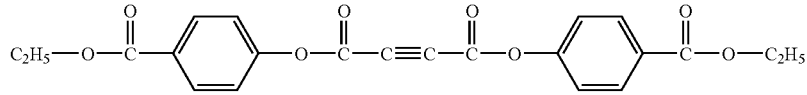
(40)
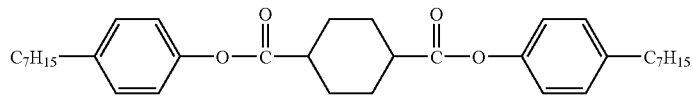
(41)
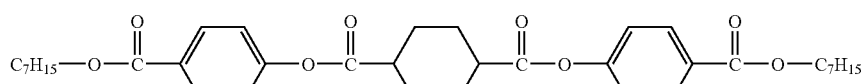
(42)
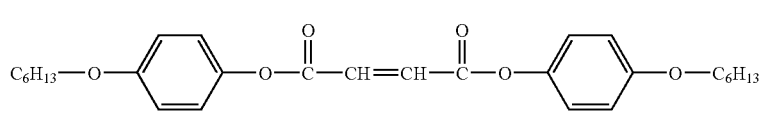
(43)

-continued

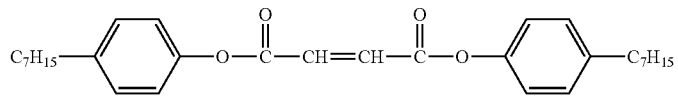
(44)

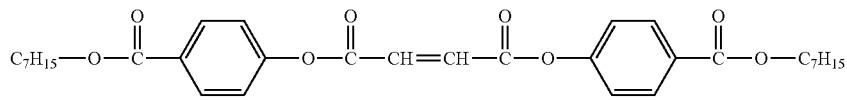
(45)

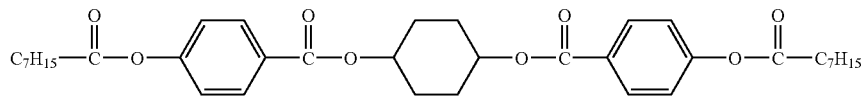
(46)

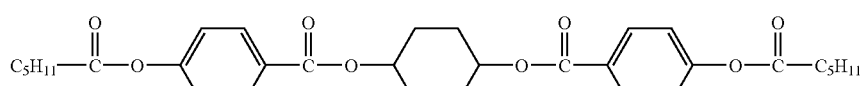
(47)

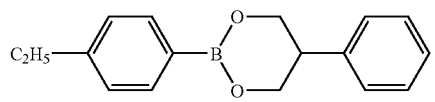
(48)

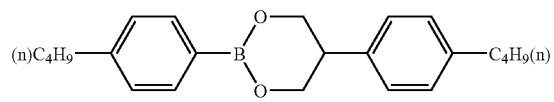
(49)

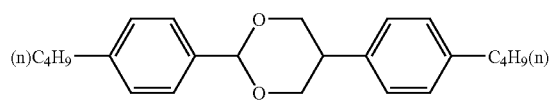
(50)

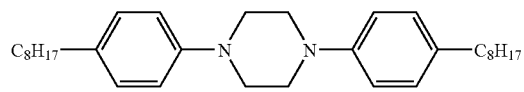
(51)

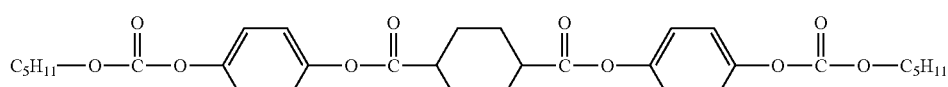
(52)

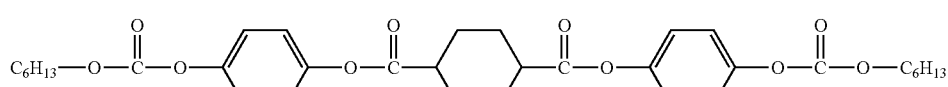
(53)

Examples 1 through 34, 41, 42, 46, 47, 52 and 53 each have two asymmetry carbon atoms at position-1 and position-4 of the cyclohexane ring. Examples 1, 4 through 34, 41, 42, 46, 47, 52 and 53 each have symmetrical meso type molecular structure. Therefore, they have no optical isomer (optical activity) and have only geometrical isomers (a trans form and a cis form). The trans form (1-trans) and the cis form (1-cis) of Example 1 are shown below.

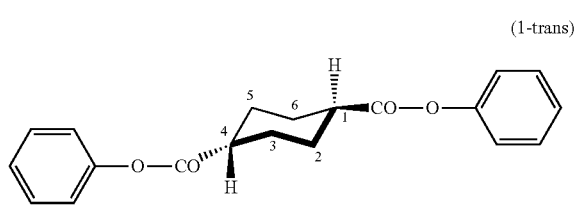
(1-trans)

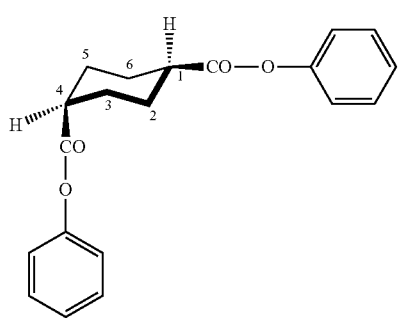
(1-cis)

As above-described, the rod-shaped compound preferably has the linear molecular structure. Examples 2 and 3 each have optical isomers additionally to the geometric isomers (4 isomers in total). Among the geometric isomers, the trans form is preferable than the cis form. There is no difference regarding the geometric isomers and any of D, L and racemic body are preferable. In Examples 43 to 54, the central vinylene bond has a trans form and a cis form. The transform is preferably than the cis form by the reason the same as the above.

Two or more kinds of the rod-shaped compound each having the maximum absorption at a wavelength of not more than 250 nm in the UV absorption spectrum may be employed in combination. The rod-shave compounds can be synthesized referring the methods described in documents such as "Mol. Cryst. Liq. Cryst.", vol. 53, p. 229, 1979, vol. 89, p. 93, 1982, vol. 145, p. 111, 1987, and vol. 170, p. 43, 1989, "J. Am. Chem. Soc.", vol. 113, p. 1349, 1991, vol. 118, p. 5346, 1996, and vol. 92, p. 1582, 1970, "J. Org. Chem., vol. 40. p. 420. 1975, and "Tetrahedron" vol. 48, No. 16, p. 3437, 1992.

In the invention, a compound having a 1,3,5-triazine ring is preferably employed as a disc-shaped compound.

Among the compound having the 1,3,5-triazine ring, ones represented by the following Formula 25 are preferable.

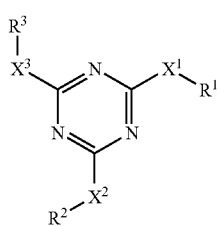

Formula 25

In Formula 25, $X^1$ is a simple bond, a —$NR_4$— group, an —O— bond or an —S— bond; $X^2$ is a simple bond, a —$NR_4$— group, an —O— bond or an —S— bond; $X^3$ is a simple bond, a —$NR_4$— group, an —O— bond or an —S— bond; $R^1$, $R^2$ and $R^3$ are each a hydrogen atom, an alkyl group, an alkenyl group, an aryl group or a heterocyclic group; and $R_4$, $R_5$ and $R_6$ are each a hydrogen atom, an alkyl group, an alkenyl group, an aryl group or a heterocyclic group. The compound represented by Formula 25 is particularly preferably a melamine compound.

The melamine compound is compounds represented by Formula 25 in which $X^1$, $X^2$ and $X^3$ are each —$NR_4$—, —$NR_5$— and —$NR_6$—, respectively, or each a simple bond, and $R^1$, $R^2$ and $R^3$ are each a heterocyclic group having a free atomic valent at the nitrogen atom. The —$X^1$—$R^1$, —$X^2$—$R^2$ and —$X^3$—$R^3$ are preferably the same substituent. It is particularly preferred that the $R^1$, $R^2$ and $R^3$ are an aryl group and $R_4$, $R_5$ and $R_6$ are each a hydrogen atom.

As the above alkyl group, a chain alkyl group is preferable to a cyclic alkyl group, and a linear chain alkyl group is preferable to a branched chain alkyl group.

The number of carbon atom of the alkyl group is preferably from 1 to 30, more preferably from 1 to 20, further preferably from 1 to 10, particularly preferably from 1 to 8 and most preferably from 1 to 6. The alkyl group may have a substituent.

Concrete examples of the substituent include a halogen atom, an alkoxy group such as a methoxy group, an ethoxy group and an epoxyethyloxy group, and an acyloxy group such as an aryloyloxy group and methacryloyloxy group. As the above alkenyl group, a chain alkenyl group is preferable to a cyclic alkenyl group and a linear chain alkenyl group is preferable to a branched alkenyl group. The number of carbon atom of the alkenyl group is preferably from 2 to 30, more preferably from 2 to 20, further preferably from 2 to 10, particularly preferably from 2 to 8 and most preferably from 2 to 6. The alkenyl group may have a substituent.

Concrete examples of the substituent include a halogen atom, an alkoxy group such as a methoxy group, an ethoxy group and an epoxyethyloxy group, and an acyloxy group such as an aryloyloxy group and methacryloyloxy group.

The above aryl group is preferably a phenyl group or a naphthyl group, and the phenyl group is particularly preferred. The aryl group may have a substituent.

Concrete example of the substituent include a halogen atom, a hydroxyl group, a cyano group, a nitro group, a carboxyl group, an alkyl group, an alkenyl group, an aryl group, an alkoxyl group, an alkenyloxy group, an aryloxy group, an acyloxy group, an alkoxycarbonyl group, an alkenyloxycarbonyl group, an aryloxycarbonyl group, a sulfamoyl group, an alkyl-substituted sulfamoyl group, an alkenyl-substituted sulfamoyl group, an aryl-substituted sulfamoyl group, a sulfonamido group, a carbamoyl group, an alkyl-substituted carbamoyl group, an alkenyl-substituted carbamoyl group, an aryl-substituted carbamoyl group, an amido group, an alkylthio group, an alkenylthio group, an arylthio group and an acyl group. The above alkyl group is the same as the foregoing alkyl group.

The alkyl moiety of the alkoxyl group, acyloxy group, alkoxycarbonyl group, alkyl-substituted sulfamoyl group, sulfonamido group, alkyl-substituted carbamoyl group, amido group, alkylthio group and acyl group is the same as the foregoing alkyl group.

The above alkenyl group is the foregoing alkenyl group.

The alkenyl moiety of the alkenyloxy group, an acyloxy group, alkenyloxycarbonyl group, alkenyl-substituted sulfamoyl group, sulfonamido group, alkenyl-substituted carbamoyl group, amido group, alkenylthio group and acyl group is the same as the foregoing alkenyl group.

Examples of the aryl group include a phenyl group, an α-naphthyl group, a β-naphthyl group, a 4-methoxyphenyl group, a 3,4-diethoxyphenyl group, a 4-octyloxyphenyl group and a 4-dodecyloxyphenyl group.

The acyl group moiety of the aryloxy group, acyloxy group, aryloxycarbonyl group, aryl-substituted sulfamoyl group, sulfonamido group, aryl-substituted carbamoyl group, amido group, arylthio group and acyl group is the same as the above aryl group.

The heterocyclic group preferably has aromaticity when $X^1$, $X^2$ or $X^3$ is —NR—, —O— or —S—.

The heterocyclic ring in the heterocyclic group having aromaticity is usually an unsaturated heterocyclic ring and preferably a heterocyclic ring having the greatest number of double bond. The heterocyclic group is preferably a 5-, 6- or 7-membered heterocyclic ring, more preferably a 5- or 6-member heterocyclic ring, and most preferably a 6-member heterocyclic ring.

The hetero atom in the heterocyclic ring is preferably an N, S or O atom, and N is particularly preferred.

As the heterocyclic ring having an aromaticity, a pyridine ring, (for example, a 2-pyridyl group or a 4-pyridyl group in a form of the heterocyclic group) is particularly preferred. The heterocyclic group may have a substituent. Examples of the substituent are the same as the substituents of the above aryl moiety.

When $X^1$, $X^2$ or $X^3$ is the simple bond, the heterocyclic group preferably has a free atomic valency at the nitrogen atom. The heterocyclic group having a free atomic valency at the nitrogen atom is preferably a 5-, 6- or 7-membered ring, more preferably a 5- or 6-membered ring and most preferably a 5-membered ring. The heterocyclic group may have plural nitrogen atoms.

The heterocyclic group may have a hetero atom such as an o atom and an S atom. The heterocyclic group may have a substituent. Examples of the substituent are the same as the substituent of the above aryl moiety.

Concrete examples of the heterocyclic group having the free atomic valency at the nitrogen atom are listed below.

(Hc-1) 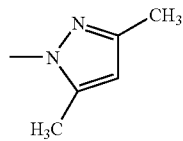

(Hc-2) 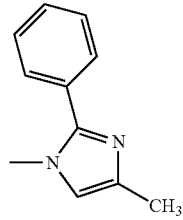

(Hc-3) 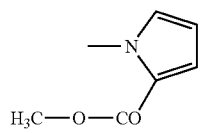

(Hc-4) 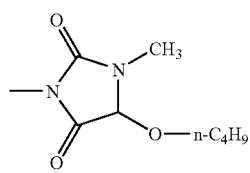

(Hc-5) 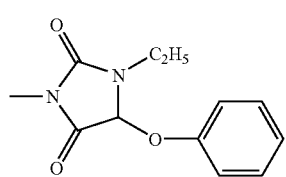

(Hc-6) 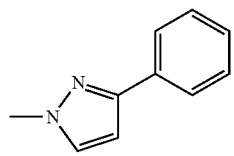

(Hc-7) 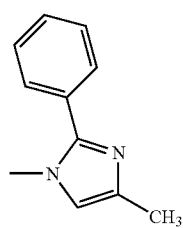

(Hc-8) 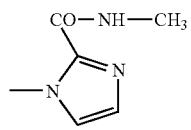

(Hc-9) 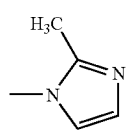

(Hc-10) 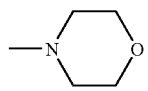

(Hc-11) 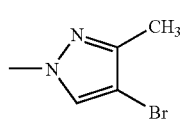

(Hc-12) 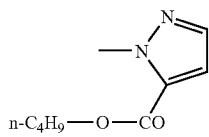

The molecular weight of the compound having the 1,3,5-triazine ring is preferably from 300 to 2,000, and the boiling point of the compound is preferably not less than 20° C. The boiling point can be measured by a measuring apparatus available on the market such as TG/DAT100, manufactured by Seiko Denshi Kogyo Co., Ltd.

Concrete examples of the compound having the 1.3.5-triazinr ring are shown below.

In the followings the plural R are the same group.

(1)~(12)

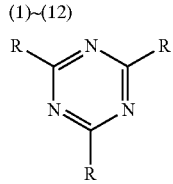

(1) Butyl
(2) 2-methoxy-2-ethoxyethyl
(3) 5-undecenyl
(4) Phenyl
(5) 4-ethoxycarbonylphenyl
(6) 4-butoxypnenyl
(7) p-biphenylyl
(8) 4-pyridyl
(9) 20naphthyl
(10) 2-methylphenyl
(11) 3,4-dimethoxyphenyl
(12) 2-furyl (13)

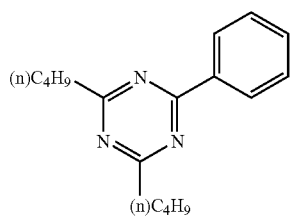

-continued (14)~(79)

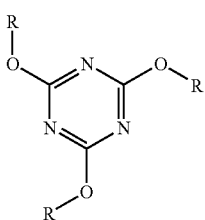

(14) Phenyl
(15) 3-ethoxycarbonylphenyl
(16) 3-butoxyphenyl
(17) m-biphenylyl
(18) 30phenylthiophenyl
(19) 3-cholorophenyl
(20) 3-benzoylphenyl
(21) 3-acetoxyphenyl
(22) 3-benzoyloxyphenyl
(23) 3-phenoxycarbonylphenyl
(24) 3-methoxyphenyl
(25) 3-anilinophenyl
(26) 3-isobutylylaminophenyl
(27) 3-phenoxycarbonylaminophenyl
(28) 3-(ethylureido)phenyl
(29) 3-(3,3-diethylureido)phenyl
(30) 3-methylphenyl
(31) 3-phenoxyphenyl
(32) 3-hydroxyphenyl
(33) 4-ethoxycarbonylphenyl
(34) 4-butoxyphenyl
(35) p-biphenylyl
(36) 4-phenylthiophenyl
(37) 4-chlorophenyl
(38) 4-benzoylphenyl
(39) 4-acetoxyphenyl
(40) 4-benzoyloxyphenyl
(41) 4-phenoxycarbonylphenyl
(42) 4-methoxyphenyl
(43) 4-anilinophenyl
(44) 4-isobutylylaminophenyl
(45) 4-phenoxycarbonylaminophenyl
(46) 4-(3-ethylureido)phenyl
(47) 4-(3,3-diethylureido)phenyl
(48) 4-methylphenyl
(49) 4-phenoxyphenyl
(50) 4-hydroxyphenyl
(51) 3,4-diethoxycarbonylphenyl
(52) 3,4-dibutoxyphenyl
(53) 3,4-diphenylphenyl
(54) 3,4-diphenylthiophenyl
(55) 3,4-dichlorophenyl
(56) 3,4-dibenzoylphenyl
(57) 3,4-diacetoxyphenyl
(58) 3,4-dibenzoyloxyphenyl
(59) 3,4-diphenoxcarbonylphenyl
(60) 3,4-dimethoxyphenyl
(61) 3,4-dianilinophenyl
(62) 3,4-dimethlphenyl
(63) 3,4-diphenoxyphenyl
(64) 3,4-dihydroxyphenyl
(65) 2-naphthyl
(66) 3,4,5-triethoxycarbonylphenyl
(67) 3,4,5-tributoxyphenyl
(68) 3,4,5-triphenylphenyl
(69) 3,4,5-triphenylthiophenyl
(70) 3,4,5-trichlorophenyl
(71) 3,4,5-tribenzoylphenyl
(72) 3,4,5-triacetoxyphenyl
(73) 3,4,5-tribenzoyloxyphenyl
(74) 3,4,5-triphenoxycarbonylphenyl
(75) 3,4,5-trimethoxyphenyl
(76) 3,4,5-trianilinophenyl
(77) 3,4,5-trimethylphenyl
(78) 3,4,5-triphenoxyphenyl
(79) 3,4,5-trihydroxyphenyl (8)~(145)

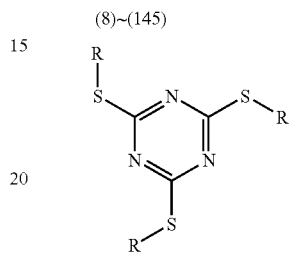

(80) Phenyl
(81) 3-ethoxycarbonylphenyl
(82) 3-butoxyphenyl
(83) m-biphenylyl
(84) 30phenylthiophenyl
(85) 3-cholorophenyl
(86) 3-benzoylphenyl
(87) 3-acetoxyphenyl
(88) 3-benzoyloxyphenyl
(89) 3-phenoxycarbonylphenyl
(90) 3-methoxyphenyl
(91) 3-anilinophenyl
(92) 3-isobutylylaminophenyl
(93) 3-phenoxycarbonylaminophenyl
(94) 3-(ethylureido)phenyl
(95) 3-(3,3-diethylureido)phenyl
(96) 3-methylphenyl
(97) 3-phenoxyphenyl
(98) 3-hydroxyphenyl
(99) 4-ethoxycarbonylphenyl
(100) 4-butoxyphenyl
(101) p-biphenylyl
(102) 4-phenylthiophenyl
(103) 4-chlorophenyl
(104) 4-benzoylphenyl
(105) 4-acetoxyphenyl
(106) 4-benzoyloxyphenyl
(107) 4-phenoxycarbonylphenyl
(108) 4-methoxyphenyl
(109) 4-anilinophenyl
(110) 4-isobutylylaminophenyl
(111) 4-phenoxycarbonylaminophenyl
(112) 4-(3-ethylureido)phenyl
(113) 4-(3,3-diethylureido)phenyl
(114) 4-methylphenyl
(115) 4-phenoxyphenyl
(116) 4-hydroxyphenyl
(117) 3,4-diethoxycarbonylphenyl
(118) 3,4-dibutoxyphenyl
(119) 3,4-diphenylphenyl
(120) 3,4-diphenylthiophenyl
(121) 3,4-dichlorophenyl
(122) 3,4-dibenzoylphenyl (123) 3,4-diacetoxyphenyl
(124) 3,4-dibenzoyloxyphenyl
(125) 3,4-diphenoxcarbonylphenyl
(126) 3,4-dimethoxyphenyl
(127) 3,4-dianilinophenyl
(128) 3,4-dimethlphenyl
(129) 3,4-diphenoxyphenyl
(130) 3,4-dihydroxyphenyl
(131) 2-naphthyl
(132) 3,4,5-triethoxycarbonylphenyl
(133) 3,4,5-tributoxyphenyl
(134) 3,4,5-triphenylphenyl
(135) 3,4,5-triphenylthiophenyl
(136) 3,4,5-trichlorophenyl
(137) 3,4,5-tribenzoylphenyl
(138) 3,4,5-triacetoxyphenyl
(139) 3,4,5-tribenzoyloxyphenyl
(140) 3,4,5-triphenoxycarbonylphenyl
(141) 3,4,5-trimethoxyphenyl
(142) 3,4,5-trianilinophenyl
(143) 3,4,5-trimethylphenyl
(144) 3,4,5-triphenoxyphenyl
(145) 3,4,5-trihydroxyphenyl

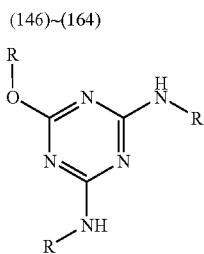
(146)~(164)

(146) Phenyl
(147) 4-ethoxycarbonylphenyl
(148) 4-butoxyphenyl
(149) p-biphenylyl
(150) 4-phenylthiophenyl
(151) 4-chlorophenyl
(152) 4-benzoylphenyl
(153) 4-acetoxyphenyl
(154) 4-benzoyloxyphenyl
(155) 4-phenoxycarbonylphenyl
(156) 4-methoxyphenyl
(157) 4-anilinophenyl
(158) 4-isobutylylaminophenyl
(159) 4-phenoxycarbonylaminophenyl
(160) 4-(3-ethylureido)phenyl
(161) 4-(3,3-diethylureido)phenyl
(162) 4-methylphenyl
(163) 4-phenoxyphenyl
(164) 4-hydroxyphenyl

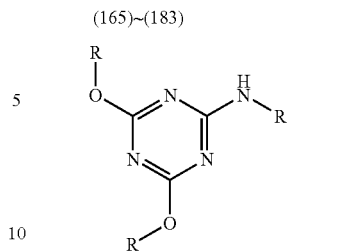
(165)~(183)

(165) Phenyl
(166) 4-ethoxycarbonylphenyl
(167) 4-butoxyphenyl
(168) p-biphenylyl
(169) 4-phenylthiophenyl
(170) 4-chlorophenyl
(171) 4-benzoylphenyl
(172) 4-acetoxyphenyl
(173) 4-benzoyloxyphenyl
(174) 4-phenoxycarbonylphenyl
(175) 4-methoxyphenyl
(176) 4-anilinophenyl
(177) 4-isobutylylaminophenyl
(178) 4-phenoxycarbonylaminophenyl
(179) 4-(3-ethylureido)phenyl
(180) 4-(3,3-diethylureido)phenyl
(181) 4-methylphenyl
(182) 4-phenoxyphenyl
(183) 4-hydroxyphenyl

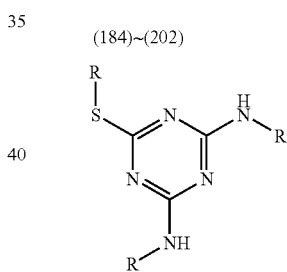
(184)~(202)

(184) Phenyl
(185) 4-ethoxycarbonylphenyl
(186) 4-butoxyphenyl
(187) p-biphenylyl
(188) 4-phenylthiophenyl
(189) 4-chlorophenyl
(190) 4-benzoylphenyl
(191) 4-acetoxyphenyl
(192) 4-benzoyloxyphenyl
(193) 4-phenoxycarbonylphenyl
(194) 4-methoxyphenyl
(195) 4-anilinophenyl
(196) 4-isobutylylaminophenyl
(197) 4-phenoxycarbonylaminophenyl
(198) 4-(3-ethylureido)phenyl
(199) 4-(3,3-diethylureido)phenyl
(200) 4-methylphenyl
(201) 4-phenoxyphenyl
(202) 4-hydroxyphenyl (203)~(221)

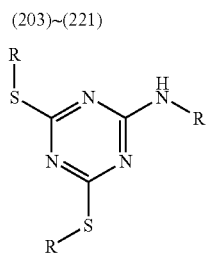

(203) Phenyl
(204) 4-ethoxycarbonylphenyl
(205) 4-butoxyphenyl
(206) p-biphenylyl
(207) 4-phenylthiophenyl
(208) 4-chlorophenyl
(209) 4-benzoylphenyl
(210) 4-acetoxyphenyl
(211) 4-benzoyloxyphenyl
(212) 4-phenoxycarbonylphenyl
(213) 4-methoxyphenyl
(214) 4-anilinophenyl
(215) 4-isobutylylaminophenyl
(216) 4-phenoxycarbonylaminophenyl
(217) 4-(3-ethylureido)phenyl
(218) 4-(3,3-diethylureido)phenyl
(219) 4-methylphenyl
(220) 4-phenoxyphenyl
(221) 4-hydroxyphenyl (222)~(419)

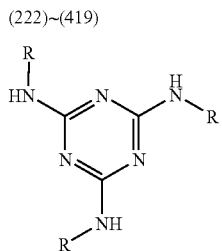

(222) Phenyl
(223) 4-butylphenyl
(224) 4-(2-methox-2-ethoxyethyl)phenyl
(225) 4-(5-nonenyl)phenyl
(226) p-biphenylyl
(227) 4-ethoxycarbonylphenyl
(228) 4-butoxyphenyl
(229) 4-methylphenyl
(230) 4-chlorophenyl
(231) 4-phenylthiophenyl
(232) 4-benzoylphenyl
(233) 4-acetoxyphenyl
(234) 4-benzoyloxyphenyl
(235) 4-phenoxycarbonylphenyl
(236) 4-methoxyphenyl
(237) 4-anilinophenyl
(238) 4-isobutylylaminophenyl
(239) 4-phenoxycarbonylaminophenyl
(240) 4-(3-ethylureido)phenyl
(241) 4-(3,3-diethylureido)phenyl
(242) 4-phenoxyphenyl
(243) 4-hydroxyphenyl
(244) 3-butylphenyl
(245) 3-(2-methoxy-2-ethoxyethyl)phenyl
(246) 3-(5-nonenyl)phenyl
(247) m-biphenylyl
(248) 3-ethoxycarbonylphenyl
(249) 3-butoxyphenyl
(250) 3-methylphenyl
(251) 3-chlorophenyl
(252) 3-phenylthiophenyl
(253) 3-benzoylphenyl
(254) 3-acetoxyphenyl
(255) 3-benzoyloxyphenyl
(256) 3-phenoxycarbonylphenyl
(257) 3-methoxyphenyl
(258) 3-anilinophenyl
(259) 3-isobutylylaminophenyl
(260) 3-phenoxycarbonylaminophenyl
(261) 3-(3-ethylureido)phenyl
(262) 3-(3,3-diethylureido)phenyl
(263) 3-phenoxyphenyl
(264) 3-hydroxyphenyl
(265) 2-butylphenyl
(266) 2-(2-methoxy-2-ethoxyethyl)phenyl
(267) 2-(5-nonenyl)phenyl
(268) o-biphenylyl
(269) 2-ethoxycarbonylphenyl
(270) 2-butoxyphenyl
(271) 2-methylphenyl
(272) 2-chlorophenyl
(273) 2-phenylthiophenyl
(274) 2-benzoylphenyl
(275) 2-acetoxyphenyl
(276) 2-benzoyloxyphenyl
(277) 2-phenoxycarbonylphenyl
(278) 2-methoxyphenyl
(279) 2-anilinophenyl
(280) 2-isobutylylaminophenyl
(281) 2-phenoxycarbonylaminophenyl
(282) 2-(3-ethylureido)phenyl
(283) 2-(3,3-diethylureido)phenyl
(284) 2-phenoxyphenyl
(285) 2-hydroxyphenyl
(286) 3,4-dibutylphenyl
(287) 3,4-di(2-methoxy-2-ethoxyethyl)phenyl
(288) 3,4-diphenylphenyl
(289) 3,4-diethoxycarbonylphenyl
(290) 3,4-didodecyloxyphenyl
(291) 3,4-dimethylphenyl
(292) 3,4-dichlorophenyl
(293) 3,4-dibenzoylphenyl
(294) 3,4-diacetoxyphenyl
(295) 3,4-dimethoxyphenyl
(296) 3,4-di-N-methylaminophenyl
(297) 3,4-diisobutylylaminophenyl
(298) 3,4-diphenoxyphenyl
(299) 3,4-dihydroxyphenyl
(300) 3,5-dibutylphenyl
(301) 3,5-di(2-methoxy-2-ethoxyethyl)phenyl
(302) 3,5-diphenylphenyl
(303) 3,5-diethoxycarbonylphenyl
(304) 3,5-didodecyloxyphenyl
(305) 3,5-dimethylphenyl
(306) 3,5-dichlorophenyl
(307) 3,5-dibenzoylphenyl
(308) 3,5-diacetoxyphenyl
(309) 3,5-dimethoxyphenyl
(310) 3,5-di-N-methylaminophenyl
(311) 3,5-diisobutylylaminophenyl (312) 3,5-diphenylxyphenyl
(313) 3,5-dihydroxyphenyl
(314) 2,4-dibutylphenyl
(315) 2,4-di(2-methoxy-2-ethoxyethyl)phenyl
(316) 2,4-diphenylphenyl
(317) 2,4-diethoxycarbonylphenyl
(318) 2,4-didodecyloxyphenyl
(319) 2,4-dimethylphenyl
(320) 2,4-dichlorophenyl
(321) 2,4-dibenzoylphenyl
(322) 2,4-diacetoxyphenyl
(323) 2,4-dimethoxyphenyl
(324) 2,4-di-N-methylaminophenyl
(325) 2,4-diisobutylylaminophenyl
(326) 2,4-diphenoxyphenyl
(327) 2,4-dihydroxyphenyl
(328) 2,3-dibutylphenyl
(329) 2,3-di(2-methoxy-2-ethoxyethyl)phenyl
(330) 2,3-diphenylphenyl
(331) 2,3-diethoxycarbonylphenyl
(332) 2,3-didodecyloxyphenyl
(333) 2,3-dimethylphenyl
(334) 2,3-dichlorophenyl
(335) 2,3-dibenzoylphenyl
(336) 2,3-diacetoxypohenyl
(337) 2,3-dimethoxyphenyl
(338) 2,3-di-N-methylaminophenyl
(339) 2,3-diisobutylylaminophenyl
(340) 2,3-diphenoxyphenyl
(341) 2,3-dihydroxyphenyl
(342) 2,6-dibutylphenyl
(343) 2,6-di(2-methoxy-2-ethoxyethyl)phenyl
(344) 2,6-diphenylphenyl
(345) 2,6-diethoxycarbonylphenyl
(346) 2,6-didodecyloxyphenyl
(347) 2,6-dimethylphenyl
(348) 2,6-dichlorophenyl
(349) 2,6-dibenzoylphenyl
(350) 2,6-diacetoxypohenyl
(351) 2,6-dimethoxyphenyl
(352) 2,6-di-N-methylaminophenyl
(353) 2,6-diisobutylylaminophenyl
(354) 2,6-diphenoxyphenyl
(355) 2,6-dihydroxyphenyl
(356) 3,4,5-tributylphenyl
(357) 3,4,5-tri(2-methoxy-2-ethoxyethyl)phenyl
(358) 3,4,5-triphenylphenyl
(359) 3,4,5-triethoxycarbonylphenyl
(360) 3,4,5-tridodecyloxyphenyl
(361) 3,4,5-trimethylphenyl
(362) 3,4,5-trichlorophenyl
(363) 3,4,5-tribenzoylphenyl
(364) 3,4,5-triacetoxyphenyl
(365) 3,4,5-trimethoxyphenyl
(366) 3,4,5-tri-N-methylaminophenyl
(367) 3,4,5-triisobutylaminophenyl
(368) 3,4,5-triphenoxyphenyl
(369) 3,4,5-trihydroxyphenyl
(370) 2,4,6-tributylphenyl
(371) 2,4,6-tri(2-methoxy-2-ethoxyethyl)phenyl
(372) 2,4,6-triphenylphenyl
(373) 2,4,6-triethoxycarbonylphenyl
(374) 2,4,6-tridodecyloxyphenyl
(375) 2,4,6-trimethylphenyl
(376) 2,4,6-trichlorophenyl
(377) 2,4,6-tribenzoylphenyl
(378) 2,4,6-triacetoxyphenyl
(379) 2,4,6-trimethoxyphenyl
(380) 2,4,6-tri-N-methylaminophenyl
(381) 2,4,6-triisobutylaminophenyl
(382) 2,4,6-triphenoxyphenyl
(383) 2,4,6-trihydroxyphenyl
(384) Pentachlorophenyl
(385) Pentamethoxyphenyl
(386) Pentamethoxyphenyl
(387) 6-N-methylsulfamoyl-8-methoxy-2-naphthyl
(388) 5-N-methylsulfamoyl-2-naphthyl
(389) 6-N-phenylsulfamoyl-2-naphthyl
(390) 5-ethoxy-7-N-methylsulfamoyl-2-naphthyl
(391) 3-methoxy-2-naphthyl
(392) 1-ethoxy-2-naphthyl
(393) 6-N-phenylsulfamoyl-8-methoxy-2-naphthyl
(394) 5-methoxy-7-N-phenylsulfamoyl-8-methoxy-2-naphthyl
(395) 1-(4-methylphenyl)-2-naphthyl
(396) 6,8-di-N-methylsulfamoyl-2-naphthyl
(397) 6-N-2-acetoxyethylsulfamoyl-8-methoxy-2-naphthyl
(398) 5-acetoxy-7-N-phenylsulfamoyl-2-naphthyl
(399) 3-benzoyloxy-2-naphthyl
(400) 5-acetylamino-1-naphthyl
(401) 2-methoxy-1-naphthyl
(402) 4-phenoxy-1-naphthyl
(403) 5-N-methylsulfamoyl-1-naphthyl
(404) 3-N-methylcarbamoyl-4-hydroxy-1-naphthyl
(405) 5-methoxy-6-N-ethylsulfamoyl-1-naphthyl
(406) 7-tetradecyloxy-1-naphthyl
(407) 4-(4-methylphenoxy)-1-naphthyl
(408) 6-N-methylsulfamoyl-1-naphthyl
(409) 3-N,N-dimethylcarbamoyl-4-methoxy-1-naphthyl
(410) 5-methoxy-6-N-benzylsulfamoyl-1-naphthyl
(411) 3,6-di-N-phenylsulfamoyl-1-naphthyl
(412) Methyl
(413) Ethyl
(414) Butyl
(415) Octyl
(416) Dodecyl
(417) 2-butoxy-2-ethoxyethyl
(418) Benzyl
(419) 4-methoxybenzyl (420)

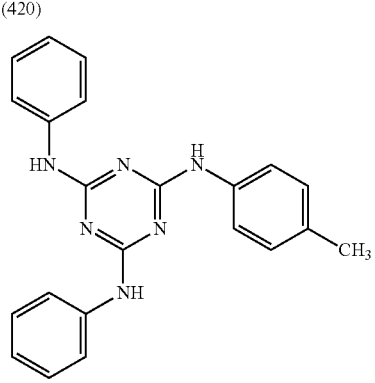

(420')
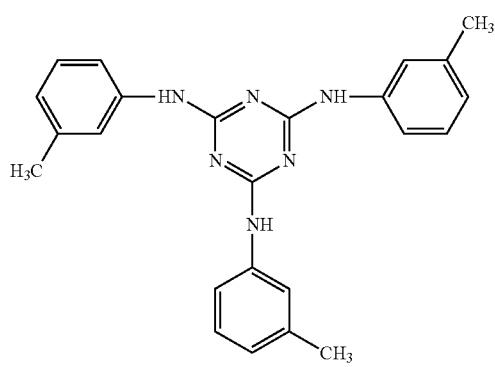
(421)
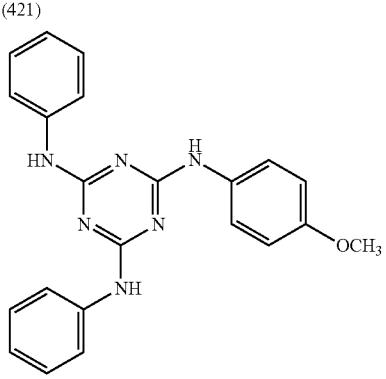
(422)
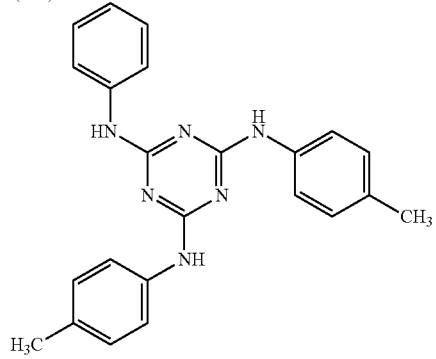
(423)
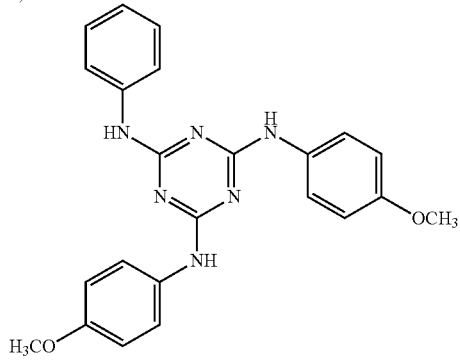
(424)~(426)
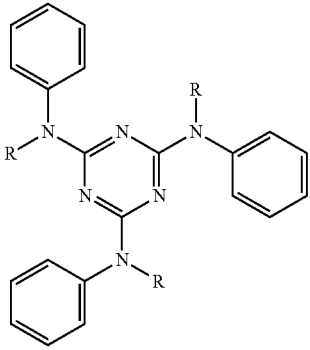
(424) Methyl
(425) Phenyl
(426) Butyl
(427)
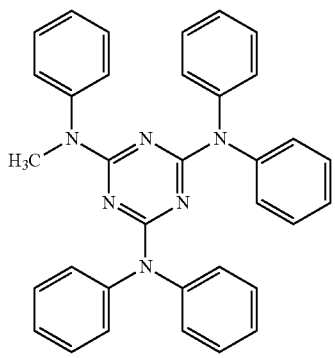
(428)
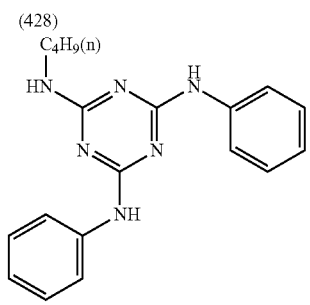
(429)
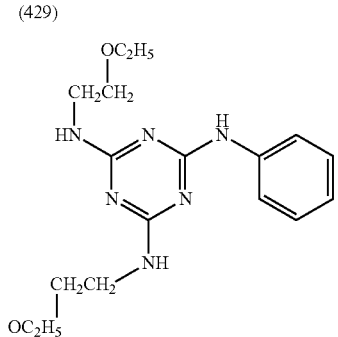

(430)~(437)
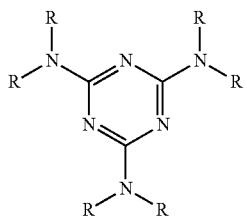
(424) Methyl
(425) Phenyl
(426) Butyl
(430) Methyl
(431) Ethyl
(432) Butyl
(433) Octyl
(434) Dodecyl
(435) 2-butoxy-2-ethoxyethyl
(436) Benzyl
(437) 4-methoxybenzyl
(438)
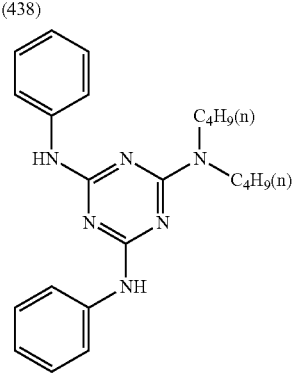
(439)
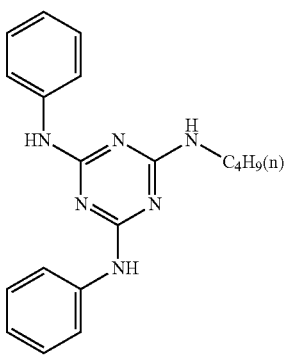
(440)
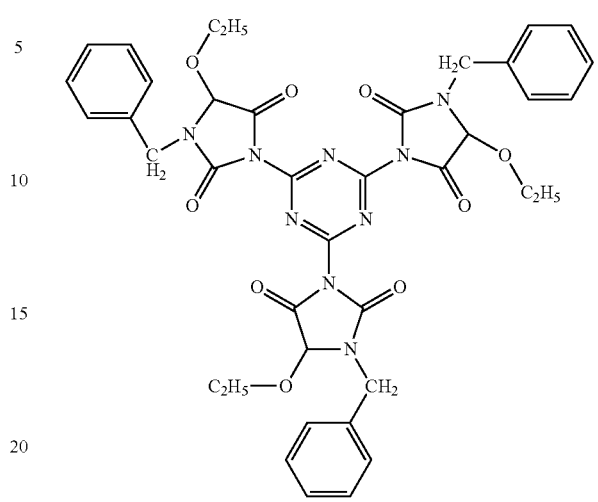
(441)
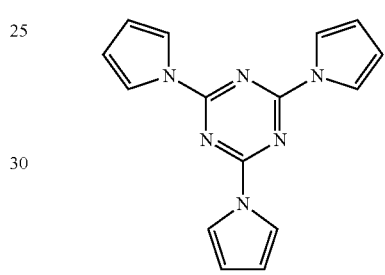
(442)
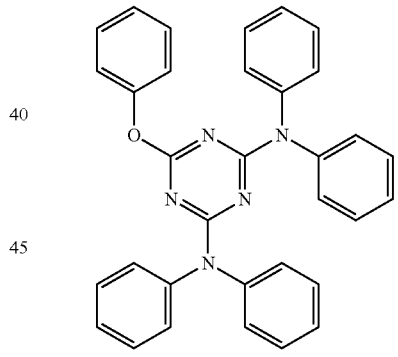
(443)
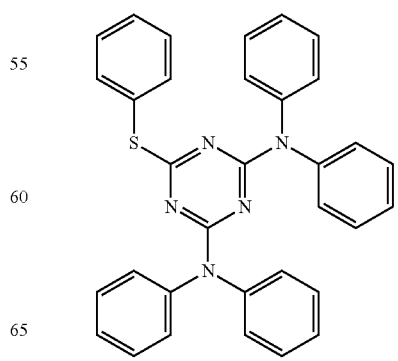

(444)

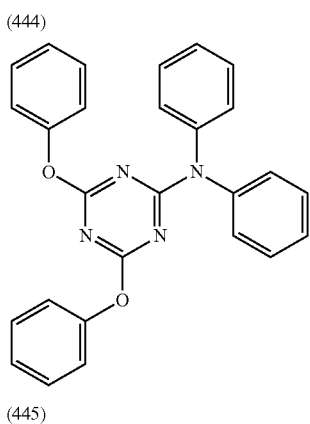

(445)

In the invention, a melamine polymer can be employed as the compound having the 1,3,5-triazine ring. The melamine polymer is preferably synthesized by polymerization reaction of a melamine compound represented by Formula 26 and a carbonyl compound.

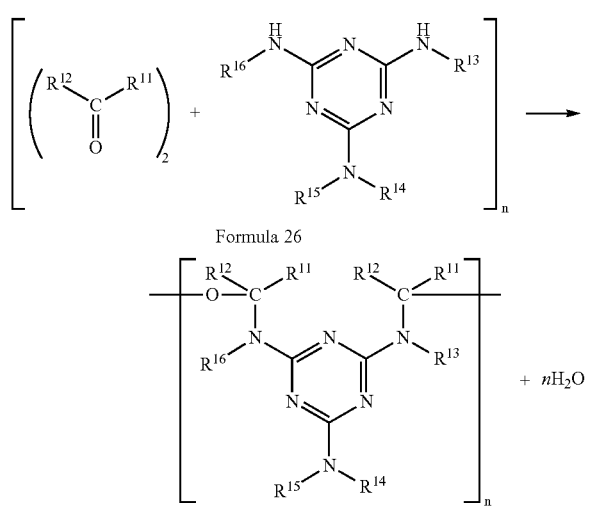

Formula 26

In the above synthesizing scheme, $R^{11}$, $R^{12}$, $R^{13}$, $R^{14}$, $R^{15}$ and $R^{16}$ are each a hydrogen atom, and alkyl group, an alkenyl group, an aryl group or a heterocyclic group.

The above alkyl group, alkenyl group, aryl group, heterocyclic group and the substituent thereof are each the same as those described in Formula 25.

The polymerization reaction is similar to that for synthesizing usual melamine ester such as melamineformaldehyde ester. Melamine polymer (melamine ester) available on the market may be employed.

The molecular weight of the melamine polymer is preferably from 2,000 to 400,000. Examples of the repeating unit of the melamine polymer are listed below.

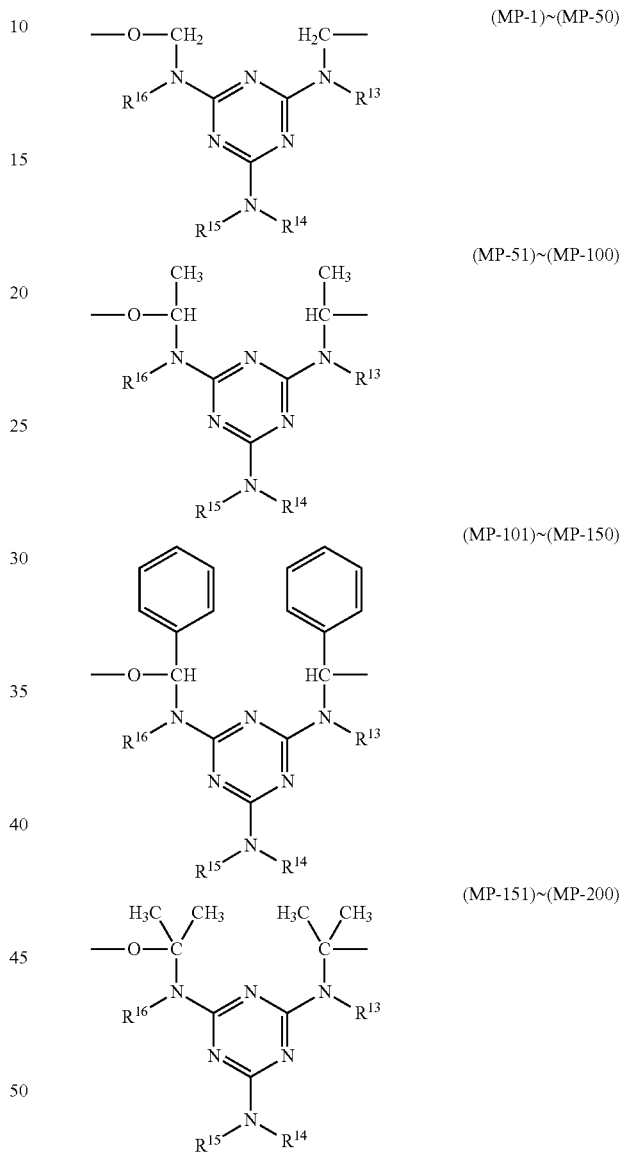

In the invention, a copolymer formed by combining tow or more kinds of the above repeating units may be employed. Tow or more kinds of the homopolymer or the copolymer may be employed in combination.

Two or more kinds of the compounds each having the 1,3,5-triazine ring may be employed in combination. A combination of two or more kinds of disc-shaped compounds, for example, a combination of a compound having 1,3,5-triazine ring and a compound having prophyrin skeleton may be employed in combination.

The adding amount of the rod-shaped compound or the disc-shaped compound is preferably from 0.2 to 30%, particularly preferably from 1 to 20%, by weight of the optical compensation film.

(Matting Agent)

To the optical compensation film of the invention, a fine particle such as a matting agent can be added for giving the slipping ability or for improving the physical properties. As the fine particle, that of an inorganic compound or that of an organic compound can be employed. The shape of the fine particle include spherical, rod-like, needle-like and irregular shaped.

Examples of the fine particle include inorganic fine particle of oxide, hydroxide, silicate, phosphate or carbonate of a metal such as silicone dioxide, titanium dioxide, aluminum oxide, zirconium oxide, calcium carbonate, kaolin, talk, baked calcium silicate, hydrated calcium silicate, aluminum silicate and calcium phosphate, and that of crosslinked polymer fine particle. Among them, silicone dioxide is preferable since the haze of the film can be lowered. The fine particle such as silicone dioxide is frequently treated by an organic compound, and such the particle is also preferable since the haze can be lowered.

Halosilane compounds, alkoxysilane compounds, silazane and siloxane are cited as the preferable organic compound for the surface treatment. Larger average diameter of the fine particles causes higher slipping ability and smaller-average diameter is superior in the transparency. The average diameter of the fine particle is within the range of from 0.005 to 1.0 µm. The particle may be a primary particle or a secondary particle formed by aggregation of the primary particles. Preferable average diameter of the primary particle is from 5 to 50 nm, and more preferably from 7 to 14 nm. Irregularity of from 0.01 to 10 µm can be formed on the film surface by such the fine particle. The content of the fine particle in the cellulose ester is preferably from 0.005 to 10%, and particularly preferably from 0.05 to 5%, by weight of the cellulose ester.

Examples of the silicone dioxide include Aerosil 200, 200V, 300, R972, R972V, R974, R202, R812, OX50 and TT600, each manufactured by Nihon Aerosil Co., Ltd., and Aerosil 200V, R972, R972V, R974, R202 and R812 are preferable. These fine particles can be used in combination of two or more kinds thereof. When two or more kinds of them are employed with together, they can be employed in an optional ratio. In such the case, fine particles different in the average diameter and the material, for example, Aerosil 200V and R972V can be employed within the range of from 0.1:99.9 to 99.9 to 0.1 in weight ratio.

The presence of the matting agent in the film may be applied for another object such as for raising the strength of the film.

The fine particles can be added by kneading with the cellulose ester, and further can be kneaded together with the plasticizer, hindered amine compound, hindered phenol compound and acid capturing agent. Moreover, one prepared by spraying the fine particles previously dispersed in a solvent such as methanol and ethanol to the cellulose ester and mixing and drying, and one prepared by adding and mixing the fine particles dispersed in the solvent into a solution of the cellulose ester dissolved in a solvent, principally methylene chloride or methyl acetate, and drying to solidify, may be used as the raw material for melt-casting. A part or the entire of the plasticizer, hindered amine compound, hindered phenol compound, UV absorbent and acid capturing agent are preferably contained into the cellulose ester solution.

The film having a surface layer containing the file particles can be formed by a co-extruding method or a successive extruding method so that the film having the surface layer containing the fine particles having an average particle diameter of not more than 1.0 µm on at least one side of the film.

When the surface layer contains the fine particles, the fine particles may be contained in the support film.

(Formation of Film)

The cellulose ester film as the support of the optical compensation film according to the invention is formed by the melt-casting. The melt-casting in which the cellulose ester is cast in a molten state without use of any solvent usually used in the solution-casting such as methylene chloride can be classified in detail into a melt-extrusion forming method, a press forming method, an inflation forming method, an injection forming method, a blow forming method and a stretching forming method. Among them the melt-extrusion method is superior for obtaining the polarization plate protective film excellent in the mechanical strength and the precision of the surface. The melting temperature is preferably within the range of from 120 to 280° C., and more preferably from 200 to 250° C. considering the physical properties of the protective film.

The cellulose ester as the raw material formed into a powder or pellet is dried by hot air or in vacuum, and then thermally molten together with the other constituting materials into a fluid state. The resultant fluidized composition is extruded through a T-die into a sheet and contacted to a cooling drum or a cooling belt by applying static potential, for example, to obtain an un-stretched solidified sheet. The cooling drum is preferably held at a temperature of from 90 to 150° C.

The film peeled from the cooling drum is preferably reheated by a heating means such as one or more roller groups and/or an infrared heating means and stretched by one or plural steps in the longitudinal direction. On this occasion, the film is preferably heated at a temperature of from (Tg−30) to (Tg+100)° C., and more preferably from (Tg−20) to (Tg+80)° C., and stretched in the conveying direction (longitudinal direction MD) or width direction (TD). It is preferable that the film is stretched in the width direction at a temperature within the range of from (Tg−20) to (Tg+20)° C. and then thermally fixed. A relaxation treatment is preferably applied after the stretching.

The Tg of the cellulose film can be controlled by the kinds and the ratio of the materials constituting the film. For the use in the invention, the Tg of the film is preferably not less than 120° C., and more preferably not less than 135° C. When the film having a Tg lower than the above range is employed in the liquid crystal displaying apparatus, the orientation state of the molecules fixed in the film is influenced by the environmental temperature and the heat from the backlight and the retardation value so that the dimension stability and the shape of the film tend to be largely varied. When the Tg is too high, the production becomes difficult because the Tg nears to the decomposing temperature of the film constituting materials, and a volatile substance and coloring are caused sometimes on the occasion of the film formation by the decomposition of the film constituting composition itself. Therefore, the Tg of the film is preferably not more than 200° C., and more preferably not more than 170° C. The Tg of the film can be determined by the method described in JIS K7121.

In the case of the stretching in the width direction (TD), it is preferable that the stretching zone is divided into two or more steps and the film is stretched in the width direction while raising the temperature step by step within a temperature difference of from 1 to 50° C.; the distribution of the physical properties in the width direction can be reduced by such the processing. It is preferable for further reducing the distribution of the physical properties in the width direction that the film after the width direction stretching is kept for 0.01 to 15 minutes at a temperature of less than the final stretching temperature and not less than (Tg−40)° C.

Preferable expanding ratio of the cellulose film is from 1.01 to 2 in both of the longitudinal and the width directions. By such the stretching process, the cellulose ester film superior in the optical isotropy and having good flatness can be obtained. The width holding or the stretching in the width direction is preferably performed by a tenter; the tenter may be a pin tenter or a clip tenter.

In the invention, a cellulose ester film having a laminated structure can be produced by co-extruding compositions each different in the concentration of the additive such as the polymer, plasticizer, UV absorbent and fine particle. For example, the cellulose ester film can be produced which has a constitution of skin layer/core layer/skin layer. The fine particles can be added in large amount into the skin layer and small amount into the core layer. The polymer, plasticizer and UV absorbent may be added to the core layer in an amount larger than that to the skin layer, and may be added only to the core layer. The kind of the polymer, plasticizer and UV absorbent in the core layer and the skin layer may be differed from each other. For example, a low volatile polymer, plasticizer and/or UV absorbent may be added to the skin layer and a plasticizer having high plasticizing ability and a UV absorbent having high UV absorbing ability may be added to the core layer. The Tg of the skin layer and that of the core layer may be different, and the Tg of the corer layer is preferably lower than that of the skin layer. The viscosity of the molten composition containing the cellulose ester on the occasion of the melt-casting of the skin layer and that of the core layer may be different from each other, and the relation of them may be (Viscosity of skin layer)>(Viscosity of core layer) or (Viscosity of Core layer)≧(Viscosity of skin layer).

Though the concentration of the additive such as the plasticizer may be varied in the direction of the thickness of the film by the co-extrusion method, a uniform film can be produced by a single layer extrusion, in which the distribution of the additive in the thickness direction is small and is preferably employed.

When the cellulose ester film according to the invention is employed as the polarizing protective film having the optical compensation ability, the thickness of the protective film is preferably from 10 to 500 μm, more preferably from 10 to 100 μm, further preferably from 20 to 80 μm, and particularly preferably from 30 to 70 μm.

Though the drying load is considerably increased accompanied with the raising of the film thickness in the case of the solution casting method, a thick film can be produced with high production efficiency because any drying process is not necessary in the invention. Therefore, advantage can be obtained such as that the thickness of the film can be easily increased for giving the designated retarding property and reducing the moisture permeability. A thin film can be produced with high production efficiency by expanding such the thick film.

The fluctuation of the thickness of the cellulose ester support film is preferably within the range of ±3%, more preferably ±1%, and further preferably ±0.1%.

The width of the cellulose film of the invention is preferably from 1 to 4 m, and more preferably from 1.4 to 4 m, and particularly preferably from 1.4 to 2 m. When the width exceeds 4 m, the conveyance of the film becomes difficult.

The length of the winded film is preferably from 500 to 5,000 m, and more preferably from 1,000 to 5,000 m. Knurling with a height of from 0 to 25% of the film thickness is preferably formed at the both side edges of the film on the occasion of winding.

(Stretching Process)

The retardation of the optical compensation film of the invention is controlled by the following stretching process after the provision of the foregoing polymer layer onto the melt-cast cellulose ester film. The cellulose ester film may be solely stretched before provision of the polymer layer so as to be given the retarding ability.

The film is preferably expanded in one direction in a ratio of from 1.0 to 2.0 times and in the other direction in a ratio of from approximately 0.7 to 1.5 times.

The film can be successively or simultaneously stretched in the longitudinal direction and the direction crossing with right angle on the film surface with the longitudinal direction. On this occasion, sufficient retardation ability cannot be obtained when the expanding ratio in at least one direction is too small, and the expansion becomes difficult and film is broken in some cases when the expanding ratio is too large.

End-free single axis stretching or unbalance two-axis stretching by which the film is expanded in the width direction and shrunk in the casting direction may be applied for controlling the retardation in the surface direction or the thickness direction of the optical compensation film. The shrinking ratio in the shrinking direction is preferably from 0.7 to 1.0.

When the cellulose ester giving positive birefringence by stress is employed, the slow axis in the width direction can be given to the optical compensation film by stretching in the width direction. In such the case, it is preferable for improving the displaying quality that the slow axis is preferably along the width direction and satisfies the following relation; (Expanding ration in the width direction)>(Expanding ratio in the casting direction).

The cellulose ester film which is cast in the molten state and coated with the polymer layer is preferably subjected to a preheating treatment preceding the stretching process at a temperature of from 50 to 180° C., more preferably from 60 to 160° C., and further preferably 70 to 150° C., for a time of from 5 seconds to 3 minutes, more preferably from 10 seconds to 2 minutes, and further preferably from 15 to 90 seconds. Such the heating treatment is preferably applied during just before holding by the tenter to just before starting the stretching. It is more preferable that the heating treatment is applied during just after the holding by the tenter to just before starting the stretching.

The stretching is preferably carried out in a rate of from 5 to 300%/minute, more preferably from 10 to 200%/minute, and further preferably from 15 to 150%/minute. The stretching is preferably carried out by holding the both side edges of the film by the tenters.

The stretching angle is preferably from 2 to 10°, more preferably from 3 to 7°, and most preferably from 3 to 5°. The stretching speed may be constant or varied.

The temperature on the occasion of the stretching is preferably controlled so as to satisfy the relation represented by the following Expression 1.

$$\text{Melting temperature } A-100°\text{ C.} \leqq \text{Stretching temperature } B \leqq \text{Melting temperature } A-40°\text{ C.} \qquad \text{Expression 1}$$

In the above, "Melting temperature A" is the temperature of the cellulose ester film on the occasion of the melt-casting. When the stretching temperature B is less than (the melting temperature−100° C.), the controllability and the repeatability of the retardation are lowered, the uniformity of stretching tends to be caused and the haze is increased. When the stretching temperature B is more than (melting temperature A−40° C.), the expansion ratio should be increased for obtaining the necessary retardation so that the control of the retardation becomes difficult and the coloring tend to increase.

More preferable stretching temperature B is a temperature satisfying the relation of (Melting temperature A−90° C.)≦(stretching temperature B)≦(Melting temperature A−50° C.).

The distribution of the atmosphere temperature in the tenter process is preferably uniform, and is preferably within ±5° C., more preferably within ±2° C., further preferably within ±1° C., and most preferably ±0.5° C., in the width direction. The heating treatment in the tenter process is preferably performed with a heat transfer coefficient of from 20 J/m²hr to 130×10³ J/m²hr, more preferably from 40 J/m²hr to 130×10³ J/m²hr, and most preferably from 42 J/m²hr to 84×10³ J/m²hr.

The film conveying tension in the film forming process such as the tenter process is preferably from 120 N/m to 200 N/m, and more preferably from 140 N/m to 200 N/m, and most preferably from 140 N/m to 160 N/m, though the tension is varied depending on the temperature.

A tension roller is preferably provided before or after the tenter process for preventing not intended expansion of the film.

The optical compensation film relating to the invention is preferably subjected to a heating treatment for relaxing the distortion remaining after the stretching. The heating treatment is carried out at a temperature of from 110 to 150° C., preferably from 100 to 110° C., and further preferably from 130 to 160° C. The heating treatment is preferably performed with a heat transfer coefficient of from 20 J/m²hr to 130×10³ J/m²hr, more preferably from 40 J/m²hr to 130×10³ J/m²hr, and most preferably from 42 J/m²hr to 84×10³ J/m²hr. By such the treatment, the remaining distortion is reduced and the dimension stability at a high temperature condition such as 90° C. or a high temperature high humidity condition such as 80° C. and 90% RH is improved.

The stretched film is cooled by room temperature after the stretching treatment. The cooling of the stretched film is preferably started while holding width by the tenters. During the cooling process, the holding width of the film by the tenters is preferably reduced in a ratio of from 1 to 10%, more preferably from 2 to 9%, and further preferably from 2 to 8%, of the width of the stretched film for slacking the film. The cooling rate is preferably from 10 to 300° C./minute, more preferably from 30 to 250° C./minute, and further preferably from 30 to 250° C./minute. It is preferable that the holding by the tenters is released halfway of the cooling and the conveyance is changed to roller conveying though the film may be cooled by room temperature while holding by the tenters, and then the film is wound into a roll.

The optical compensation film of the present invention, produced as above, exhibits the following properties.

(Optical Properties)

The optical compensation film of the invention in a state of laminated with the polymer layer preferably has a retardation value Ro defined in the foregoing expression of from 20 to 300 nm and a retardation value Rt of from −600 to 600 nm. More preferable range of the Ro value is from 20 to 120 nm, and that of Rt value is from −400 to 400 nm, and particularly preferable range of the Ro value is from 40 to 100 nm and that of the Rt value is from −300 to 300 nm.

The optical compensation film is particularly advantageously employed for a VA type liquid crystal display having a VA mode liquid crystal cell. The optical compensation film to be employed to the VA type liquid crystal display is preferably has a Ro value of from 20 to 150 nm and a Rt value of from 30 to 100 nm. When two sheets of the optical compensation film are employed, the Rt value of the film is preferably with in the range of from 70 to 250 nm. When one sheet of the optical compensation film is employed, the Rt value of the film is preferably with in the range of from 150 to 400 nm.

The optical property of the retardation film for the polarization plate can be fully satisfied by making the retardation values to be within the above range.

Another property of the optical compensation film of the invention is described below. The followings are preferable characteristic values of the optical compensation film prepared by coating a polymer layer on a cellulose ester film formed by melt-casting and fixing.

(Moisture Permeability)

The moisture permeability of the optical compensation film of the invention is preferably from 1 to 250 g/m²·24 hr, more preferably 10 to 200 g/m²·24 hr, and most preferably from 20 to 180 g/m²·24 hr, under the condition of 25° C. and 90% RH. The moisture permeability can be measured by the method described in JIS Z0208.

(Equilibrium Moisture Content)

The equilibrium moisture content of the optical compensation film is preferably from 0.1 to 3%, more preferably from 0.3 to 2%, and particularly preferably from 0.5 to 1.5%, at 25° C. and 60% RH.

The equilibrium moisture content can be easily measured by a measuring apparatus according to Karl-Fischer method such as Karl-Fischer Moisture Measuring Apparatus CA-05, manufactured by Mitsubishi Kagaku Co., Ltd., (moisture evaporation device: VA-05, internal liquid: Aquamicron CXμ, external liquid: Aquamicron AX, flowing amount of nitrogen: 200 ml/minute, and heating temperature: 150° C.). In concrete, the samples is conditioned for 24 hours at 25° C. and 60% RH and 0.6 to 1.0 g of it is exactly weighed, and subjected to measurement. The equilibrium moister content was determined by the measured amount of moisture.

The moisture content of the optical compensation film of the invention is preferably from 0.3 to 15 g/m² at 30° C. and 85% RH for preventing degradation in the adhesion ability with polyvinyl alcohol (polarizing element). The moisture content is more preferably from 0.5 to 10 g/m². When the moisture content is larger than 15 g/m², the variation of the retardation accompanied with the variation of the temperature and humidity tends to become larger.

(Polarization Plate)

The polarization plate according to the invention is described below.

The polarization plated can be produced by a usual method. It is preferable that the backside of the optical compensation film of the invention is saponified by alkali and thus treated film is pasted onto a side of a polarizing layer prepared by stretching in an iodine solution by an alcohol solution of completely saponified polyvinyl alcohol. On the other side of the polarization plate, the optical compensation film of the invention, the melt-cast cellulose ester film relating to the invention, or a film of polymer such as norbonen type polymer, polycarbonate, polysulfone, polyolefin, acryl type polymer, polyallylate, polystyrene, poly(vinyl alcohol), poly(vinyl chloride), poly(vinylidene chloride) and acetate type polymer may be applied. As the polarization plate protective film to be applied on the side of the polarization plate other than the side on which the optical compensation film is pasted, a cellulose ester film available on the market can be also employed. For example, cellulose ester film KC8UX2M, KC4UX, KC5UX, KC4UY, KC8UY and KC12UR, each manufactured by Konica Minolta Co., Ltd., are preferably employed which are superior in the flatness and the polarization plate having a stable viewing field expanding effect can be obtained by those.

The polarizing layer principally constituting the polarization plate is an element capable of only passing light polarized in a certain face, and known typical polarizing layer is a poly(vinyl alcohol) type polarization film which includes a poly(vinyl alcohol) type film and a ethylene copolymerized poly(vinyl alcohol) type film each dyed with iodine. The polarization film is prepared by forming a film from an aqueous solution of poly(vinyl alcohol) and stretching the film in one-axis and dying the film or stretching the film in one-axis direction after dying. The thickness of the polarization film is from 5 to 30 μm, and preferably from 10 to 25 μm. One side of the optical compensation film of the invention is pasted onto a surface of the polarization film to prepare the polarization plate. The pasting is preferably performed by using an aqueous type adhering agent principally composed of completely saponified poly(vinyl alcohol).

The polarization film is expanded in one-axis direction (usually longitudinal direction). Therefore, the film is shrunk in the expanded direction (usually longitudinal direction) and tends to be lengthen in the direction crossing the longitudinal direction with right angle (usually width direction). Thinner polarization plate protective film causes increasing in the lengthening and shrinking ratio, particularly shrinking in the stretched direction, of the polarization plate. When the thinner polarization plate protective film is employed, it is important to inhibit the expansion and shrink ratio, particularly in the casting direction, of the polarization plate protective film because the stretching direction of the polarization film is usually pasted along the casting direction (MD direction) of the polarization plated protective film. In the optical compensation film according to the invention, waving ununiformity is not increased even when the film is subjected to the durability test at 60° and 90% RH, and the polarization plate using the optical compensation film can provide good visivility.

(Displaying Apparatus)

Various liquid crystal displays excellent in the visivility can be produced by using the polarization plate of the invention. The optical compensation film is preferably applied for a reflection type, a transparent type and translucent type LCD, and liquid crystal displays having various types of driving system such as a TN type, a STN type, an OCB type, A HAN type, a VA type (a PVA type and a MVA type) and an IPS type. The optical compensation film of the invention displays effect, particularly in a large liquid crystal display such as a 30-type, that the color ununiformity and the waving ununiformity are reduced and eyestrain is not caused by watching for long time. The optical compensation film of the invention may be applied on both sides of the liquid crystal cell.

The preferable constitution of preferable liquid crystal display is as follows, but that is not limited to them.

(Viewing side) Polarization plate protecting film/Polarizing element/Optical compensation film of the invention/Liquid crystal cell/Polarization plate protecting film (Backlight side)

(Viewing side) Polarization plate protecting film/Polarizing element/Polarization plate protecting film/Liquid crystal cell/Optical compensation film of the invention/Polarizing element/Polarization plate protecting film (Backlight side)

In the above, a melt-cast cellulose ester film, a polyester film, a polycarbonate film or a cyclic olefin resin film is employed as the polarization plate protecting film.

In the invention, sufficient retardation effect can be expected by the use of the optical compensation film which is produced by stretching together with the supporting film and the polymer layer provided on the supporting film. Therefore, the number of the optical compensation film to be used may be only one, and the use of one sheet of the film is preferable for the stability of the retardation which is the object of the invention.

A known functional layer such as antistatic layer, a transparent electroconductive layer, a hard coat layer, an antidazzling layer, an antireflection layer, an antistaining layer, a slipping layer, an adhesion layer, an antidazzling layer and a gas barrier layer may be provided on the polarization plate protecting layer to be applied on the viewing side of the plate.

The backlight to be used in the liquid crystal display of the invention may be a side lighting type, a direct lighting type or a combination thereof, and the direct lighting type is preferable. Particularly preferable direct type backlight is a LED backlight for liquid crystal color display having a red (R) LED, a green (G) LED, and a blue (B) LED, in which it is preferable that, for example, the peak wavelength of light emitted from the red (R) LED is not less than 610 nm, the peak wavelength of light emitted from the green (G) LED is within the range of 530±10 nm and the peak wavelength of light emitted from the blue (B) LED is not more than 480 nm. Examples of the green (G) LED include DG1112H and UG1112H, each manufactured by Stanley Electric Co., Ltd., E1L51-3G and E1L49-3G, each manufactured by Toyota Gosei Co., Ltd., and NSPG500S, manufactured by Nichia Kagaku Kogyo Co., Ltd. Examples of the red (R) LED include FR1112H and FR5366X, each manufactured by Stanley Electric Co., Ltd., NSTM515AS, manufactured by Nichia Kogyo Co., Ltd., and GL3ZR3D1COS and GM1JJ35200, each manufactured by Sharp Co., Ltd. Examples of the LED to be used as the blue (B) LED include DB1112H and DB5306X, each manufactured by Stanley Electric CO., Ltd., E1L51-3B and E1L4E-SB1A, each manufactured by Toyota Gosei Co., Ltd., and NSPB630S and NSPB310A, each manufactured by Nichia Kagaku Kogyo Co., Ltd.

The backlight can be prepared by combining the three color LEDs. Moreover, a white light emitting LED also can be employed for the backlight.

Direct illumination backlight units are also disclosed in, for example, Japanese Patent O.P.I. Publication No. 2001-281656, Japanese Patent O.P.I. Publication No. 2001-305535 in which dot type LED light source is used, and JP-A No. 2002-311412, however, backlight units are not limited thereto.

The liquid crystal display excellent in the color reproducibility can be produced by the invention, in which the variation in the visibility caused by the heat generated by the LED backlight and the variation in the environmental conditions is considerably reduced.

EXAMPLE

The invention is described below referring examples but the invention is not limited to the examples.

The measuring methods and the material to be employed in the examples are described below.

(Retardation Ro and Rt)

The retardation of the film at 590 nm was measured by an automatic double refractometer KOBRA-21AD, manufactured by Ooji Keisokuki Co., Ltd., under a condition of 23° C. and 55% RH. The sample to be measured was previously conditioned for 24 hours in the same atmosphere. The retardation in face direction Ro and that in the thickness direction Rt were determined by inputting the average refractive index and the thickness d of the film previously measured by an Abbe's refractometer.

$$Ro=(n_x-n_y)\times d \qquad \text{Expression (i)}$$

$$Rt=\{(n_x+n_y)/2-n_z\}\times d \qquad \text{Expression (ii)}$$

In the above, $n_x$ is the refractive index in the slow axis direction in the film face; $n_y$ is the refractive index in the fast axis direction in the film face, $n_z$ is the refractive index in the thickness direction of the film and d is the thickness of the film in nm.

(Scatter or Retardation Ro and Rt)

The retardation of the obtained film sample was measured at every 1 cm in the width direction of the film. The scatter of the retardation is the variation coefficient of the date obtained by the above measurement. The three dimension double refractive index at 590 nm was measured at every 1 cm in the width direction of the film by the automatic double refractometer KOBURA-21ADH, manufactured by Ooji Keisokuki Co., Ltd., under the condition of 23° C., 55% RH. The standard deviation of the retardation values in the face direction and the thickness direction were calculated by an (n–1) method. The distribution of the retardation values was expressed by the variation coefficient (CV) calculated by the following expression. In the practical measurement, n was set at 130 to 140.

Variation coefficient CV=Standard deviation/Average value of retardation

A: Scatter (CV) was less than 1.5%.
B: Scatter (CV) was not less than 1.5% and less than 5%.
C: Scatter (CV) was not less than 5% and less than 10%.
D: Scatter (CV) was not less than 10%.

(Haze)

The haze of one sheet of the retardation film sample was measured according to JIS K-6714 by a haze meter 1001DP, manufactured by Nihon Denshoku Kogyo Co., Ltd. The haze was evaluated according to the following ranks.

A: Haze was less than 0.4%.
B: Haze was not less than 0.4% and less than 0.6%.
C: Haze was not less than 0.6% and less than 0.8%.
D: Haze was not less than 0.8%.

(Materials)

<Cellulose Ester: 90 Parts by Weight>

Cellulose ester 1: Cellulose triacetate having an acetyl substitution degree of 2.9, a number average molecular weight of 75,000 and remaining sulfuric acid content in terms of elemental sulfur of 16 ppm Cellulose ester 2: Cellulose acetate propionate having an acetyl substitution degree of 1.9 and a propionyl substitution degree of 0.75, a number average molecular weight of 60,000 and a remaining sulfuric acid content in terms of elemental sulfur of 50 ppm Cellulose ester 3: Cellulose acetate propionate having an acetyl substitution degree of 2.0 and a propionyl substitution degree of 0.8, a number average molecular weight of 100,000 and a remaining sulfuric acid content in terms of elemental sulfur of 25 ppm Cellulose ester 4: Cellulose acetate propionate having an acetyl substitution degree of 1.9 and a propionyl substitution degree of 1.0, a number average molecular weight of 95,000 and a remaining sulfuric acid content in terms of elemental sulfur of 45 ppm Cellulose ester 5: Cellulose acetate butylate having an acetyl substitution degree of 1.9 and a butyl substitution degree of 0.6, a number average molecular weight of 120,000 and a remaining sulfuric acid content in terms of elemental sulfur of 12 ppm Cellulose ester 6: Cellulose acetate propionate having an acetyl substitution degree of 1.90 and a propionyl substitution degree of 0.75, a number average molecular weight of 80,000 and remaining sulfuric acid content in terms of elemental sulfur of 75 ppm Cellulose ester 7: Cellulose acetate propionate having an acetyl substitution degree of 2.0 and a propionyl substitution degree of 0.75, a number average molecular weight of 100,000 and a remaining sulfuric acid content in terms of elemental sulfur of 0.1 ppm, which was prepared by washing Cellulose ester 3 by a 0.01N sodium hydroxide aqueous solution and then washing by water.

(Measuring Method of Residual Sulfuric Acid Content)

The residual sulfuric acid content was measured by the following method.

<Pre-Treatment>

A weighed sample of 500 mg (M) is placed in a polypropylene vessel, and ultrapure water of 10 ml is added into it.

After the above is dispersed by an ultrasonic cleaner for 30 minutes, it is filtrated with a water-based chrimatodisc (0.45 µm) to prepare a sample.

(Quantitative Determination of SO$_4$)

<Apparatus> Ionchromatography DX-120 produced by DIONEX
<Column> IonPac AG14 (4 mm) + IonPac AS14 (4 mm)
<Suppressor> ASRS-ULTRAII (4 mm)
<Eluting solution> 3.5 mM-Na$_2$CO$_3$ 1.0 mM-NaHCO$_3$
<SRS current> 50 mA
<Flow rate> 1.0 ml/min
<Dose> 25 µm
<Conversion method> Contennt (ppm) = measured value (mg/l)/1000 × 10/M(mg) × 1000000
<Plasticizer>

| | |
|---|---|
| Plasticizer 1: Triphenyl phosphate | 10 parts by weight |
| Plasticizer 2: trimethylpropane tribenzoate | 10 parts by weight |
| Plasticizer 3: Polyester type plasticizer sample NO. 3 | 10 parts by weight |
| Plasticizer 4: Citrate type plasticizer, Compound PL-11 described in Japanese Patent O.P.I. Publication No. 2002-62430 | 10 parts by weight |
| Plasticizer 5: Phthalate type plasticizer, the following Compound 1 | 10 parts by weight |

Compound 1

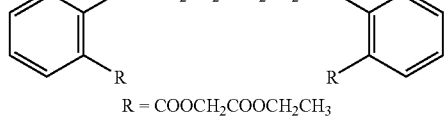

R = COOCH$_2$COOCH$_2$CH$_3$

<UV absorbent>

| | |
|---|---|
| UV-1: Tinubin 109, manufactured by Ciba Specialty Chemicals Co., Ltd., having a weight average molecular weight of 486 and a mole absorption coefficient at 380 nm of 680 | 2 parts by weight |
| UV-2: Polymer UV absorbent P-1 synthesized according to the followings | 2 parts by weight |
| UV-3: Polymer UV absorbent P-2 synthesized by the followings | 2 parts by weight |

(Synthesizing example of polymer UV absorbent P-1)
(2-methacryloxy)ethyl 2-(2'-hydroxy-5'-butyl-phenyl)-5-carboxylate-2H-benzotriazole (Exemplified Compound MUV-19) was synthesized according to the following procedure.

In 160 ml of water, 20.0 g of 3-nitro-4-amino-benzoic acid was dissolved and 43 ml of concentrated sulfuric acid was added. To the solution, 8.0 g of sodium nitrite dissolved in 20 ml of water was added and stirred for 2 hours at 0° C. The resultant solution was dropped into a solution of 17.3 g of 4-t-butylphenyl dissolved in 50 ml of water and 100 ml of ethanol maintained at 0° C. while keeping the solution at alkaline by potassium carbonate and the mixture was stirred for 1 hour at 0° C. and further stirred for 1 hour at room temperature. The reaction liquid was acidified by hydrochloric acid to form precipitation. The formed precipitation was filtered and satisfactorily washed by water.

The filtered precipitation was dissolved in 500 ml of a 1 mole/liter aqueous solution of NaOH, and 35 g of zinc powder was added to the solution, and then 110 g of a 40% aqueous solution of NaOH was dropped. After completion of the dropping, the mixture was stirred for 2 hours, filtered and washed by water. The filtrate was neutralized by hydrochloric acid for forming precipitate. The precipitate was filtered, washed by water and dried, and recrystallized by a mixture solvent of ethyl acetate and acetone. Thus 2-(2'-hydroxy-5'-butyl-phenyl)-5-carboxylic acid-2H-benzotriazole was obtained.

After that 10.0 g of 2-(2'-hydroxy-5'-butyl-phenyl)-5-carboxylic acid-2H-benzotriazole, 0.1 g of hydroquinone, 4.6 g of 2-hydroxyethylmethacrylate, 0.5 g of p-toluenesulfonic acid was added to 100 ml of toluene, and the mixture was refluxed by heating for 10 hours in a reaction vessel having an ester pipe. The reacting solution was poured into water and precipitated crystals was filtered, washed by water, dried and recrystallized by ethyl acetate. Thus (2-methacryloyloxy)-ethyl 2-(2'-hydroxy-5'-butyl-phenyl)-5-carboxylate-2H-benzotriazole or MUV-19, was obtained.

After that, a copolymer of (2-methacryloyloxy)-ethyl 2-(2'-hydroxy-5'-butyl-phenyl)-5-carboxylate-2H-benzotriazole and methyl methacrylate was synthesized according to the following method.

In 80 ml or tetrahydrofuran 4.0 g of the above obtained (2-methacryloyloxy)-ethyl 2-(2'-hydroxy-5'-butyl-phenyl)-5-carboxylate-2H-benzotriazole and 6.0 g of methyl-methacrylate were added and then 1.14 g of azoisobutylylo-nitrile was added. The mixture was heated and refluxed for 9 hours under nitrogen gas atmosphere. Tetrahydrofuran was removed by distillation under reducing pressure and the residue was re-dissolved in 20 ml of tetrahydrofuran. The solution was dropped into a largely excessive amount of methanol. The formed precipitate was filtered and dried in vacuum at 40° C. Thus 9.1 g of polymer UV absorbent P-1 of grayish white powder was obtained. It was confirmed by GPC analysis using standard polystyrene that the weight average molecular weight of this copolymer was 9,000. The absorption coefficient at 380 nm of the monomer component was 7320.

It was confirmed that the above obtained copolymer was a copolymer of (2-methacryloyloxy)-ethyl 2-(2'-hydroxy-5'-butyl-phenyl)-5-carboxylate-2H-benzotriazole and methyl methacrylate. The constituting ration of (2-methacryloyloxy)-ethyl 2-(2'-hydroxy-5'-butyl-phenyl)-5-carboxylate-2H-benzotriazole and methyl methacrylate in the copolymer was approximately 40:60.

(Synthesizing example of polymer UV absorbent P-2)

Polymer UV absorber P-2 was synthesized in the same manner as in the above polymer UV absorbent P-1 except that 5.0 g of methyl methacrylate and 1.0 g of hydroxyethyl methacrylate were used in place of 6.0 g of methyl methacrylate. The weight average molecular weight and P-2 was 9,000 and the mole absorption coefficient of monomer component at 380 nm was 7320. The constituting ratio of (2-methacryloxy)-ethyl 2-(2'-hydroxy-5'-butyl-phenyl)-5-carboxylate-2H-benzotriazole, methyl methacrylate and hydroxyethyl methacrylate in the copolymer was approximately 40:50:10.

UV-4: RUVA-100, manufactured by Ootsuka Kagaku Co., Ltd., having a weight average molecular weight of 494.5 and a mole absorption coefficient at 380 nm of 4340 — 1 part by weight

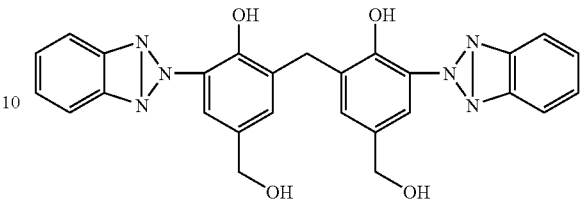

UV-5: LA-30, manufactured by Asahi Denka Kogyo Co., Ltd., having a weight average molecular weight of 658.9 and a mole absorption coefficient at 380 nm of 8250 — 1.6 parts by weight

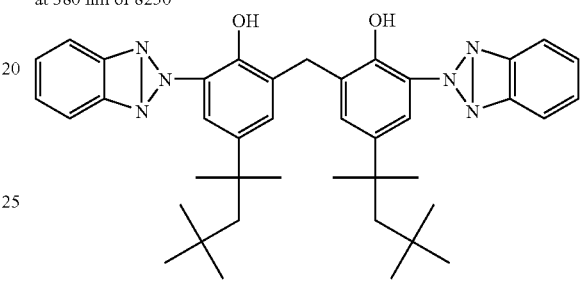

UV-6: RUVA-30M, manufactured by Ootsuka Kagaku Co., Ltd., having a weight average molecular weight of 9,000 and a mole absorption coefficient of the monomer at 380 nm of 600, which is a copolymer of 3-(2H-1,2,3-bezotriazole-2-yl and methyl methacrylate in a ratio of 30:70. — 2 parts by weight When two kinds of the UV absorbent were used, the total adding amount was 2 parts by weight and the using ratio was 1:1, In the table, 2/3 represents that the UV-2 and UV-3 were used in combination. 2/4, 2/5, 3/4, 3/5 and 3/6 are the same expression.

<Additives>

| | |
|---|---|
| Additive 1: Irganox 1010 (antioxidant, Ciba Specialty Chemicals Co., Ltd.) | 0.2 parts by weight |
| Additive 2: Epoxide tar oil (acid capturing agent) | 0.2 parts by weight |
| Additive 3: HALS (hindered amine light stabilizer) | 0.2 parts by weight |

Example 1

Preparation of Support by a Solution Casting Film Forming Method: Cellulose Ester Film 1

<Fine Particle Dispersion>

| | |
|---|---|
| Fine particle, Aerosil R972V (Nihon Aerosil Co., Ltd.) | 11 parts by weight |
| Ethanol | 89 parts by weight |

The above composition was mixed by stirring for 50 minutes by a dissolver and dispersed by Manton-Goulin emulsifier.

<Fine Particle Adding Liquid>

Cellulose ester 1 was put into a dissolving tank containing methylene chloride and completely dissolved by heating and the resultant solution was filtered by Azumi filter paper No. 244. The fine particle dispersion was gradually added to the cellulose ester solution after the filtration while satisfactorily stirring. The resultant liquid was filtered by Finemet NF, manufactured by Nihon Seisen Co., Ltd., to prepare a fine particle adding liquid.

| Methylene chloride | 99 parts by weight |
| Cellulose ester 1 | 4 parts by weight |
| Fine particle dispersion | 11 parts by weight |

A main dope having the following composition was prepared. Methylene chloride and ethanol were charged into an airtight pressure dissolving tank, and Cellulose ester 1 was gradually put into the vessel while stirring. The cellulose ester was completely dissolved by heating and stirring, and the plasticizer and the UV absorbent were further added and dissolved. The resultant liquid was filtered by Azumi Filter Paper No. 244, manufactured by Azumi Filter Paper Co., Ltd., to prepare the main dope.

Hundred parts by weight of the main dope and 2 parts by weight of the fine particle adding liquid were satisfactorily mixed in an inline mixer, Torey static inline mixer Hi-Mixer SWJ, and then thus prepared dope was uniformly cast on a stainless steel supporting band having a width of 1.8 m. The solvent was evaporated until the remaining solvent content became 100% on the stainless steel supporting band and then the formed web was peeled off from the supporting band. The web was stretched in the longitudinal direction (MD) by applying tension on the occasion of the peeling for making the expanding ratio of 1.1. After that, the web was stretched at 150° C. so that the expanding ratio in the width direction (TD) became 1.1 by holding the both edges of the web by the tenters. After the stretching, the width of the web was kept for several seconds for relaxing the stress in the longitudinal direction and then the holding was released and dried for 30 minutes while conveying in a drying zone kept at 130° C. and the both side edge parts of the web were silted off. Thus Cellulose Ester Film 1 was wound up which has a thickness of 80 μm and knurling of a width of 1 cm and a height of 8 μm at the both side edge portions.

<Composition of Main Dope>

| Methylene chloride | 300 parts by weight |
| Ethanol | 55.5 parts by weight |
| Cellulose ester 1 | 100 parts by weight |
| Plasticizer 1 | 10 parts by weight |
| UV-1 | 2 parts by weight |

After that, the following polymer layer was coated and dried by a gravure coater on Cellulose Ester Film 1, and stretched by the tenters together with the cellulose ester film in the width direction expanding ratio and at the stretching temperature each described in Table 1 to prepare optical compensation film 1. The retardation values of the film were 60 nm of Ro and 250 nm of Rt.

Preparation of Support by Melt-Casting Method;
Cellulose Ester Films 2 through 22

The foregoing Cellulose ester 2 was subjected to a heating treatment for 1 hour at 120° C. in dry air and cooled by room temperature in dried air. The plasticizer and the additives other than the cellulose ester listed in Table 1 were added in the foregoing amounts to 90 parts by weight of the dried cellulose ester, and mixed by a Henschel mixer. The mixture was heated and made to pellets by a squeezing machine.

The resultant pellets were dried under air stream by a hot air dryer at 105° C. for 2 hours to remove moisture. A cellulose ester film was formed using the pellets by a single axis extruder having a coat hanger type T die made from tungsten carbide with a lip width of 1.5 m and a screw diameter of 90 mm, manufactured by Mitsubishi Juukogyo Co., Ltd. The extrusion was carried out in a clean room of not more than 1,000 class, at a melting temperature of 230° C. and a die temperature of 240° C. The formed film was stretched by 1.1 times in the longitudinal direction and 1 time in the width direction by the tenter apparatus. Thus a cellulose ester film having a thickness of 80 μm and a width of 1.4 m was obtained. The film was subjected to a treatment to form knurling of a width of 1 cm and an average height of 8 μm at both edge portions, and wound up. Thus Cellulose Ester Film 2 was obtained. Moreover Cellulose Ester Films 3 through 22 were prepared in the same manner as in Cellulose Ester Film 2 except that the cellulose ester, additives and melting temperature were changed as listed in Table 1.

The following polymer layer was coated on Cellulose ester film 2 by a micro gravure coater and dried, and stretched by the tenters together with the cellulose ester film in the width direction expanding ratio and at the stretching temperature each described in Table 1 to prepare Optical compensation film 2. The retardation values of the film were 60 nm of Ro and 250 nm of Rt.

<Polymer Layer>

A 15 weight-percent cyclohexane solution of a polyimide having a weight average molecular weight of 59,000, which was synthesized from 2,2'-bis(3,4-dicarboxyphenyl)-hexafluoropropane dianhydride and 2,2'-bis(trifluoromethyl)-4,4'-diaminobiphenyl was coated on each of the solution cast or melt-cast cellulose ester film and stretched and dried together with the cellulose film at the temperature and the expanding ratio listed in Table 1 so as to from a polymer layer having a thickness of 6 μm.

Optical compensation films 3 through 22 were obtained in the same manner as in Optical Compensation Film 2 except that the cellulose ester film and stretching temperature were each changed as listed in Table.

TABLE 1-1

| *1 | Film forming method | *2 | *3 | Plasticizer No. | UV absorbent No. | Additive No. | Melting temperature | Width direction expanding ratio | Stretching temperature | Remarks |
|---|---|---|---|---|---|---|---|---|---|---|
| 1 | Solution casting | 1 | 1 | 1 | UV-1 | — | — | 1.2 times | 150° C. | Comp. |
| 2 | Melt-casting | 2 | 2 | 1 | UV-1 | — | 230° C. | 1.2 times | 150° C. | Inv. |

TABLE 1-1-continued

| *1 | Film forming method | *2 | *3 | Plasticizer No. | UV absorbent No. | Additive No. | Melting temperature | Width direction expanding ratio | Stretching temperature | Remarks |
|---|---|---|---|---|---|---|---|---|---|---|
| 3 | Melt-casting | 3 | 2 | 1 | UV-1 | 1 | 230° C. | 1.2 times | 150° C. | Inv. |
| 4 | Melt-casting | 4 | 3 | 1 | UV-1 | 1 | 230° C. | 1.2 times | 150° C. | Inv. |
| 5 | Melt-casting | 5 | 3 | 2 | UV-2 | 1 | 230° C. | 1.2 times | 150° C. | Inv. |
| 6 | Melt-casting | 6 | 3 | 3 | UV-2 | 1 | 230° C. | 1.2 times | 150° C. | Inv. |
| 7 | Melt-casting | 7 | 3 | 4 | UV-2 | 1 | 230° C. | 1.2 times | 150° C. | Inv. |
| 8 | Melt-casting | 8 | 3 | 5 | UV-2 | 1 | 230° C. | 1.2 times | 150° C. | Inv. |
| 9 | Melt-casting | 9 | 3 | 2 | UV-2 | 1 | 230° C. | 1.2 times | 125° C. | Inv. |
| 10 | Melt-casting | 10 | 3 | 2 | UV-2 | 1 | 230° C. | 1.2 times | 130° C. | Inv. |
| 11 | Melt-casting | 11 | 3 | 2 | UV-2 | 1 | 200° C. | 1.2 times | 165° C. | Inv. |

*1: Optical compensation film,
*2: Cellulose ester film No.,
*3: Cellulose ester No.,
Comp.: Comparative,
Inv.: Inventive

TABLE 1-2

| *1 | Film forming method | *2 | *3 | Plasticizer No. | UV absorbent No. | Additive No. | Melting temperature | Width direction expanding ratio | Stretching temperature | Remarks |
|---|---|---|---|---|---|---|---|---|---|---|
| 12 | Melt-casting | 12 | 3 | 2 | UV-2 | 1 | 200° C. | 1.2 times | 160° C. | Inv. |
| 13 | Melt-casting | 13 | 3 | 2 | UV-2/3 | 1, 2, 3 | 230° C. | 1.2 times | 150° C. | Inv. |
| 14 | Melt-casting | 14 | 3 | 2 | UV-2/4 | 1, 2, 3 | 230° C. | 1.2 times | 150° C. | Inv. |
| 15 | Melt-casting | 15 | 3 | 2 | UV-2/5 | 1, 2, 3 | 230° C. | 1.2 times | 150° C. | Inv. |
| 16 | Melt-casting | 16 | 3 | 2 | UV-3/4 | 1, 2, 3 | 230° C. | 1.2 times | 150° C. | Inv. |
| 17 | Melt-casting | 17 | 3 | 2 | UV-3/5 | 1, 2, 3 | 230° C. | 1.2 times | 150° C. | Inv. |
| 18 | Melt-casting | 18 | 3 | 2 | UV-3/6 | 1, 2, 3 | 230° C. | 1.2 times | 150° C. | Inv. |
| 19 | Melt-casting | 19 | 4 | 2 | UV-3/5 | 1, 2, 3 | 230° C. | 1.2 times | 150° C. | Inv. |
| 20 | Melt-casting | 20 | 5 | 2 | UV-3/5 | 1, 2, 3 | 230° C. | 1.2 times | 150° C. | Inv. |
| 21 | Melt-casting | 21 | 6 | 2 | UV-3/5 | 1, 2, 3 | 230° C. | 1.2 times | 150° C. | Comp. |
| 22 | Melt-casting | 22 | 7 | 2 | UV-3/5 | 1, 2, 3 | 230° C. | 1.2 times | 150° C. | Inv. |

*1: Optical compensation film,
*2: Cellulose ester film No.,
*3: Cellulose ester No.,
Comp.: Comparative,
Inv.: Inventive The scattering of retardation and the haze in each of thus obtained optical compensation films were measured. The evaluation results are listed in Table 2.

TABLE 2

| Optical compensation film No. | Haze | Scattering of retardation | Visibility of liquid crystal display | Remarks |
|---|---|---|---|---|
| 1 | D | D | D | Comparative |
| 2 | C | B | B | Inventive |
| 3 | C | B | B | Inventive |
| 4 | C | B | B | Inventive |
| 5 | B | B | B | Inventive |
| 6 | B | B | B | Inventive |
| 7 | B | B | B | Inventive |
| 8 | B | B | B | Inventive |
| 9 | C | C | C | Inventive |
| 10 | B | B | B | Inventive |
| 11 | C | C | C | Inventive |
| 12 | B | B | B | Inventive |
| 13 | B | B | B | Inventive |
| 14 | A | A | A | Inventive |
| 15 | A | A | A | Inventive |
| 16 | A | A | A | Inventive |
| 17 | A | A | A | Inventive |
| 18 | B | B | B | Inventive |
| 19 | A | A | A | Inventive |
| 20 | A | A | A | Inventive |
| 21 | D | C | D | Comparative |
| 22 | B | B | B | Inventive |

It is understood that Optical Compensation Films 2 through 20 and 22 of the invention each of which is produced by using cellulose resin film formed by melt-casting the composition containing the cellulose resin having a remaining sulfuric acid content of from 0.1 to 50 ppm, and the polymer layer is coated on the cellulose film and stretched together with cellulose resin film are comprehensively superior in the retardation value, the scattering of the retardation and the haze to Optical Compensation Film 1 using the cellulose ester film prepared by the solution casting method using methylene chloride as the solvent and Optical Compensation Film 22 using the cellulose resin having a remaining sulfuric acid content without the range of from 0.1 to 50 ppm.

Moreover, it is understood that the effects of the invention is lowered a little in Optical Compensation Films 2 through 4 of the invention using triphenyl phosphate as the phosphate type plasticizer, and the effects of the invention are lowered a little in Optical Compensation Films 9 and 11 which as prepared by the stretching temperature each being outside of the lower or the upper limit of the preferable range.

Optical Compensation Films 14 to 17, 19, 20 and 22 using the preferable cellulose esters and the UV absorbent in combination are superior in any characteristics.

Example 2

A hard coated film with ant-reflection layer was prepared by forming a hard coat layer and an anti reflection layer on Cellulose ester film 14 prepared in Example 1.

<<Preparation of Cellulose Ester Film Having Hard Coat Layer and a Back Coat Layer>>

Hard Coat Layer Coating Liquid 1 was prepared by filtering the following composition by a polypropylene filter having a pore diameter of 0.4 μm. The coating liquid was coated on the above prepared Cellulose Ester Film 14 by the micro gravure coater and dried at 90° C. The coated layer was cured by irradiation of a UV lump having a luminance of 100 mW and an irradiate amount of 0.1 J/cm$^2$. Thus Hard Coat Layer 1 having a thickness of 7 μm was formed to prepare a hard coat film.

<Hard Coat Layer Coating Liquid 1>

The following materials were stirred and mixed to prepare Hard Coat Layer Coating Liquid 1.

| | |
|---|---|
| Acryl monomer: Kayarad DPHA (Dipentaerythritol hexaacrylate, Nihon Kayaku Co., Ltd.) | 220 parts by weight |
| Irgacure 184 (Ciba Specialty Chemicals) | 20 parts by weight |
| Propylene glycol monomethyl ether | 110 parts by weight |
| Ethyl acetate | 110 parts by weight |

Moreover, the following back coat composition was coated by an extrusion coater so that the wet layer thickness was 10 μm to form a back coat-layer.

<Bach Coat Layer Composition>

| | |
|---|---|
| Acetone | 54 parts by weight |
| Methyl ethyl ketone | 24 parts by weight |
| Methanol | 22 parts by weight |
| Diacetyl cellulose | 0.6 parts by weight |
| 2% acetone dispersion of ultra fine silica particles (Aerosil 200V, Nihon Aerosil Co., Ltd.) | 0.2 parts by weight |

<<Preparation of Film With Antireflection Layer>>

On the above-prepared Hard Coat Film 1, an antireflection layer was coated in the order of a high refractive layer and a low refractive layer as follows to prepare a hard coat film with the antireflection layer.

(Preparation of Antireflection Layer; High Refractive Layer)

The following High Refractive Layer Composition 1 was coated on the hard coat film by an extrusion coater and dried for 1 minute at 80° C., and cured by irradiation of 0.1 j/cm$^2$ of UV rays and further cured by heating for 1 minute at 100° C. Thus high refractive layer 1 having a thickness of 78 μm was provided.

The refractive index of the high refractive layer was 1.62.

| <High Refractive Layer Coating Composition 1> | |
|---|---|
| An isopropyl alcohol solution of metal oxide fine particle (solid content: 20%, ITO particle, particle diameter: 5 nm) | 55 parts by weight |
| Metal compound: Ti(OBu)$_4$ (tetra-n-butoxytitanium) | 1.3 parts by weight |
| Ionizing radiation curing type ester: Dipentaerythritol hexaacrylate | 3.2 parts by weight |
| Photopolymerization initiator: Irgacure 184 (Ciba Specialty Chemicals Co., Ltd.) | 0.8 parts by weight |
| 10% polypropylene glycol monomethyl ether solution of straight chain dimethylsilicone-EO block copolymer (FZ-2207, Nihon Unicar Co., Ltd.) | 1.5 parts by weight |
| Propylene glycol monomethyl ether | 120 parts by weight |
| Isopropyl alcohol | 240 parts by weight |
| Methyl ethyl ketone | 40 parts by weight |

(Preparation of Reflection Layer: Low Refractive Layer)

The following low refractive layer coating composition 1 was coated on the above high refractive layer by the extruding coater and dried for 1 minute at 100° C., and cured by irradiation of 0.1 J/cm$^2$ of UV rays, and further cured by heating at 120° C. for 5 minutes to form a low refractive layer having a thickness of 95 nm. Thus Hard Coat Film 1 was prepared. The refractive index of the low fractive layer was 1.37.

(Preparation of Low Refractive Layer Coating Composition)

<Preparation of Tetraethoxysilane Hydrolysis Product A>

To a mixture of 289 g of tetraethoxysilane and 553 g of ethanol, 175 g of a 15% acetic acid aqueous solution was added and stirred for about 30 hours in a water bath at 25° C. to prepare a tetraethoxysilane hydrolysis product A.

| | |
|---|---|
| Tetraethoxysilane hydrolysis product A | 110 parts by weight |
| Hollow type silica fine particle (The following P-2) | 30 parts by weight |
| Silane coupling agent (KBM503, Shin'etsu Kagaku Co., Ltd.) | 4 parts by weight |
| 10% polypropylene glycol monomethyl ether solution of straight chain dimethylsilicone-EO block copolymer (FZ-2207, Nihon Unicar Co., Ltd.) | 3 parts by weight |
| Propylene glycol monomethyl ether | 400 parts by weight |
| Isopropyl alcohol | 400 parts by weight |

<Preparation of Hollow Type Silica Fine Particle P-2>

A mixture of 100 g of silica sol having an average particle diameter of 5 nm and a $SiO_2$ concentration of 20% by weight and 1,900 g of purified water was heated by 80° C. The pH value of the resultant reaction mother liquid was 12.5. To the mother liquid, 9,000 g of an aqueous solution of sodium silicate containing 0.98% by weight of $SiO_2$ and 9,000 g of an aqueous solution of sodium aluminate containing 1.02% by weight of $Al_2O_3$ were simultaneously added while holding the temperature of the reacting liquid at 80° C. The pH value of the liquid was raised by 12.5 just after the addition and almost not varied after that. The reacting liquid was cooled by room temperature after completion of the addition, and washed by using a ultrafilter membrane to prepare a $SiO_2 \cdot Al_2O_3$ nucleus dispersion (Process A).

To 500 g of the nucleus dispersion, 1,700 g of purified water was added and heated by 98° C., and 3,000 g a silicic acid solution containing 3.5% by weight of $SiO_2$ was added while holding the temperature at 98° C. to obtain a dispersion of nucleus particle on which a first silica covering layer was formed. The silicic acid solution was prepared by dealkalizing the sodium silicate solution by a cation exchanging ester (Process B).

After that, the solid component concentration of the dispersion of the nucleus particle covered by the first silica layer was concentrated by 13% by weight by washing through a ultrafilter membrane. To 500 g of the dispersion of the nucleus particle covered by the first silica layer, 1125 g of purified water was added and concentrated hydrochloric acid (35.5%) was dropped to adjusting the pH value to 1.0 for dissolving aluminum. Then dissolved aluminum was separated through the ultrafilter membrane while adding 10 liters of a hydrochloric acid solution having a pH of 3 and 5 liters of purified water. Thus a dispersion of porous $SiO_2$ $Al_2O_3$ particle formed by removing a part of the constituting ingredients of the nucleus particle covered with the first silica layer (Process C).

A mixture of 1,500 g of the above porous particle dispersion, 500 g of purified water, 1,750 g of ethanol and 626 g of 28% ammonia water was heated by 35° C., and 104 g of ethyl silicate Containing 28% by weight of $SiO_2$ was added to form a second silica covering layer covering the surface of the porous particle covered with the first silica covering layer by polymer-condensate of ethyl silicate. After that, the solvent was replaced by methanol using the ultrafilter membrane. Thus a dispersion of hollow type silica fine particle (P-2) having a solid component concentration of 20% by weight was prepared.

The hollow type silica fine particle had a thickness of the first silica covering layer of 3 nm, an average particle diameter of 47 nm, a ratio of $MO_x/SiO_2$ of 0.0017 and a refractive index of 1.28. The average particle diameter was measured by a dynamic light scattering method.

(Reflectance)

The spectral reflectance at an incidence angle of 5° was measured within the wavelength range of from 380 to 780 nm by a spectrophotometer U-4000, manufactured by Hitachi Seisakusho Co., Ltd. High refection preventing effect correspondents to low reflectance in a wide wavelength range. Therefore, the minimum reflectance within the range of from 450 to 650 nm was determined. On the occasion of the measurement of the reflectance of the sample, the back side of which was roughened and blackened by a painting spray for preventing the reflection at the back surface.

As a result of the measurement, the reflectance of the hart coat film 1 was 0.4%.

<<Preparation of Polarization Plate>>

<Preparation of Polarization Plate for Viewing Side>>

Vinyl alcohol film having a thickness of 75 μm was subjected to single-axis stretching at 110° C. in a expanding ratio of 5 times. The stretched film was immersed for 60 seconds in an aqueous solution composed of 0.075 g of iodine, 5 g of potassium iodide and 100 g of water and then further immersed at 68° C. in an aqueous solution composed of 6 g of potassium iodide, 7.5 g of boric acid and 100 g of water. The film was washed and dried to obtain a polarizing layer.

The polarization plate, Hard Coat Film 1 having the reflection preventing layer and Cellulose Ester Film 14 were laminated according to the following processes 1 to 5 to prepare a polarization plate.

Process 1: The surface to be pasted with the polarizing layer of melt-cast Cellulose Ester Film 14 and Hard Coat Film 1 were each saponified by immersing in a 2 moles/l sodium hydroxide solution at 60° C.

Process 2: The polarizing layer was immersed in a tank containing a poly(vinyl alcohol) adhesive agent having a solid content of 2% by weight for 1 to 2 seconds.

Process 3: The polarizing layer was lightly wiped for removing the adhesive agent excessively adhering to the layer, and put onto Cellulose Ester Film 14 and Hard Coat Film 1 with the reflection preventing layer each treated in Process 1.

Process 4: Cellulose Ester Film 14, the polarizing layer and Hard Coat Film 1 with the reflection preventing layer laminated in Process 3 were pasted by applying a pressure of 20 to 30 N/cm² while conveying in a speed of about 2 m/minute.

Process 5: Cellulose Ester Film 14, the polarizing layer and the hard coat film with the reflection preventing layer pasted in Process 4 were dried for 2 minutes to prepare a viewing side polarization plate.

<Preparation of Backlight Side Polarization Plate>

Backlight side Polarization Plates 1 through 22 were each prepared by pasting the above prepared polarizing layer, Optical Compensation Films 1 through 22, respectively, and the above prepared Cellulose Ester Film 14 according to the above Processes 1 to 5. Each of the optical compensation films was pasted so that the polymer layer thereof was faced outside.

<<Preparation of Liquid Crystal Display>>

Liquid crystal panels were prepared as follows and the characteristics thereof as the liquid crystal display were evaluated.

The backlight side and the viewing side polarization plates of a VA type liquid crystal displays available on the market (30V type with direct lighting backlight) were removed and the optical compensation film side of the backlight side of each of the Polarization Plates 1 through 22 was pasted with the crystal liquid cell so that the polarizing axis was agreed with that of the previously pasted polarization plate, and the viewing side polarization plate was pasted with the liquid crystal cell through a adhesive layer so that the reflection preventing layer side of the viewing side polarization plate was outside. Thus Liquid Crystal Displays 1 through 22 were prepared.

(Evaluation)
<Visivility>

The liquid crystal displays prepared as above were each subjected durability test under an environment of 60° C. and 90% RH for 1,000 hours while lighting the direct lighting type backlight. After that, the backlight was on for 5 hours and then a black image was displayed. The displayed image was visually evaluated and classified into the following ranks.

A: Black image was tightly and clearly observed, and color ununiformity was not observed.

B: Black image was tightly and clearly observed though color ununiformity was slightly observed.

C: The tightness and clearness of the black image were lowered a little, and color ununiformity was observed.

D: The tightness and clearness of the black image were lower and color ununiformity was noted.

The evaluation results are shown in Table 2.

Table 2 shows that Liquid Crystal Displays 2 through 20 and 22 each according to the invention were superior in the visivility to the comparative examples even after the lighting by the direct lighting type backlight for the long period.

The optical compensation films 14 to 17, 19, 20 and 22 each using the preferable cellulose ester and the UV absorbent are considerably good in the visivility.

[Effects of the Invention]

The method for producing an optical compensation film superior in the low haze and the uniformity of the retardation and the polarization plate superior in the color reproducibility which is considerably lowered in the variation of visibility caused by the variation of surrounding condition and heating by a direct lighting backlight source such as a LED and the liquid crystal display apparatus can be obtained by the invention.

What is claimed is:

1. A method for producing an optical compensation film comprising the steps of:
melting a composition containing a cellulose resin having a residual sulfuric acid content of 0.1-50 ppm, a hindered phenol compound in an amount of 0.01-5% by weight and at least one kind of non-phosphate type plasticizers of a polyol ester plasticizer, a polyester plasticizer, a citrate plasticizer, and a phthalate ester plasticizer and containing a phosphate type plasticizer with a content less than 1.0% by weight so as to obtain a melt by heating the composition to a melting temperature A of 200° C. or more and 280° C. or less;
casting the melt on a support to form a cellulose resin film;
providing a polymer layer on the cellulose resin film; and
stretching the cellulose resin film together with the polymer layer under a stretching temperature B,
wherein the cellulose resin is a mixed fatty acid ester of cellulose having a total acyl group substitution degree of 2.0 to 2.9, and the hindered phenol compound is a compound represented by the following Formula (20),

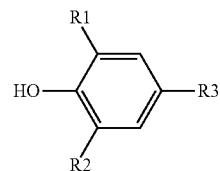

Formula (20)

in the above formula, R1, R2 and R3 each is a substituted or unsubstituted alkyl group, and at least one of R1 and R2 is a t-butyl group,
wherein the melting temperature A and the stretching temperature B satisfy the following conditional formula:

$$A-100°\ C. \leq B \leq A-40°\ C.$$

2. The method for producing an optical compensation film of claim 1, wherein the polymer layer is composed of at least one selected from the group consisting of poly(ether ketone), polyamide, polyester, polyimide, polyamidoimide and polyesterimide.

3. The method for producing an optical compensation film of claim 1, wherein the mixed fatty acid ester has a number average molecular weight Mn of from 60,000 to 200,000.

4. The method for producing an optical compensation film of claim 1, wherein the cellulose resin has residual sulfuric acid content of 0.1-45 ppm.

5. The method for producing an optical compensation film of claim 1, wherein the composition contains a UV absorbent, and the UV absorbent has a weight average molecular weight of 490-50000.

6. The method for producing an optical compensation film of claim 1, wherein the composition contains 0.01-5% by weight of a hindered amine compound.

7. A method for producing a polarization plate, comprising: the method for producing an optical compensation film of claim 1, wherein the optical compensation film is provided on at least one surface of a polarizer.

8. A method for producing a liquid crystal display, comprising: the method for producing a polarization plate of claim 7, wherein the polarization plate is provided on at least one surface of a liquid crystal cell.

9. The method for producing a liquid crystal display of claim 8, wherein a direct lighting type backlight is provided as a light source.

10. The method for producing an optical compensation film of claim 1, wherein the melting temperature A is 200° C. or more and 250° C. or less.

11. The method for producing an optical compensation film of claim 1, wherein the composition contains 0.01-1% by weight of the hindered phenol compound.

12. The method for producing an optical compensation film of claim 1, wherein the composition contains 0% by weight phosphate type plasticizer.

13. The method for producing an optical compensation film of claim 1, wherein the mixed fatty acid ester of cellulose is one of cellulose acetate propionate, cellulose acetate propionate butylate, cellulose propionate butylate and cellulose acetate butylate.

* * * * *